(12) United States Patent
Gold

(10) Patent No.: US 9,386,401 B2
(45) Date of Patent: Jul. 5, 2016

(54) PROXIMITY-BASED SENSING, COMMUNICATING, AND PROCESSING OF USER PHYSIOLOGIC INFORMATION

(71) Applicant: Steven K. Gold, Lexington, MA (US)

(72) Inventor: Steven K. Gold, Lexington, MA (US)

(*) Notice: Subject to any disclaimer, the term of this patent is extended or adjusted under 35 U.S.C. 154(b) by 0 days.

(21) Appl. No.: 14/621,170

(22) Filed: Feb. 12, 2015

(65) Prior Publication Data

US 2016/0057565 A1 Feb. 25, 2016

Related U.S. Application Data

(60) Provisional application No. 62/041,594, filed on Aug. 25, 2014, provisional application No. 62/043,212, filed on Aug. 28, 2014, provisional application No. 62/059,122, filed on Oct. 2, 2014, provisional application No. 62/066,226, filed on Oct. 20, 2014.

(51) Int. Cl.
*H04W 4/00* (2009.01)
*H04L 29/08* (2006.01)
*H04W 4/02* (2009.01)

(52) U.S. Cl.
CPC .............. *H04W 4/008* (2013.01); *H04L 67/12* (2013.01); *H04W 4/023* (2013.01)

(58) Field of Classification Search
CPC ................................................ G06K 19/0723
USPC ...................................................... 455/41.1
See application file for complete search history.

(56) References Cited

U.S. PATENT DOCUMENTS

| 6,527,711 | B1 * | 3/2003 | Stivoric | A61B 5/0002 128/898 |
| 6,571,279 | B1 * | 5/2003 | Herz | G06F 17/30867 707/999.01 |
| 6,662,032 | B1 * | 12/2003 | Gavish | A61B 5/1135 600/300 |
| 6,873,710 | B1 * | 3/2005 | Cohen-Solal | G11B 27/10 382/100 |
| 6,922,672 | B1 * | 7/2005 | Hailpern | G06Q 30/02 705/14.5 |
| 6,971,973 | B2 * | 12/2005 | Cohen | G06Q 30/02 482/1 |

(Continued)

OTHER PUBLICATIONS

Quinn, Gene, "The race to dominate the Internet of Things," Feb. 15, 2015, 4 pages, available at http://www.ipwatchdog.com/2015/02/15/the-race-to-dominate-the-internet-of-things/id=54698/.

(Continued)

*Primary Examiner* — Hai V Nguyen
(74) *Attorney, Agent, or Firm* — Robert Plotkin, P.C.; Robert Plotkin

(57) ABSTRACT

The present invention relates to systems and methods that sense, communicate and process one or more of a user's physiologic parameters, such as during a time when the user is in proximity with an object of interest. Objects may be products, locations and other people. One embodiment of the present invention enables users, designers, manufacturers, marketers and sellers to secure valuable information about how an object is (or many object are) perceived and used by a user (or many users). Various embodiments of the present invention may be used in conjunction with smart objects (e.g., Internet-connected objects) and dumb objects (e.g., objects having no Internet or other network connection).

74 Claims, 12 Drawing Sheets

(56) References Cited

U.S. PATENT DOCUMENTS

| | | | | |
|---|---|---|---|---|
| 6,978,470 B2* | 12/2005 | Swix | ............... | H04H 20/10 348/E7.063 |
| 7,106,204 B2* | 9/2006 | Pilu | ............... | H04N 5/232 340/573.1 |
| 7,133,837 B1* | 11/2006 | Barnes, Jr. | ............... | G06Q 30/0601 235/462.15 |
| 7,224,282 B2* | 5/2007 | Terauchi | ............... | A61B 5/00 340/4.13 |
| 7,515,044 B2* | 4/2009 | Welch | ............... | A61B 5/0024 340/286.07 |
| 7,912,537 B2* | 3/2011 | Lee | ............... | A61N 1/37288 128/903 |
| 7,978,062 B2* | 7/2011 | LaLonde | ............... | A61N 1/37282 340/539.1 |
| 8,373,556 B2* | 2/2013 | LaLonde | ............... | A61N 1/37282 340/3.1 |
| 8,395,498 B2* | 3/2013 | Gaskill | ............... | A61N 1/37282 340/5.61 |
| 8,473,306 B2* | 6/2013 | Seely | ............... | A61B 5/412 600/300 |
| 8,487,772 B1* | 7/2013 | Higgins | ............... | G06Q 30/0201 340/146.2 |
| 8,515,547 B2* | 8/2013 | Mass | ............... | A61N 1/37282 607/60 |
| 8,587,427 B2* | 11/2013 | LaLonde | ............... | A61N 1/37282 340/539.1 |
| 8,655,345 B2* | 2/2014 | Gold | ............... | H04M 1/7253 345/173 |
| 8,676,230 B2* | 3/2014 | Alexander | ............... | H04L 63/0861 455/456.1 |
| 8,818,522 B2* | 8/2014 | Mass | ............... | A61N 1/37282 607/30 |
| 8,957,777 B2* | 2/2015 | Baker | ............... | A61B 5/0024 340/538.15 |
| 8,970,392 B2* | 3/2015 | LaLonde | ............... | A61N 1/37282 340/870.01 |
| 8,976,007 B2* | 3/2015 | Dugan | ............... | A61B 5/0002 340/5.82 |
| 9,000,928 B2* | 4/2015 | Higgins | ............... | G06Q 30/0201 340/500 |
| 9,008,658 B2* | 4/2015 | Baker | ............... | G06F 19/3418 340/539.12 |
| 9,218,454 B2* | 12/2015 | Kiani | ............... | G06F 19/327 |
| 9,269,251 B2* | 2/2016 | LaLonde | ............... | A61N 1/37282 |
| 2002/0165733 A1* | 11/2002 | Pulkkinen | ............... | G06F 19/321 705/2 |
| 2003/0220584 A1* | 11/2003 | Honeyager | ............... | A61B 5/02125 600/559 |
| 2004/0152956 A1* | 8/2004 | Korman | ............... | A61B 5/00 600/300 |
| 2004/0203673 A1* | 10/2004 | Seligmann | ............... | H04M 1/72547 455/415 |
| 2005/0038326 A1* | 2/2005 | Mathur | ............... | A61B 5/411 600/300 |
| 2005/0080322 A1* | 4/2005 | Korman | ............... | A61B 5/0006 600/300 |
| 2007/0033069 A1* | 2/2007 | Rao | ............... | A63B 24/00 705/2 |
| 2007/0067005 A1* | 3/2007 | Schatz | ............... | A61N 1/37211 607/59 |
| 2007/0150028 A1* | 6/2007 | Parkinson | ............... | A61N 1/37276 607/59 |
| 2008/0167534 A1* | 7/2008 | Young | ............... | G06F 19/3418 600/301 |
| 2009/0058635 A1* | 3/2009 | LaLonde | ............... | A61N 1/37282 340/539.11 |
| 2009/0058636 A1* | 3/2009 | Gaskill | ............... | A61N 1/37282 340/539.11 |
| 2009/0062887 A1* | 3/2009 | Mass | ............... | A61N 1/37282 607/60 |
| 2009/0063187 A1* | 3/2009 | Johnson | ............... | A61B 5/0022 705/2 |
| 2009/0063193 A1* | 3/2009 | Barton | ............... | A61N 1/37282 705/3 |
| 2009/0093688 A1* | 4/2009 | Mathur | ............... | A61B 5/411 600/300 |
| 2009/0270743 A1* | 10/2009 | Dugan | ............... | A61B 5/0002 600/500 |
| 2009/0326339 A1* | 12/2009 | Horvitz | ............... | G06Q 10/00 600/301 |
| 2010/0033303 A1* | 2/2010 | Dugan | ............... | A61B 5/0002 340/5.82 |
| 2011/0001605 A1* | 1/2011 | Kiani | ............... | G06F 19/327 340/5.6 |
| 2011/0046971 A1* | 2/2011 | Young | ............... | G06F 19/322 705/2 |
| 2011/0165998 A1* | 7/2011 | Lau | ............... | A63B 24/0062 482/8 |
| 2011/0273287 A1* | 11/2011 | LaLonde | ............... | A61N 1/37282 340/539.12 |
| 2012/0001751 A1* | 1/2012 | Baker | ............... | A61B 5/0024 340/539.12 |
| 2012/0003933 A1* | 1/2012 | Baker | ............... | G06F 19/3412 455/41.2 |
| 2012/0184863 A1* | 7/2012 | Harlev | ............... | A61B 5/7475 600/509 |
| 2012/0185268 A1* | 7/2012 | Wiesner | ............... | G06F 19/3418 705/2 |
| 2012/0212596 A1* | 8/2012 | Mathur | ............... | A61B 5/411 348/77 |
| 2012/0295589 A1* | 11/2012 | Alexander | ............... | H04L 63/0861 455/411 |
| 2013/0045685 A1* | 2/2013 | Kiani | ............... | G08B 21/24 455/41.2 |
| 2013/0147622 A1* | 6/2013 | LaLonde | ............... | A61N 1/37282 340/539.12 |
| 2013/0154851 A1* | 6/2013 | Gaskill | ............... | A61N 1/37282 340/870.02 |
| 2013/0217350 A1* | 8/2013 | Singh | ............... | H04B 1/06 455/130 |
| 2013/0310896 A1* | 11/2013 | Mass | ............... | A61N 1/37282 607/60 |
| 2013/0331036 A1* | 12/2013 | Baker | ............... | G06F 19/3418 455/41.3 |
| 2013/0346550 A1* | 12/2013 | Higgins | ............... | G06Q 30/0201 709/217 |
| 2014/0062718 A1* | 3/2014 | LaLonde | ............... | A61N 1/37282 340/870.01 |
| 2014/0113593 A1* | 4/2014 | Zhou | ............... | H04L 63/20 455/411 |
| 2014/0127996 A1* | 5/2014 | Park | ............... | H04W 4/027 455/41.1 |
| 2014/0135588 A1* | 5/2014 | Al-Ali | ............... | G06F 19/327 600/300 |
| 2014/0171749 A1* | 6/2014 | Chin | ............... | A61B 5/0015 600/300 |
| 2014/0172310 A1* | 6/2014 | Chin | ............... | G06F 19/3406 702/19 |
| 2014/0188770 A1* | 7/2014 | Agrafioti | ............... | A61B 5/117 706/13 |
| 2014/0275835 A1* | 9/2014 | Lamego | ............... | A61B 5/0022 600/301 |
| 2014/0278229 A1* | 9/2014 | Hong | ............... | A61B 5/7455 702/160 |
| 2014/0282877 A1* | 9/2014 | Mahaffey | ............... | H04L 63/0853 726/3 |
| 2014/0298260 A1* | 10/2014 | Abowd | ............... | G06F 3/04842 715/810 |
| 2014/0378777 A1* | 12/2014 | Conrad | ............... | A61B 5/0515 600/301 |
| 2015/0023204 A1* | 1/2015 | Wik | ............... | H04W 48/14 370/254 |
| 2015/0029014 A1* | 1/2015 | Bande Martinez | ............... | G08B 21/06 340/439 |
| 2015/0099953 A1* | 4/2015 | Baker, Jr. | ............... | A61B 5/14552 600/324 |
| 2015/0100245 A1* | 4/2015 | Huang | ............... | A61B 5/0022 702/19 |
| 2015/0130613 A1* | 5/2015 | Fullam | ............... | G08B 21/0453 340/539.12 |
| 2015/0151198 A1* | 6/2015 | Dugan | ............... | A61B 5/0002 463/29 |

(56) References Cited

U.S. PATENT DOCUMENTS

| | | | | |
|---|---|---|---|---|
| 2015/0161676 | A1* | 6/2015 | Higgins | G06Q 30/0201 705/14.66 |
| 2015/0170504 | A1* | 6/2015 | Jooste | A61B 5/6898 340/539.12 |
| 2015/0178511 | A1* | 6/2015 | Klappert | G06F 21/6245 726/27 |
| 2015/0181314 | A1* | 6/2015 | Swanson | H04Q 9/00 340/870.07 |
| 2015/0190053 | A1* | 7/2015 | Baker | A61B 5/0024 340/870.3 |
| 2015/0206408 | A1* | 7/2015 | LaLonde | A61N 1/37282 340/539.12 |
| 2015/0217163 | A1* | 8/2015 | Amis | A61B 5/0022 700/91 |
| 2015/0278481 | A1* | 10/2015 | Hyde | G06F 19/3475 705/2 |
| 2015/0313498 | A1* | 11/2015 | Coleman | A61B 5/0482 600/383 |
| 2015/0358768 | A1* | 12/2015 | Luna | H04W 4/02 455/456.1 |
| 2015/0362519 | A1* | 12/2015 | Balakrishnan | G01P 13/00 702/178 |
| 2015/0363561 | A1* | 12/2015 | Watson | G06F 19/3406 702/19 |
| 2015/0371350 | A1* | 12/2015 | Zebarjadi | G06F 19/322 705/2 |
| 2016/0012249 | A1* | 1/2016 | Keppler | G06F 17/30876 726/28 |
| 2016/0019283 | A1* | 1/2016 | Gibson | G06F 17/30598 707/610 |
| 2016/0029890 | A1* | 2/2016 | Stump | A61B 5/0022 600/301 |
| 2016/0037345 | A1* | 2/2016 | Margadoudakis | H04L 63/0853 455/411 |

OTHER PUBLICATIONS

Grossman, L., et al., "Never Offline. The Apple Watch is just the start. How wearable tech will change your life-like it or not," Time Magazine, Sep. 22, 2014, 10 pages.

Jankowski, S., el al. "The Internet of Things: Making sense of the next meda-trend," Goldman Sachs, Sep. 3, 2014, 15 pages. Available at: http://www.goldmansachs.com/our-thinking/pages/internet-of-things/Iot-report.pdf.

Macaulay, J., et al., "Internet of Things in Logistics: A collaborative report by DHL and Cisco on implications and use cases for the logistics industry," DHL Trend Research and Cisco Consulting Services, 2015, 29 pages. Available at: http://www.dhl.com/en/about_us/logistics_insights/dhl_trend_research/internet_of_things.html#.VxUkfHonqbQ.

"Internet of Things: Science Fiction or Business Fact?" Harvard Business Review Analytic Services Report Harvard Business School Publishing, 2014, 9 pages. Availabie at: http://www.verizonenterprise.com/resources/reports/rp_hbr-internet-of-things-science-fiction-or-business-fact_en_xg.pdf.

"The Internet of Things: Mapping the Value Beyond the Hype," McKinsey Global Institute Report, McKinsey & Company, Jun. 2015, 144 pages. Available at: http://www.mckinsey.com/~/media/mckinsey/business%20functions/business%20technology/our%20insignts/the%20internet%20of%20things%20the%20value%20of%20digitizing%20the%20physical%20world/unlocking_the_potential_of_the_internet_of_things_full_report.ashx.

* cited by examiner

PROXIMITY-BASED SENSING, COMMUNICATING, AND PROCESSING OF USER PHYSIOLOGIC INFORMATION

BACKGROUND

Understanding how people respond to various objects is valuable. Existing systems, however, have significant limitations that preclude a complete understanding of how specific individuals respond to particular objects.

SUMMARY

Various embodiments of the present invention include systems and methods for automated, accurate, relevant, continuous, remote sensing and communication of one or more of a user's physiologic parameters at least for some period of time during which the user is in proximity to an object of interest. Embodiments of the present invention may include processing and analysis of the physiologic data and other data, and may further include causing or facilitating an action by the user, device, sensor or object. In one embodiment of the present invention, a wireless communication device (e.g., mobile phone or wearable device, or a combination of devices) determines whether an object and a device are in proximity to each other. Such an embodiment then uses a device-associated sensor (or multiple device-associated sensors) to sense a physiologic parameter (or multiple physiologic parameters) of a user of the device, at one or more times, in order to collect physiologic data about the user, at least while the user is in proximity with the object, and possibly at other times while the user is not in proximity (in non-proximity) with the object. Such an embodiment may then communicate physiologic data (and other data) to a remote server. This may facilitate further processing of data by the embodiment, including but not limited to data analysis, which the embodiment may perform in combination with other data from the same or other users. Embodiments of the present invention have many applications relating to many different combinations of users, devices, sensors, physiologic parameters (and data), analyses, and objects. A few representative objects include, without limitation, things (e.g., products, product lines, groups of related products such as may be associated with a brand), places (e.g., locations, stores, retail environments, interior spaces, theaters, parks), experiences (e.g., watching a movie, eating a meal, experiencing a medical procedure), and other people (e.g., a colleague or friend of a user). A few representative general physiologic parameters include, without limitation, physiologic phenomena such as heart rate, respiration rate, blood pressure, body temperature, blood chemistry, other blood constituents, muscle contraction, movement, activity, speech, and brain waves. Sensing any such physiologic parameter may cause physiologic data to be produced, where the physiologic data represents one or more values of the physiologic parameter. For example, if heart rate (a physiologic parameter) is sensed, this may cause physiologic data representing a value of 100 beats per minute to be produced, where 100 beats per minute is a value of the physiologic parameter of heart rate.

A first advantage of embodiments of the present invention is that they enable automated (e.g., not relying on a user's conscious input) sensing of an individual's (e.g., device user's or object user's) physiology (e.g., at least one of the user's physiologic parameters), at least during a period of time when the individual (user) is in proximity to an object of interest, and (optionally) during other periods of time during which the individual (user) is not in proximity (in non-proximity) with the object of interest (such as for the purpose of comparison of data secured before, during, and/or after proximity).

A second advantage of embodiments of the present invention is that they enable the seamless monitoring of one or more physiologic parameters of a user, e.g., in a way that "knows" what physiologic and other data to capture and/or communicate in order to facilitate the creation of value or benefits, meaning an understanding of a user's (or many users') physiologic responses to particular objects, in part to better use, understand, design, market and sell such objects.

A third advantage of embodiments of the present invention is that they enable the collection of accurate and objective (e.g., unbiased) information about an individual's physiology, at least during a time when the individual is in proximity to an object of interest. This is in contrast to other types of user input, such as a rating, for example, which may be consciously or subconsciously influenced or biased and not reflective of the individuals real feelings or behaviors.

A fourth advantage of embodiments of the present invention is that they enable greater relevance of a user's physiologic response relating to the user's interaction with a particular object. For example, sampling of data may be performed in a way that enables more statistically significant correlations of physiology and proximity with an object, versus other more traditional surveying and data collection techniques.

A fifth advantage of embodiments of the present invention is that they enable continuous (e.g., ongoing, at regular intervals over time, or triggered at certain points in time) sensing of a person's (user's) physiology, at least during a time (or times) when the person is in proximity to an object. This assures a complete and meaningful data set.

A sixth advantage of embodiments of the present invention is that they enable remote (e.g., wireless, possibly involving temporary storage of data) monitoring of a person's (user's) physiology, at least during a time when the individual is in proximity to an object. Such monitoring may be by means of wireless devices and remote servers (computers).

A seventh advantage of embodiments of the present invention is that they enable processing and analysis of data, either from a single user or multiple users, relating to physiologic responses when the individual or individuals are in proximity to an object (either once or at multiple times). Such processing and/or analysis may be done at a remote server.

An eighth advantage of embodiments of the present invention is that they enable new and useful information to be created based on physiologic and other data, to enable productive decisions and actions by object users, owners, manufacturers, sellers, and others. Such information may, for example, be communicated to an element of an embodiment of an element of the present invention, such as a device, remote computer, sensor or object.

A ninth advantage of embodiments of the present invention is that they enable correlation of data associated with a particular object and data associated with a particular user or group of users during the time that such user(s) is/are (and/or was/were) in proximity to the object. Such correlation further enables creation of new and useful data (output) that uniquely details user response to an object.

A tenth advantage of embodiments of the present invention is that they enable the validation, authentication, verification and/or confirmation of a person's (user's) identity based on that person's physiologic data, physiologic state or physiologic fingerprint, further enabling secure transactions, access to, or use of an object, for example.

Other features and advantages of various aspects and embodiments of the present invention will become apparent from the following description and from the claims.

DETAILED DESCRIPTION

Figure 1:
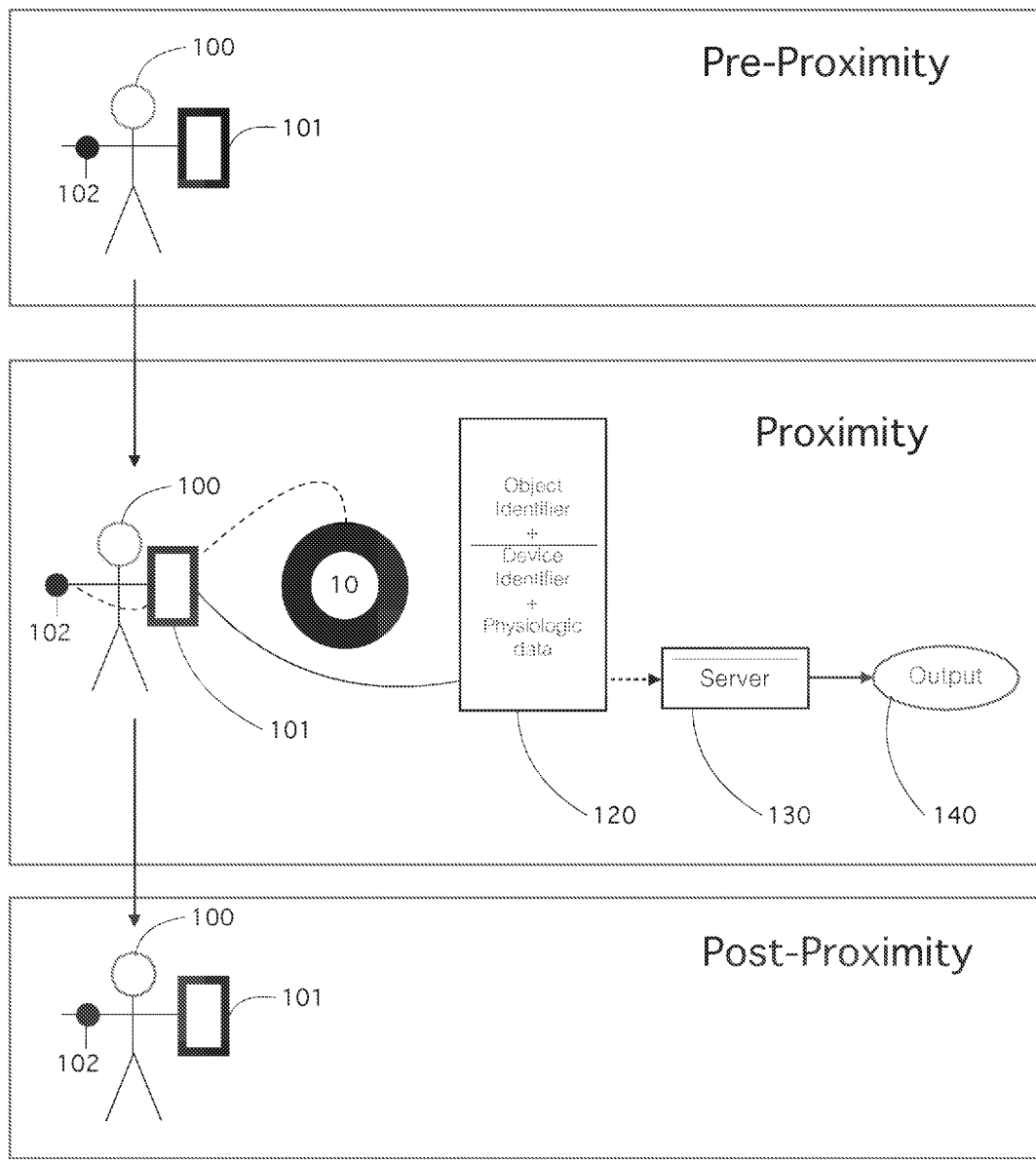
FIG. 1 is a diagram representing one embodiment of a system for sensing, communicating, and processing user physiologic information.

Various embodiments of the present invention include systems and methods for the automated, accurate, relevant, ongoing, remote sensing and communication of one or more of a user's physiologic parameters while the user is in proximity to an object of interest. Embodiments of the present invention may include processing and analyzing the physiologic and other data, and may further include facilitating an action by the user, device, sensor or object. In one embodiment of the present invention, a wireless communication device (e.g., mobile phone or wearable device, or a combination of devices) determines whether an object and a device are in proximity to each other. Such an embodiment then uses a device-associated sensor to sense a physiologic parameter (or multiple physiologic parameters) of a user of the device, at one time or at multiple times, in order to collect physiologic data about the user at least while the user is in proximity with the object. Such an embodiment then communicates physiologic data (and other data) to a remote server. This may facilitate further processing by the embodiment, including but not limited to data analysis, which the embodiment may perform in combination with other data from the same or other users. In such an embodiment, processing may be performed at a device or at a remote server. Embodiments of the present invention have many applications relating to many different combinations of users, devices, sensors, physiologic parameters (and data), analyses (e.g., algorithms), and objects. A few representative objects include things (e.g., products, product lines, groups of related products such as may be associated with a brand), places (e.g., locations, stores, retail environments, store interior spaces, theaters, parks), experiences (e.g., watching a movie or show, experiencing a medical procedure), and/or other people (e.g., colleague or friend of a user). A few representative general physiologic parameters include heart rate (pulse), respiration rate, blood pressure, body temperature, blood chemistry, blood constituents, muscle contraction, movement, activity, speech, and brain waves.

Embodiments of the present invention include systems and methods that make a determination of proximity between a device (a particular device associated with a particular user) and an object (a particular object), and based on this determination of proximity sense (or cause, facilitate, or detect sensing) of one or more physiologic parameters of a user, at one or more times, in order to capture the user's physiologic data, at least during some portion of the time during which the device (and its user) and the object are in proximity to one another. One beneficial aspect of this feature of embodiments of the present invention is that such embodiments correlate (or enables the correlation of) physiologic data of a user (as detected at least while the device and its user are in proximity with an object) with the particular object in order to learn or facilitate learning about a particular user's response (or many users' responses) to a particular object or set of related objects. Another aspect of embodiments of the present invention that they enable a remote server or other element to correlate user physiologic data (and, optionally, other data, such as device or user location) with a particular object. Such examples illustrate valuable benefits of embodiments of the present invention, including but not limited to the enablement of data analysis relating to how a particular object affects a particular user (or group of users) while the user (or group of users) is in proximity to the object. Such analyses may also include correlation with device (or user) location(s), data collection time(s), and other data. For example, when user identity enables access to user demographic or other data, embodiments of the present invention may include some or all of this data in an analysis. As an example, when user U is in proximity with object O at time T at location L, embodiments of the present invention may correlate or enable user U's physiologic data to be correlated with object O at time T at location L. Embodiments of the present invention may perform a process that correlates object O with user U's physiologic (and other) data at a remote server, device, or other element, for example.

Embodiments of the present invention may use the location of a device as a proxy for the location of a user of a device, based on the assumption that the user is likely to be at the same location as, or very close to, the user's device. As a result, a conclusion that an object is in proximity to a device may be used to draw a conclusion that the object is also in proximity to a user of the device.

As noted, embodiments of the present invention may combine physiologic and other data relating to one user with physiologic and other data from other users to understand or to facilitate an understanding of how users of a particular object, or different user segments or subgroups, respond physiologically while in proximity with the particular object (and embodiments may also understand or facilitate an understanding of other aspects, attributes, actions, characteristics and behaviors of users, for example). Embodiments of the present invention may communicate the analysis (by a remote server or another element of the present invention) to a device, object, sensor, user or other remote server in order to inform a decision or action, or for other purposes, e.g., storage for later use of the data.

Embodiments of the present invention may automatically sense a particular user's physiologic data during at least some of the time that the particular user is in physical proximity to a particular object. In one embodiment of the present invention, a wireless communication device associated with a user, such as a device carried or worn by the user, facilitates the detection (or makes a determination) of proximity between the device and the object. Proximity between an object and a device (or a user) may be determined in any of a variety of ways, and using any of a variety of technologies, e.g., radiofrequency identification (RFID), near-field communication (NFC), beacon signals (e.g., Apple Inc.'s iBeacon product), optical identification (e.g., image recognition of an object), triangulation technology. In such an embodiment, at least during periods of proximity between the device and the object, sensors sense at least some of the user's physiologic data. Embodiments of sensors are associated with (e.g., integrated with, attached to, communicating with) the device. Such embodiments may also collect or determine non-physiologic data (e.g., object identity data, device identity data, device location data, time data), at least during periods of proximity between the device and the object. Such an embodiment may store any or all of this data in electronic memory, such as at the device, at the object, or remotely. In embodiments of the present invention, at a time (or times) following generation of the data, the data is communicated (partially or entirely wirelessly) from the device to a remote server. The remote server may then collect, aggregate, store, analyze, and/or output the data. The present invention, in several of its embodiments, provides automatic, seamless, accurate, relevant, ongoing and remote access to physiologic information about a user during the user's proximity to an object of interest (and possibly at other times). This enables embodiments of the present invention to correlate a user (or users) with an object (or set of related objects), analyze resulting data, and more, to create new and useful information that may positively inform decisions and actions. Such decisions and actions may benefit a user, maker, owner, or seller of an object, for example, including but not limited to improvements to design, marketing, behavior, etc.

A few examples of how embodiments of the present invention may benefit users include but are not limited to embodiments which: i) detect user reactions (e.g., by means of user physiology) to a consumer product (an example of an object) in order to cause or facilitate improvement to the product's design and/or overall user experience, ii) sense physiologic parameters during a user's proximity with a piece of equipment (another example of an object) in order to automatically detect any adverse stress response or danger to the user, and to then facilitate action to mitigate danger to the user, iii) monitor the physiology of multiple users while they are watching (at the same time or at different times) a test showing of a movie or commercial in order to permit the producers of the movie or commercial to learn how audiences respond so that the movie or commercial may be modified accordingly, iv) follow a certain user's physiologic parameters while the user is in a retail store in order to understand which areas of the store and/or which product types and/or which specific products are of most (and/or least) interest to the user, possibly to provide the user with timely assistance or presentation of a promotion (such as a digital coupon), for example, v) detect a user's general physiologic parameters during the course of a day in order to provide the user with information relating to how he or she responded while in proximity with particular objects (e.g., things, places, experiences, other people) throughout the day, to enable the user to better understand his/her preferences and behaviors, and vi) determine proximity between an object that requires authentication of a user's identity in order for the user to use the object, and a device, whereby the proximity between the device and the object causes an embodiment of the present invention to evaluate several of the user's physiologic parameters to confirm that a user of the device has the authority to use the object, such user authentication performed in whole or in part by means of the evaluation of the user's physiology and analysis of the resulting physiologic data, and which furthermore causes the object to be allowed (enabled) to be used by the user. As seen by these examples, embodiments of the present invention enable a broad range of applications that confer many benefits and advantages to users and others. Many other example use cases and embodiments fall within the scope of the present invention.

The term "object" may refer herein, for example, to a thing, place, person, experience, or some combination of these (e.g., such categorization is not mutually exclusive, an object may fall into one or more of these categories). In the case that an object is a thing, it may be, without limitation, an item or a product. Some examples of things include, but are not limited to: consumer products, commercial products, food items, vehicles, vehicle seats, theaters, theater seats, office supplies, chairs, office equipment, magazines, books, coupons, packaging, bottles, cans, jars, household appliances, strollers, desks, file folders, medical devices, weapons, and any tangible thing. In the case that an object is a place, it may be, without limitation, a location, space, place, or area. Some examples of places include, but are not limited to: chain restaurant, bus stop, office, conference room, building, big box store, retail store, store interior space, park, outdoor space, theater, and nearly any space within which an individual may exist, move, or operate. For clarity, a first user is associated with a first device that may be in proximity with a first object and, if the first user is a first person who is a user of a device, the object may be a second person, i.e., a person other than the first person who is the user of the device. Some examples of objects that may be persons (people) include but are not limited to: family members, friends, teachers, professors, clients, customers, bosses, colleagues, and employees. In the case that an object is an experience, it may, for example, be any instance or event that causes a user to perceive something. Some examples of experiences include, but are not limited to: movies, shows, amusement park rides, shopping incidents, medical treatments, activities, and accidents. In some cases of experiences, the experience may be associated with an object that is physical in nature (e.g., a thing). For example, an experience that is a movie (being watched) may be considered the experience that is happening (taking place) in a particular space at a particular time. In such instances, the place and the experience are both objects. For further clarity, an object may fall into one or more categories. As another example, a meal at a restaurant may be associated with several objects, e.g., one or more things (each item of food, or plates of food), one or more places (the street location of the restaurant, an interior space inside the restaurant, a particular table within the restaurant, a specific chair at the table), and one or more experiences (being in the restaurant, being in a particular interior space, eating the food). The foregoing examples are not intended to limit the present invention in any way. Other examples and categorizations (and categories) of objects fall within the scope of the present invention.

An object may be an instance or a category (i.e., class). An instance is a specific, unique instance of a thing, place, person or experience. One example of an instance is a single and particular physical can of soup. Another example of an instance is a single and particular physical automobile (e.g., a specific car with a unique vehicle identification number). A class, on the other hand, is a collection of one or more instances (e.g., things, places, persons, or experiences). One example of a class is the set of all of the automobiles (perhaps thousands or millions of them) that have a particular manufacturer, model, and year, e.g., the set of all Audi A4s made in 2014. Another example of a class (that is an experience) is every showing of the movie "The Godfather," irrespective of when and where such instances of the movie are shown. Either a single or multiple users can interact with an object that is an instance, either at the same or at different (or overlapping) times. Similarly, a single user or multiple users can interact with an object that is a class, either at the same time or at different (or overlapping) times. In many instances of objects that are classes, different users will be in proximity with different instances of objects (that fall within those classes) at different times. An object may be an instance that is not a member of a class (e.g., there is only one of this exact thing, place, person or experience), or may be an object that is a member of a class (e.g., the object may be a thing which falls into some category of type, make, model, brand, etc.).

In various embodiments, an object may include an embedded system (e.g., processor) and means of connectivity to an electronic network, such as the Internet, to enable the object's monitoring and/or control. The "Internet of Things" is a term that, despite lack of a single precise definition, is often used to collectively refer to the universe of such objects. Such an embodiment of an object that includes an embedded system and network connectivity means is herein referred to as a "connected object" or a "smart object." A few current examples of connected objects (smart objects) include but are not limited to Internet-connected thermostats, lighting systems, and home security systems. Two specific examples of connected objects (smart objects) are: the Nest Thermostat and the Nest Protect (a network connected smoke and carbon monoxide detector), both made and sold by Nest Labs, Inc. There are many other connected objects (smart objects) currently in existence and under development.

Alternatively, an object that is not a connected object (smart object) is herein referred to as a "disconnected object" or a "dumb object." A dumb object may, for example, not be connected to the Internet. A dumb object may, for example, not include any means for connecting to the Internet. For example, a dumb object may not include any means for transmitting and/or receiving signals via the Internet Protocol (IP). A dumb object may include means for sending and/or receiving signals, but such means may be limited to means for sending and/or receiving signals locally and not over the Internet (e.g., via IP), such as means for sending and/or receiving signals via local signals technology, such as Radio Frequency Identification (RFID), Near Field Communication (NFC), and/or Bluetooth technology. A dumb object may lack means for sending and/or receiving wireless signals. A dumb object may lack any means for processing electronic data, such as an electronic processor. A dumb object may be intangible, as in the case of an event or other experience. A dumb object may not include any means for sending and/or receiving signals, and may be capable of sending and/or receiving signals only indirectly via a transmitter (e.g., tag) that is coupled to or otherwise associated with the dumb object.

One example of a disconnected object (dumb object) is a naturally occurring rock. Other examples of things that are disconnected objects (circa 2014) are: a standard chair, a No. 2 pencil, a purse, a printed magazine, and a can of soup. Yet other examples of objects that are disconnected objects (circa 2014) are: a meal at a restaurant, the experience of watching a movie in a theater, a national park, and the inventor's best friend. Notably, disconnected objects (dumb objects, without any reference to a person's intelligence) may be associated with an electronic tag (e.g., RFID tag) or NFC module or other electronic means to enable their detection (and their identification), and such tags or other means may be attached to or even embedded within an object but may not monitor and control the object. Such tags or other means may complement disconnected objects (dumb objects) and may transmit a local signal, for example, that communicates with a device, such as a mobile device—and such device may be wirelessly or otherwise connected to a network such as the Internet. As a clarifying example, a space or area, such as a field or a room in a home or office building, is a disconnected object or dumb object, even though other objects within the space or area may be connected objects (smart objects), and even if the space contains wired or wireless technology. Such a space may have a RFID tag or other similar wireless identification technology associated with it, for example. Similarly, an entity may be a hybrid that is both a connected object (smart object) and a disconnected object (dumb object). As one example of a hybrid object, a human may have an embedded cardiac pacemaker that is a connected object (and that may even endow the heart with certain attributes that allow it to also be recognized as a connected object); however the rest of the human person's body, including the person's underlying physiologic mechanisms, remain inherently biological in nature and do not include embedded electronics or communication means that would cause it to be considered a connected object. As a disconnected object such a person may, for example, have (by means of attachment or embedding or otherwise) a tag or other means that enables the person to be detected and identified. These examples are intended to be representative and there are many other examples of embodiments of connected objects (smart objects) and disconnected objects (dumb objects).

Devices, objects (e.g., dumb objects), and sensors (and communications mechanisms attached to or otherwise associated with devices, objects, and/or sensors) may, for example, receive and/or transmit any of the signals disclosed herein using a non-Internet Protocol (IP) communications mechanism, such as Bluetooth, Near-Field Communication, and/or Radio Frequency Identification (RFID) communications mechanisms. A device, object, or sensor that receives and/or transmits certain signals using a non-IP communications mechanism may, but need not, also include or otherwise be associated with means for connecting to and communicating over the Internet. A device, sensor, or object may, for example, include one or more means for communicating using one or more non-IP protocols, and not include any means for communicating using IP (i.e., over the Internet). Non-IP communication may be performed, for example, between a sensor and a device, between an object and a device, or between a device and a sensor, in any combination.

Embodiments of a wireless communication device of the present invention (also referred to simply as a device) may be or include any of a wide range of wireless communication means, including but not limited to mobile phones, smart phones (e.g., Apple iPhone made by Apple, Inc.), tablets that are wirelessly connected to the Internet (e.g., Apple iPad made by Apple, Inc.), wearable devices (e.g., Apple Watch announced to be released in 2015 by Apple, Inc.), or other portable electronic communications devices that may be carried by, worn by, implanted in, attached to, or otherwise associated with a user. A device may include or be made of a combination of elements that communicate with one another. Such device elements of embodiments of a wireless communication device of the present invention may include a power supply (internal or external), a processor (e.g., CPU or chip), input means (e.g., one or more physiologic sensors), output means (e.g., display), wireless communication means, and possibly other elements. Embodiments of the present invention may include all of these elements, whereas other embodiments of the present invention may include only a subset of these elements. Yet other embodiments may include other elements or components. In one embodiment of a device of the present invention, elements may be incorporated into a single unit or housing. In other embodiments of the present invention, a device may have its elements distributed in some way, such as a wrist-worn physiologic sensor (input means) that wirelessly communicates with a mobile phone (that includes a processor and means for wirelessly communicating with the sensor and also a communications network), for example. Various embodiments of a device of the present invention may be (or be similar to) a current mobile device (e.g., cell phone or tablet), or any of a variety of wearable devices, such as those worn on a wrist (e.g., watch or wrist band), a head (e.g., glasses or headgear) or a chest. A device of the present invention may include a combination of multiple elements, for example, each element which may further provide unique or overlapping functionality. One example of a distributed device is a wrist-worn device that wirelessly receives data (e.g., wirelessly via Bluetooth) from a first sensor worn at the chest and a second sensor implanted in the body, and that wirelessly sends and receives data using a wireless communications network that uses current wireless technology, infrastructure and protocols (e.g., to communicate with a remote server), possibly by means of another element of the device (e.g., a mobile phone). Embodiments of devices of the present invention may wirelessly communicate (e.g., with a remote server) using any of a variety of current or future wireless communication technology, infrastructure and protocols, given that technology, infrastructure and protocols continue to evolve. Additionally, embodiments of devices of the present invention may be associated with a single user, or with more than one user. Elements of embodiments of devices of the present invention may, for example, be fixed, variable, replaceable, perishable, disposable, or any combination thereof. As may be seen by these examples, the present invention encompasses many embodiments of devices.

By way of further illustration of an embodiment of the present invention, a device may be or include a wristband, or other wrist-worn device that includes a wristband. A wristband or a wrist-worn device may be in communication either directly (e.g., wires or contacts, possibly enabling coupling and decoupling), or indirectly (e.g., wirelessly, Bluetooth). An embodiment of a wristband may include sensors that detect the movement (e.g., use) of the muscles or tendons in a user's wrist (e.g., brachioradialis, flexor carpi radialis, flexor digitorum radialis, extensor digitorum, associated tendons) that control the user's finger movements, for example. Such sensors may sense, for example, movement of the muscles by means of tactile sensors, nerve conduction associated with the muscles, electrical impulses associated with muscle movement, changes to blood flow, or even visual detection of muscle or finger movement. Such sensors may, for example, provide data relating to a user's interaction (using one's fingers, for example) with an object (e.g., a printed keypad), at least for a period of time following the determination of proximity between a device (and/or the user of the device) and the object. Embodiments of the present invention may analyze such data and, based on the analysis, determine details of such interaction, such as the specific input of a user to a keypad (e.g., keyboard) that is presented, projected, drawn or otherwise positioned at or on a surface. For example, an object may be or include a presentation (or representation) of numeric keypad printed on a surface. In response to the approximation of a device and the object (e.g., the numeric keypad), the device may, for example, sense user physiologic data (e.g., finger muscle or tendon movement associated information). The device may wirelessly communicate such physiologic data, possibly in combination with other data sensed concurrently (e.g., accelerometer data, such as may detect whole hand movement in space), to a remote server. Using object identification data, along with other data provided by the device, and possibly by other elements of embodiments of the present invention, a remote server may, for example, identify the user's input to the object (e.g., the numeric keypad), for example to inform a subsequent decision or action. One example of such an action is to send a communication from a remote server to a remotely controllable lock (e.g., a lock located near the keypad) with instructions to unlock the lock. Another example of such an action is to enable user feedback. Many other embodiments of devices, wristbands, associated sensors, and uses of embodiments fall within the scope of the present invention.

In embodiments of the present invention, a user is a human being. In certain embodiments of the present invention a user is a mammal. The foregoing examples are not intended to be limiting, and other examples of users are possible. In general, a user is associated with a device and, when an embodiment of the present invention determines that a device is in proximity with an object, the embodiment may conclude that the user is in proximity with the object. A single user may be associated with multiple devices, such as when a user owns and uses a smartphone device and also a tablet device, for example. Multiple users may be associated with a single device, such as when a smartphone device is shared between two different users (e.g., a first user and a second user). Devices may include means to determine that a particular user is using and/or in proximity with the device. For example, a device may employ a biometric technology, such as a fingerprint scanner, to identify a user of the device (e.g., facilitate an indication of a user identity to the device). A device may also employ wireless technology to determine that a certain user is using the device, such as a RFID or NFC technology, for example. Embodiments of a device may also use voice recognition technology to determine that a particular user is using the device. In certain such embodiments, user proximity (e.g., to a device) data (or actual use of the device by a particular user) may be communicated to a remote server to verify that a particular user is in proximity to a particular device, which may indicate that the particular user is in proximity to a particular object when the device and object are determined to be in proximity.

The term "proximity," as used herein, may refer, for example, to physical closeness, such as between an object of the present invention and a device of the present invention. Terms such as "determining whether A (e.g., a device) and B (e.g., an object) are in proximity to each other," "determining proximity," "detecting proximity," "determining proximity between," and "making a determination of proximity" are used interchangeably herein. Similarly, terms such as "a period of proximity between" and "a time of proximity between" are used interchangeably herein to refer to a time or times during which two elements (e.g., a device and an object)

are in proximity to each other. Other terms, such as "processor" and "server" (and "remote server") are also used interchangeably.

An object and a device may, for example, be considered to be in proximity to each other if and only if the object and the device are no greater than a particular distance (a "proximity threshold") from each other. Examples of such proximity thresholds are, without limitation, 10 meters, 1 meter, 50 centimeters, 1 centimeter, and 2 millimeters. For example, when a device and an object are within 1 meter of one another, embodiments of the present invention may consider the device and the object to be in proximity to each other. As another example, when a device and an object are within 1 millimeter of one another, embodiments of the present invention may consider the device and the object to be in proximity to each other. As yet another example, embodiments of the present invention may consider a device and an object that have touched or are touching (in direct contact) to be in proximity to each other. As another example, embodiments of the present invention may determine that a device is in proximity to an object by determining that a location of the device satisfies a proximity criterion in relation to a location of the object. For example, if the object is a theater, then embodiments of the present invention may determine that the device is in proximity to the theater lobby by determining that the location of the device is within the boundaries of the theater lobby, or by determining that the device is within some maximum threshold distance of the center of the theater lobby. In yet another embodiment of the present invention, proximity exists at a time when a signal being transmitted by an object (or an object-associated RFID, NFC or other transmitter or tag) is received by a receiver, such as a receiver associated with a device of the present invention. For example, when a device is close enough to an object (or object-associated) transmitter and receives a signal from the transmitter, the object and the device may be deemed to be in proximity based on receipt of the signal, in an embodiment of the present invention. Such a determination of proximity may be without regard for a specific distance between the object and the device, however such types of transmitters (e.g., RFID, NFC) typically transmit signals that may only be received within a certain range (although the range may vary due to environmental conditions, etc.). Different proximity thresholds may be applied to different types of object, to compensate for or address the size or movement of the object, for example. For example, a proximity threshold that is applied to a small object, such as a can of soup, may be useful to be relatively small (e.g., 20 centimeters) in comparison to a proximity threshold that is applied to a ship, which may be useful to be relatively large (e.g., a mile). In embodiments of the present invention, a proximity threshold may be defined (e.g., pre-specified) as a particular physical distance, while in other embodiments of the present invention proximity thresholds may vary, for example according to the type of object or even the particular object. Proximity may be determined at the device or remotely, such as at a remote server or processor, for example. The foregoing examples of the concept of proximity and proximity thresholds are not intended to be limiting in any way, and other examples of the concept of proximity fall within the scope of the present invention.

Embodiments of the present invention may determine whether an object and a device are in proximity to each other in any of a variety of ways. For example, embodiments of the present invention may determine whether an object and a device are in proximity to each other using near-field communication (NFC) technology. As another example, embodiments of the present invention may determine whether a device and an object are in proximity to each other using radio frequency identification (RFID) technology. For example, a RFID tag (which may be active or passive) may be attached to (or otherwise associated with) an object, and the RFID tag may wirelessly communicate a signal that is received by a device, which may conclude, based on the device's receipt of the signal, that the RFID tag (and the object by association) and the device are in proximity with one another. Generally speaking, most RFID tags are only detectable (by a receiver) within a generally known distance or range. The term RFID is intended to be broadly interpreted, and includes (without limitation) any of a wide variety of locating and local signal transmission and reception technologies including but not limited to Apple, Inc.'s iBeacon product, as well as other technologies, products, transmitters and tags that may be associated with objects (e.g., things, places), along with their counterparts located at the device (e.g., a wireless receiver), to enable detection of proximity between an object and a device. As another example, embodiments of the present invention may determine whether a device and an object are in proximity to each other by identifying the location of the object and/or the location of the device, and by determining whether (or that) the object and the device are in proximity to each other based on their locations (such as by determining whether the locations of the object and the device differ from each other by no greater than some predetermined maximum threshold distance, e.g., 0.1 meter). Global positioning system (GPS) technology or other similar positioning or locating technology may, for example, be used to identify the locations of the device and the object (although in other cases the location of an object, such as a retail store, may be fixed and known, e.g., predetermined and stored in a database). In general, when embodiments of the present invention determine that an object and a device (or a user associated with the device) are approximately, significantly, or precisely in the same place at approximately, significantly, or precisely the same time, such embodiments may conclude that the object and the device are in proximity to each other. Notably, such a determination and/or conclusion may, for example, be made by the device, a remote server (processor), the object, another element of the present invention, or any combination of these. As one example of this, the locations of the object and the device may be identified by locating means that are separate and distinct from the object and the device. Other means of determination of proximity are possible and fall within the scope of the present invention, including but not limited to the use of optical detection technologies, sound detection technologies, electromagnetic signal detection technologies, and location identification detection means (associated with a device or otherwise). In particular, embodiments of the present invention may include optical imaging or scanning technology (including but not limited to the use of image recognition and similar technologies that may be used to determine that an object and a device, or an object and a user, are in proximity). Without limitation, any technology or means that enables a determination that a particular object and a particular device (or a user associated with a particular device) are in proximity to one another may be used as proximity determination means in various embodiments of the present invention. An object and a device may be approximated (e.g., brought closer to one another, also considered the action of approximation) to cause them to be in proximity, by moving the device or the object, or both.

Proximity determination may also involve the use of a dedicated tag. Embodiments of a dedicated tag may be a NFC-type or RFID-type local transmitter, capable of transmitting a signal within a generally predefined range (depending on a variety of factors the range may vary in various directions from the dedicated tag). Such embodiments of a dedicated tag may be placed or positioned on, at or near an object, for example, such as on a store shelf or attached to a floor, ceiling wall or outdoor surface, or embedded within a product or product packaging, for example. In such embodiments, the dedicated tag transmits a signal that causes a device to communicate physiologic data relating to a user of the device to a remote server or the dedicated tag, or some other element of a system of the present invention. An embodiment of a dedicated tag of the present invention includes a dedicated tag identity and a dedicated tag identifier, which may be different from an object identity and object identifier (for an object with which the dedicated tag is associated, perhaps in some cases transiently or temporarily). Physiologic data may be sensed before, after, or exclusively during a device's (and presumably the device user's) proximity with the dedicated tag, meaning within a physical distance wherein the device is receiving a wireless signal from the dedicated tag, or within some predetermined maximum amount of time (e.g., one minute from the time when the device last received a signal from the dedicated tag), or within some predetermined maximum distance (e.g., within so many meters of 2-dimensional or 3-dimensional movement from a point in space where the device last received a signal from the dedicated tag), or until some trigger event occurs, such as a certain physiologic data output threshold (e.g., a user's heart rate goes below some predetermined maximum level). Such embodiments of dedicated tags may have identities as represented by their own dedicated tag identifier numbers (which may be distinct from the identities and identifier numbers of associated objects), and dedicated tags may be readily associated with objects. For example, a storeowner may have three dedicated tags and place each of the three tags in three different sections of a store: the clothing section, the home goods section, and the sporting goods section. In this example, when an embodiment of the present invention determines that a device is in proximity to of one of these three tags (and signal strength may be taken into consideration by a device or other proximity determination means to assist in the determination of proximity, or the determination of other data associated with signal strength, proximity or physical closeness or use of an object, for example) and its associated object (e.g., the section of the store), then following such a determination of proximity the device may sense and communicate the physiologic data of a user of the device. This data may be stored for later communication, wirelessly communicated to a remote processor, and/or wirelessly communicated to a dedicated tag or another element of a system of the present invention. In the case that the physiologic data is communicated to a remote processor (along with a device identifier and a dedicated tag identifier, for example), the remote processor may access a database in order to identify an object (e.g., store section, thing, place, experience, person) associated with the particular dedicated tag identifier, and to subsequently correlate the physiologic data with a particular object (store section) that has been associated with the dedicated tag identifier. In such a case, a person or other means would have provided the remote server or database with information about the object (or object identifier) that is associated with the particular dedicated tag (or dedicated tag identifier). In embodiments of the present invention, this may be done for example by means of a secure web site or page than enables a person to register (e.g., enter information about) or select a dedicated tag (possibly by using its dedicated tag identifier), and to then associate the dedicated tag with an object (or multiple objects), and to possibly subsequently modify (change) the object associated with the dedicated tag so that such a dedicated tag of the present invention may be repurposed and used again in association with a different object, for example. In such an embodiment of the present invention, it may be possible to associate a dedicated tag with more than one object, possibly even by providing information (e.g., via a secure web site or page) relating to a particular dedicated tag being associated with a first object while at a first place or during a first time (period), and then being associated with a second object while at a second place or during a second time (period), for example. Or a dedicated tag may be associated with two or more objects simultaneously. An identifier communicated by a tag or an object to a device by means of a wireless signal, for example (such identifier being associable with the identity of the object), may be transformed or translated into another representation or number or signal (e.g., a secondary or alternative identifier), at a device, for example, which may then be communicated to a remote server. Many variations relating to dedicated tags of the present invention, including their technology, form and use, fall within the scope of the present invention.

For clarity, use of the terms near-field communication (NFC), radio-frequency identification (RFID), and other similar concepts and technologies is intended to include any of a wide range of concepts and technologies that enable wireless (e.g., contactless radio) communication between a transmitter and a receiver, such as a tag that transmits a radio signal (whether the signal is actively generated, or passively generated) and a device-associated receiver that receives the signal. Strictly speaking, and relating to embodiments of the present invention, at least some current NFC systems communicate at a frequency of 13.56 MHz and use antennas that are only a few centimeters long, thereby enabling a "near field" with the field very approximately having dimensions that are similar to those of the antenna. This enables communication between the transmitting antenna (e.g., the one with an electromagnetic field pulsing at 13.56 MHz), such as an antenna that is part of a tag that is associated with an object, and a receiving (e.g., passive) antenna, such as an antenna that is associated with a device (notably, an object and a device may both be endpoints, meaning that both may receive and transmit signals in embodiments of the present invention). NFC builds on RFID technology, to the extent that (per some definitions) RFID is primarily intended as a one-way means of communication, e.g., wherein a RFID tag (which may be passive or active) sends a radio signal to a RFID receiver in order to transfer information about the identity of the tag (and thereby facilitate an understanding about the identity of an object with which the tag is associated, e.g., attached to). Embodiments of the present invention may use any NFC, RFID or other similar wireless communication concept or technology, all of which are envisioned as useful to embodiments of the present invention.

The concept of "proximity" may be defined and determined in different ways. For example, one embodiment of the present invention may determine that an object and a device are in proximity to each other in response to determining that the object and device are within a particular linear distance (e.g., 1.0 centimeter of one another), where the embodiment identifies the distance between the object and the device using NFC and/or RFID means. As another example, an embodiment of the present invention may determine that an object and a device are in proximity to each other in response to determining that both the object and the device are within a certain 2-dimensional area or a certain 3-dimensional space (e.g., a "geofence"), such as within a particular retail environment or commercial space as determined by GPS or NFC means. As another example, an embodiment of the present invention may determine that an object and a device are in proximity to each other in response to determining that a radio signal emanating from a tag associated with an object is received at a device. The maximum distance that is used by embodiments of the present invention as the threshold for proximity may be defined in any variety of ways, including distances ranging from 0 centimeters (e.g., an object and a device are physically touching) to distances of meters and more, depending on the intended use of such an embodiment and desired precision of correlation between an object and a device (and/or a user of the device), for example. Other ways of defining proximity and distances between objects may be used, as well. One reason for the wide range is because correlation between the proximity of an object and a device (or a user of the device) and use of an object by a user will vary widely depending on the particular object and use case (e.g., a relevant proximity to a pencil may be different from a relevant proximity to a cargo ship in terms of utility for various embodiments of the present invention). As discussed, proximity may be determined relative to a distance (specific or approximate), presence within a particular area or space (specific or approximate), and more. In addition, any of a variety of proximity determination means, technologies and methods may be used, e.g., RFID, NFC, GPS, camera/optical, etc. Other proximity definitions and determination means and related concepts fall within the scope of the present invention.

Embodiments of the present invention may determine proximity using any of a variety of methods, and by using any of a wide range of possible means to implement such methods, for example. Some of these embodiments may involve multiple (a combination of) methods and technological means. For example, one embodiment of the present invention may use GPS to first identify an approximate location of a device (or that a device is within a certain geographic or spatial boundary or "fence"), and then use a second means, such as NFC, to determine whether the device and an object are in proximity to each other. Such a method may be useful to preserving device battery life during a determination of proximity, for example, as one lower-power consumption means may be used at first, and then (once triggered) a second higher-power consumption means may be used. There are other combinations of means and methods that confer benefits. Such benefits include, but are not limited to: improved battery life, better accuracy, the ability to deal with various types of environments, and the ability to deal with various types of objects. Other variations of means and methods for the determination or establishment of proximity fall within the scope of the present invention.

Embodiments of the present invention may, in addition to determining whether an object and a device (and/or a user of the device) are in proximity to each other, also determine whether an object and a device (and/or a user of the device) are not in proximity to each other (referred to herein as "non-proximity"). Embodiments of the present invention may determine that an object and a device are not in proximity to each other by first determining whether the object and the device are in proximity to each other, and then concluding that the object and the device are not in proximity to each other if the determination of whether the object and the device are in proximity to each other does not indicate that the object and the device are in proximity to each other, for example. As another example, embodiments of the present invention may determine that an object and a device are not in proximity to each other by directly determining whether the object and the device are not in proximity to each other. Embodiments of the present invention may determine that an object and a device (and presumably the user of the device, by extension) are not in proximity to each other by first determining that the object and the device are in proximity to each other at a first time and then determining that the object and the device are not in proximity to each other at a second, later time, i.e., that the object and the device are no longer in proximity to one another (no longer approximated). Such a determination of non-proximity may be made in any of a variety of ways, and by using any of a variety of means. One embodiment of the present invention may determine that an object and a device are in non-proximity to each other by determining that a signal (e.g., an NFC signal, and RFID signal, or other wireless signal) that previously was received from the object (or a tag associated with the object) by the device no longer is being received by the device (e.g., a device associated receiver is out of range from a tag-associated transmitter, and the signal is lost or its strength has been significantly diminished). Another embodiment may determine that an object and a device are in non-proximity to each other in response to determining that a signal (e.g., an NFC signal, an RFID signal, or other wireless signal) that previously was received from the object by the device is still being received by the device but that the received signal has weakened in strength (wherein signal strength at the device is determined to have fallen below some signal strength threshold, or percent of full or the maximum detected signal strength, for example). In yet another embodiment, non-proximity may be determined as following a lapse of a certain (e.g., predetermined) amount of time after initially determining proximity between an object and a device, such as the lapse of 10 seconds, 2 minutes, 1 hour, or the duration of a particular object that is an experience (such as a movie with a known duration of 2 hours 15 minutes, for example). In yet another embodiment of the present invention, non-proximity may be determined by establishing a location at the time that proximity is initially established, and then detecting movement of a user (from one location to another), to thereby determine non-proximity once at least a certain threshold distance is established between a presumed location of an object and a device (and presumably the user associated with the device), for example. Physical separation between an object and a device may be determined at least in part by GPS, RFID, or NFC means, or by accelerometer means, or by any of a range of wireless or optical or electronic sensor means. An example of optical means may be a camera or other optical sensor that is capable of facilitating a detection of the movement and/or the location of a device. Non-proximity between an object and a device may also be determined by any of a variety of other means or methods, such as projected position of a user and/or an object, or movement of a user or device, or a combination of these, which fall within the scope of the present invention. In embodiments of the present invention, non-proximity may also be determined by some (e.g., predetermined) change in at least one physiologic parameter (e.g., heart rate drops below some predetermined threshold, either an absolute threshold or a threshold based on physiologic data from that particular user). Non-proximity may be helpful in order to determine when a device (and presumably a user associated with the device) is no longer close to, or in contact with, or using an object. Non-proximity may, in some embodiments of the present invention, signal a time when user physiologic data no longer corresponds to an object, e.g., the user is (likely to) no longer be with or using the object. In other embodiments, non-proximity may provide a confidence level (e.g., statistical measure of correlation) relating to the correlation (or association) of a user's physiologic data and an object. In other words, proximity determination is valuable in order to determine when an object and a device (and presumably a user of the device) are in proximity to one another, and non-proximity determination is valuable in order to determine when an object and a device (and presumably a user of the device) are no longer in proximity to one another, in embodiments of the present invention. The period of time between an instance of proximity and a (directly following) instance of non-proximity, during which time an object and a device are approximated and physically in proximity with one another, may be called an object-device proximity period, or a proximity interval, or a time or duration of (object-device) proximity, or a similar descriptive term. Object-device proximity periods may be determined in any of a variety of ways, using any of a variety of means, and may be communicated to a remote server in any of a variety of ways, using any of a variety of means. Data about an object-device proximity period may be valuable in embodiments of the present invention (at a server, for example) with regard to an analysis that correlates physiologic data about a user with an object. In one embodiment, an object-device proximity period may be communicated to another element (e.g., a remote server) as a first time associated with a particular object identifier and a particular device identifier, the first time representing a time of establishment of proximity, and a second time associated with the same particular object identifier and the same particular device identifier, the second time representing a time of establishment of non-proximity (such that a remote server may associate physiologic data from a user of the device with the particular object associated with the object identifier during the intervening time period, for example). In another embodiment, an object-device proximity period may be determined by communicating a first location of a device at the time of establishment of proximity, and one or more subsequent locations of the device following the time of establishment of proximity, in which case a remote server (or other element of the present invention), for example, may determine a timeframe during which user physiologic data (of the user associate with the device) will be linked to or associated with the particular object. Notably, object-physiologic data linking or correlation (by a remote server processing data, for example) does not need to be binary, meaning correlated with proximity and not correlated with non-proximity; as one alternative, such correlation may also be performed by scaling (or giving higher or lower priority to) physiologic data that is sensed while a device is closer to an object, e.g., physiologic data sensed while a device and user are closer to an object is given a higher weight than physiologic data sensed while a device and user are farther away from the object. In yet another possible embodiment, the proximity period may be determined by a means of communicating or otherwise indicating a time of initial proximity between an object and a device, followed by a lapse of time (e.g., a predetermined amount of time) which thereby signals or causes a determination of non-proximity. An example of a situation where this embodiment may be especially useful is when proximity is determined by means (e.g., NFC, RFID) that are associated with a product's packaging, yet the product is used or consumed after being unpackaged (e.g., a can of soup, wherein a user comes into proximity with the can containing the soup, and then proceeds to open the can, cook and consume the soup which may be physically distant from the can with the tag, from example, yet more relevant in terms of understanding the user's physiology, e.g., while the user is in proximity with the soup, rather than the can, such as when the user is cooking or eating the soup). In embodiments of the present invention, determination of proximity and/or determination of non-proximity may be achieved passively, e.g., without input or action by, or knowledge of, a user of a device. In other embodiments of the present invention, determination of proximity and/or determination of non-proximity may be achieved actively, e.g., with input or action by, or knowledge of, a user of a device. In a similar way, sensing of a user's physiologic parameters and/or communication of a user's physiologic data may be achieved passively, e.g., without input or action by, or knowledge of, a user of a device. Alternatively, sensing of a user's physiologic parameters and/or communication of a user's physiologic data may be achieved actively, e.g., with input or action by, or knowledge of, a user of a device. A variety of means and methods of determining and communicating proximity, non-proximity, proximity period or proximity interval, and for establishing pre-proximity and post-proximity (described below), along with related concepts, are useful for various embodiments of the present invention and fall within the scope of the present invention.

In embodiments of the present invention, means and methods for determination of non-proximity may be different from those used to determine proximity. For example, GPS or NFC means may be used to determine proximity, and then visual or timer means may be used to determine non-proximity. Other combinations of means and methods may also be used to determine non-proximity, and fall within the scope of the present invention. In addition, embodiments of the present invention may use combinations of means and methods to perform or achieve what is sometimes described herein relative to a single means or method. Such combinations fall within the scope of the present invention.

Two other concepts relating to proximity are those of pre-proximity (the time when a user is approaching an object, but is not yet in proximity with the object) and post-proximity (the time following when a user has been in proximity with an object, but is no longer in proximity with the object). Pre-proximity and post-proximity are two periods of time during which embodiments of the present invention may perform physiologic monitoring (e.g., sensing of physiologic parameters about a user and the communication of related data to a remote server, for example) in ways that are especially valuable, such as by comparing the user's physiology before and during proximity to an object, or during and after the user's proximity with an object, or before and after a user's proximity to an object, or before, during and after the user's proximity with an object. Embodiments of the present invention may apply pre-proximity and post-proximity in ways that are categorical (e.g., either a user or device is in a state of pre-proximity or proximity or post-proximity relative to an object) or continuous (e.g., a gradual transition between each of the three states that depends on, and correlates with, the distance between a device and an object, for example). Furthermore, pre-proximity may be determined by embodiments of the present invention either actively (e.g., in real-time), or retroactively (e.g., during an analysis of data, such as data that correlates the distance between a device and an object with physiologic data). Pre-proximity and post-proximity may be determined in any of a variety of ways and using any of a variety of means, including but not limited to the use of signal strength of a signal transmitted by a tag associated with an object (e.g., as may be detected by a receiver at a device), or by means of an analysis of a device's location relative to a location of an object. Various means and methods associated with determination of pre-proximity, proximity and post-proximity fall within the scope of the present invention. The two concepts of pre-proximity and post-proximity are distinct from a user being distant from (not in proximity with) an object, during which time physiologic data (or other data)

may be sensed by embodiments of the present invention to establish a baseline of physiologic data, for example. A user's baseline (or average) physiology may be quite different from the user's pre-proximity physiology (e.g., possibly occurring in an environment that is more like that which a user experiences during proximity, e.g., in the same store but not in proximity with a particular object of interest, e.g., a specific product), which may be different from proximity physiology (e.g., a user's physiology during a period of time when the user is in proximity with the object), which may be different from the user's post-proximity physiology (e.g., following an interaction with the object). By differentiating these periods of time, embodiments of the present invention may compare and contrast a user's physiology (or the physiology of multiple users) at different stages or points in (or periods of) time relative to a user's (or multiple users') interaction(s) with an object. Such analyses may be helpful to determine how users respond uniquely or differentially to a particular object, for example. Understanding the physiology of one or more users before an interaction (e.g., pre-non-proximity) with an object, during pre-proximity with the object, during proximity with the object, during post-proximity with the object, and/or following the interaction with the object (e.g., post-non-proximity) may be of significant value and may offer benefits, such as the ability to analyze physiologic data of one (or many) users at these times, and to understand how an object is used, perceived or valued, or how to make the object better (e.g., how to better design or provide a better object in order to create an improved user experience, for example). The concepts of non-proximity, pre-proximity, proximity and post-proximity may enable other benefits useful to embodiments of the present invention, as well.

Embodiments of the present invention may use the binary concepts of proximity and non-proximity. Additionally or alternatively, embodiments of the present invention may use the concept of degrees of proximity, or some other non-binary quantification or measure or indication of proximity. In one embodiment, a degree of proximity is a measure of physical closeness between an object and a device. In one embodiment, a degree of proximity may be represented by a number or quantity, such as a number from 0 to 100, whereby the number represents the percent of closeness (e.g., a percent of a predetermined fixed distance, wherein 1000 would represent the full distance and 0 would represent the object and device touching, for example), or such as 1 divided by the square of the distance between an object and a device, for example (wherein the farther the object and device are separated, the smaller the number). Such a degree of proximity may be determined and calculated by a device and communicated to a remote processor, for example, or raw data may be communicated to a remote processor and calculated at the remote processor, for example. Other non-binary (e.g., tiered, graduated, continuous) means and methods for determining or expressing a degree or extent of proximity fall within the scope of the present invention and may be useful to embodiments of the present invention.

Embodiments of the present invention may make use of a proximity determination module. A proximity determination module may be a system and associated processes or methods that is capable of determining if proximity between an object and a device exists, for example. A proximity determination module may also, in another embodiment, determine when proximity between an object and a device exists, for example. In yet another embodiment, a proximity determination module may determine the actual proximity (in a measure of distance or otherwise) between an object and a device. Notably, embodiments of such proximity determination modules may make use of any of the elements and processes described, including but not limited to: RFID, NFC and GPS technologies, optical sensing and analysis technologies, a processor associated with the module or the device, and more. An embodiment of a proximity determination module may communicate data about the proximity between an object and a device to a device (and embodiments of a proximity determination module may be an element of a device, e.g., built into the device), or directly to a remote server or processor. Such communication between a proximity determination module and a device may be performed via wires or wirelessly, for example. Any communication between a proximity determination module and a remote server or processor may be performed wirelessly, for example. Such communication may use any of a variety of data communication protocols and methods, and the data may be sent in raw form, encrypted form, compressed form, or otherwise. A proximity determination module may, in embodiments of the present invention, collect additional data, such as an object identifier, and such additional data may also be communicated from the proximity determination module to a device. The above examples of various proximity determination modules and their characteristics are intended to be illustrative, and other embodiments of proximity determination modules fall within the scope of the present invention.

For clarity, devices and sensors of the present invention are separate and distinct from objects of the present invention. This enables the possibility of proximity and non-proximity between a device and an object. A device is distinct from an object only if: (1) the device does not contain the object; (2) the object does not contain the device; and (3) the device and the object are not physically attached to each other. Similarly, a sensor is distinct from an object only if: (1) the sensor does not contain the object; (2) the object does not contain the sensor; and (3) the sensor and the object are not physically attached to each other.

An identifier is information that facilitates the identification (knowledge about the identity) of an object. In embodiments of the present invention, an object identifier may be communicated as a signal, such as a signal sent from a RFID tag to a device (received by the device). An identifier may include information relating to the singular or categorized identity of an object. A few examples of singular identities are (without limitation): a precise item identifier (e.g., a unique code associated with a specific single item) such as a unique identifier associated with a particular Hershey's chocolate bar; or possibly a location identifier (e.g., a unique store, room, seat or location number) such as a unique identifier that communicates the identity of a specific seat at Fenway Park in Boston, or possibly a vehicle identification number (VIN) that represents the identity of a single car, etc. A few examples of categorized types of identities of an object are (without limitation): the non-specific name or branding of an object (e.g., McDonalds Restaurant) that doesn't specify the particular restaurant location; a brand of an object (e.g., Nike, Toyota) that doesn't specify the particular object; the type of object (e.g., bag of potato chips) that doesn't specify the brand or model or particular unit of an object, etc. The foregoing examples are not intended to be limiting in any way, and many other examples of the concept of identity of an object, and the concept of identifiers that relate to an identity of an object, fall within the scope of the present invention.

An object's identity is communicated (e.g., to a device) by means of identifier data. Identifier data may, in various embodiments of the present invention, be direct, meaning the identifier data communicates the identity of an object in a readily interpretable form, such as the exact name of the object (e.g., Levi's 505 jeans). As an alternative, identifier data may, in various embodiments of the present invention, be indirect, meaning the identifier data communicates an identity of an object in a way that may require processing, interpretation, decoding, and/or reference to a database in order to identify the object identity (e.g., identifier is the code 3Gd8sCt5r, that when referenced against a database of object numbers and corresponding identities, reveals the identity of the object). Object identifier data may be a single string of information, or multiple units of information (for purposes of security, reliability, or otherwise). Representative examples of direct identifier data are, without limitation, a unique number or code that represents a specific physical location or store; or a unique number or code that is associated with a specific unit of product. In one embodiment of the present invention, the identifier data is communicated wirelessly to a device, and such communication may be performed either concurrently with, or separately from (before or after), any determination of proximity. For example, when a RFID tag is used to facilitate the determination of proximity, the RFID tag may (concurrently) communicate identifier data. In other embodiments of the present invention, proximity and object identification may occur separately. For example, a first wireless interaction may facilitate determination of proximity between an object and a device, which may then trigger a second wireless communication to secure identifier data (or even additional identifier data) relating to the object. In embodiments of the present invention, object proximity data and/or object identification (identifier) data (and any other information or data communicated between elements of an embodiment of the present invention) may be encoded, secured, or controlled (e.g., access to such data might only be provided following device or user authentication, or following some security protocol, for example). The sharing of identifier data between an object (or object-associated element) and a device may be facilitated by a wireless technology, radio, optical, sound or electromagnetic means, including any of a variety of current or future technologies, or combinations of these. The foregoing examples should not limit the present invention in any way, and other embodiments of object identification and object identifier data fall within the scope of the present invention.

As previously discussed, embodiments of an object may have an object identifier. As an alternative, an object may be associated with a dedicated tag that has a dedicated tag identity and dedicated tag identifier. In this latter case, a person or other means provides information to a remote server or database or other element of a system of the present invention that associates or affiliates a particular object (or object identifier) with a particular dedicated tag (or dedicated tag identifier). A tag may be an "object" as that term is used herein. An "object," as that term is used herein, may include both an object and an associated tag.

The "identity" of an object is distinct from an "identifier" of the object. An object's identity includes properties of the object itself. An identifier of an object is data representing one or more properties of the object. For example, an object may be a specific unit of a specific brand and a specific model number. The identifier of such an object may be data (e.g., text and/or numbers) representing any one or more of the following: the specific unit (e.g., using a unique serial number), the model (e.g., using a model number or style description), and the brand (e.g., using a brand name).

In one embodiment of the present invention, an object is physically connected with a NFC transmitter, RFID tag, and/or other proximity determination enablement means. In such an embodiment, the proximity determination enablement means may, for example, be attached to the surface of an object, built into an object, embedded within an object, or printed onto an object. Such proximity determination enablement means may be permanently associated with an object, or temporarily associated with an object. In another embodiment of the present invention, an object is not physically connected with a NFC transmitter, RFID tag, or other proximity determination enablement means. An example of such an embodiment is a room with machinery, whereby the machinery is the object and the proximity determination enablement means is positioned by an entry to the room or on a wall or other surface nearby the machinery (the object), rather than attached to the particular piece of machinery. Other such arrangements fall within the scope of the present invention.

Embodiments of the present invention may detect an object or determine the identity of an object (or both, which may be done concurrently), by any of a wide range of means other than RFID, NFC and similar wireless communication technology. In embodiments of the present invention, the detection of an object and/or determination of an identity of an object by a device of the present invention may be achieved by means of a sensor that is an element of (or associated with) the device. For example, a camera or other optical sensor associated with a device may be used to detect an object (and if the object is in proximity with the device, e.g., by virtue of detection of the object alone, or by determination of the distance between the device and the object, for example). A camera or other optical sensor may also be used to determine the identity of an object. This may be done by means of indicia or other marks on, or enhancements to, the object, such as a bar code or other optically readable code, or by any of a variety of other means that enable detection and/or determination of proximity and/or identification of an object. A determination of the identity of an object may also be achieved by image analysis, for example, including but not limited to image capture that creates an image that may be analyzed and compared with features or characteristics (possibly using a database of such features or characteristics of various objects) of other objects in order to determine the identity of the object in the captured image. Other means of detection of proximity and determination of an identity of an object may be used that involve the sensing of sound (e.g., an acoustic signal or profile of an object may be sensed by a sensor associated with a device in order to determine the identity of the object, with the aid of a database of sound profiles of various objects, for example). In yet other embodiments of the present invention, means of detection of proximity and determination of an identity of an object may involve the sensing of smells or odors, which may (for example) be compared with other smells or odors (in a database of smells or odors, for example) in order to determine the identity of an object. As may be seen from these examples, there are many ways in which the proximity between a device and an object may be detected, and many (often the same or similar) ways in which the identity of the object may be determined. In instances of the present invention, the ability of a device to determine the identity of a nearby object may serve as a proxy for a determination of proximity. Some means and methods of the present invention for the detection of proximity, and for the determination of the identity of an object (by a device, for example) use wireless communication technology, such as the use of RFID or NFC, for example. Other means and methods of the present invention for the detection of proximity, and for the determination of the identity of an object (by a device, for example) use other technology, sensors, cameras, detectors, means or methods. These other means and methods may involve the sensing of visual, optical, tactile, auditory, smell, odor or other parameters or phenomena of an object (using sensors or sensor modules appropriate for the sensing of such parameter or phenomena). The ability of embodiments of the present invention to use one or more means and methods of detection of proximity (and also non-proximity), and to use one or more of the same or different means and methods in order to determine the identity of an object, enable many benefits of the present invention. For example, the use of multiple types of sensors to determine the identity of an object (e.g., a wireless sensor and an optical sensor) may increase the confidence level of an identification, meaning the complementary means of identification may increase the probability that an identification of an object is correct.

Various means may be used to secure wireless communication between elements of embodiments of the present invention, including but not limited to the use of secure socket layer (SSL), encryption, tokens and tokenization, and more. Embodiments of the present invention may confirm, authorize or authenticate an object identity, a device identity, or an user identity by cross-checking data with other information, e.g., data in a database, or data that confirms that a device is in a particular place at a particular time (e.g., where it should be, or where it is expected to be), for example. Various other authorization, authentication, confirmation, verification and/or validation protocols may be used by various embodiments of communication and other means of the present invention.

In embodiments of the present invention, physiologic parameters may be any user-associated feature, state, attribute, activity or behavior that can be sensed, measured, quantified, detected, and/or determined. In other possible embodiments of the present invention, physiologic parameters may be limited to elements of human physiology that may be sensed using sensors, or otherwise tracked or measured by sensing or other tracking or measurement means. Examples of physiologic parameters include, but are not limited to: heart rate (pulse), breathing (respiration) rate, body temperature, blood pressure (e.g., systolic and diastolic), blood chemistry (e.g., level of epinephrine, specific endorphins, specific hormones, glucose, salt, or other blood constituents or blood-borne elements), movement (generally or of specific muscles or muscle groups, e.g., detection of eye muscle movements or facial expressions), speech (presence, rate, volume, pattern, words, etc.), mental state, level of consciousness, wake state, sleep stage, brain (wave) activity, emotional state (e.g., level of happiness or sadness), and more. Another list of physiologic parameters that may be sensed by device-associated sensors of embodiments of the present invention may include (but are not limited to) the following: calories used (e.g., burned), blood biotin level, blood alcohol content, blood glucose, blood pressure, body temperature, blood caffeine level, blood calcium level, blood chloride level, blood chromium level, blood copper level, blood cholesterol level, electrodermal activity or measurement, blood folate level, forced expiratory volume, forced vital capacity, heart rate, blood iodine level, bold iron level, blood magnesium level, blood molybdenum level, fat composition of a tissue, blood monounsaturated fat level, blood niacin level, falls or other adverse events, blood oxygen saturation level, blood pantothenic acid level, peak expiratory flow rate, peripheral perfusion index or other measurement, blood phosphorus level, blood polyunsaturated fat level, blood potassium level, protein measurement in a body fluid or tissue, respiratory rate, blood riboflavin level, blood saturated fat level, blood selenium level, sleep state or other measurement of sleep or rest, blood sodium level, quantity and quality of steps or other movement, blood sugar level, blood thiamin level, a measurement or level of one or more vitamins (e.g., vitamin A, vitamin B6, vitamin B12, vitamin C, vitamin D, vitamin E, vitamin K), a measurement or level of one or more minerals, body weight, blood zinc level. Any of the physiologic parameters for which blood levels are noted above might also be measured in other tissues. In embodiments of the present invention, physiologic parameters may be sensed, tracked, measured, monitored, detected or determined by any of a variety of sensor means (sensors) that are associated (built into or communicating) with a device. Embodiments of sensor means may be positioned at a surface (e.g., positioned at a body surface, such as on the skin) of a user, embedded or implanted within the body of a user, or positioned apart from (not touching or even readily apparent to) a user. Other sensor means locations or positions are readily possible. Examples of sensor means include, without limitation: heart rate sensor, respiration sensor, body temperature sensor, blood chemical sensor, etc. Specific sensor means may detect or measure any one or more of the above physiologic parameters. Sensors may use any of a variety of concepts and technologies in their operation, including but not limited to electronic sensing elements, light and/or optical sensing elements, microfluidics, reagents, any of a variety of specific antibodies, mechanical sensing and other elements, video, vibration sensing, accelerometers, and more. Sensors may output raw data, and/or the output may be processed (e.g., analyzed), with any such processing taking place possibly at the sensor, at the device, or remotely, such as at a remote server. In embodiments of the present invention, sensor means may be built into a device or connected to a device, physically separate from a device (and communicating with the device, e.g., by wireless means), or remote and distinct from a device (e.g., user movement detection means that remains stationary in a room, for example). Other types and arrangements of sensing elements sensors fall within the scope of the present invention.

Embodiments of the present invention use sensors to detect, determine, monitor, and/or track physiologic parameters of a user of a device. Embodiments of sensors may exist in any of a wide variety of types, forms, and formats. A few examples of sensors include, without limitation: heart rate (pulse) sensor, temperature sensor, galvanic skin response sensor, heat flux sensor, blood pressure sensor, respiration rate sensor, movement sensor, accelerometer, blood chemistry sensor, and many others. Embodiments of sensors may incorporate technologies that are electrical (or electromagnetic), mechanical, chemical, or some combination of these. Embodiments of sensors may be positioned at the surface of a user's body, within (e.g., embedded or implanted) within a user's body, or located remote from a user's body and not physically touching the user's body. Sensors may, for example, be integrated with other elements, casings, holders, straps, wrist-worn devices, clothing, headgear, and hats, for example. Sensors may also, for example, be permanent, temporary, disposable, or replaceable. Embodiments of sensors may communicate with other elements of the present invention (e.g., a device) either using wires or wirelessly (e.g., with Bluetooth). Embodiments of sensors may also be smart, adaptable, remotely capable of being calibrated (or recalibrated), include onboard processors, include electronic storage, and/or receive data or instructions or commands from another element of the present invention. Overall, many different types, kinds, formats, forms, shapes and sizes of sensors are (and will become, as sensor technology continues to evolve) available, utilizing a diverse range of technologies and operational means. Any such sensor that is capable of sensing one or more physiologic parameters (or generating physiologic data) relating to a user may be used and falls within the scope of the present invention.

Embodiments of the present invention may sense one or more of the following physiologic parameters by means of the following sensors, without limitation: heart rate sensed by means of a heart rate sensor, e.g., electrocardiogram (ECG); respiration rate and possibly other respiratory features sensed by a respiration sensor, e.g., respiratory inductive plethysmography band placed at the rib cage; skin conductive response by means of a skin conductive response sensor, e.g., electrodes placed at the surface of the skin; skin (body surface) temperature by means of a temperature sensor, e.g., surface probe thermistor; muscle contractions by means of electromyography or electrooculography, e.g., by means of a capacitive bioelectrode; brain wave activity by means of electroencephalography, e.g., using a hybrid (capacitive or resistive) bioelectrode; movement of a body or limb by means of an accelerometer or other motion detector, which may include the use of a camera or optical detection means; arterial blood pressure by means of an arterial blood pressure sensor, e.g., continuous non-invasive blood pressure monitor; blood glucose by means of a blood glucose sensor, e.g., non-invasive, semi-invasive or subcutaneous continuous blood glucose monitor; blood electrolyte levels by means of a blood electrolyte sensor, e.g., continuous non-invasive blood electrolyte sensor; and any other physiologic parameter by means of a sensor that is capable of sensing (testing, detecting, monitoring, tracking, quantifying, qualifying) the particular physiologic parameter. Many physiologic parameters may be of interest, and embodiments of the present invention may include sensors for such physiologic parameters (along with others not mentioned above), as well as possible associated technology such as signal amplifiers, signal filters, processing means, wireless transmitters, receivers, and more. Many variations of physiologic sensors exist and their use falls within the scope of the present invention.

In embodiments of the present invention, sensing of at least some (if not all) of the physiologic parameters being monitored is performed by device-associated sensors passively, in the background, without interrupting the user (in a way that is noticeable by a user, for example) while the user's physiologic parameters are being sensed. For example, embodiments of the present invention may include a light-based sensor, possibly integrated with a wrist worn device, wherein the light-based sensor is positioned facing the skin of a user and uses light to determine the user's (the device wearer's) pulse, without the user feeling any sensation or being disrupted (by virtue of the sensor emitting light) in any significant way during the sensing of the pulse. Alternatively, an example of a situation whereby a user may be disrupted is if an alarm (e.g., sound) alerts the user to a need to actively provide input to a device (e.g., by means of touch, speech, movement). In embodiments of the present invention, the sensing of most (or all) of the physiologic parameters being sensed may be conducted passively, in the background, without the user being aware that relevant sensors are sensing these physiologic parameters, and without requiring active input by a user of a device of the present invention. Active input might involve, for example, a manual entry to a keypad or touch screen display of information in response to a prompt, or alternatively a voice input in response to a prompt, such active input involving thought and action by a user. In addition, embodiments of the present invention may, alongside the sensing of a physiologic parameter, notify the user (e.g., by a sound or alarm) that the physiologic parameter is being sensed. Embodiments may also signal to a user that the physiologic parameter has stopped being sensed (e.g., a light indicator that was on to indicate sensing may then be turned off to indicate that the sensing has stopped).

Physiologic data may be used by elements of embodiments of the present invention to identify, generate, and/or learn other information. In other words, embodiments of the present invention may transform physiologic data into non-physiologic data by any of a variety of analyses or other means, such to be performed at a processor (either at a device or remotely, e.g., at a remote server), for example. For example, embodiments of the present invention may analyze (e.g., subject to a particular algorithm) raw physiologic data about a user's heart rate, respiration rate and blood pressure and, based on the analysis, provide new information about a user's level of stress, or a user's sleep/awake status (or stage of sleep), or some other information that was not communicated as raw data (or that could be ascertained by the raw data), or that requires integration (e.g., combination) of data relating to two or more of a user's physiologic parameters, or that requires integration (or some form of combination) with other non-physiologic data, e.g., data that comes from a database of other user data. Another example of the transformation of raw physiologic data into other useful information is the use of brain wave information to detect a person's emotional state. Another example of a use of a user's physiologic data to learn or determine other new and useful information is the use of multiple (e.g., 6) physiologic parameter data streams relating to a user that is in proximity to a secure object that requires user identity authentication in order to allow the user to use the device, for example, to thereby determine (or authenticate, validate, confirm, etc.) that the user is a user who is permitted to use the secured object. If this is determined (that the user is permitted to use the secured object, by means of the user's unique physiologic "fingerprint" as determined by the sensing and/or analysis of a user's physiologic parameters while the user is in proximity with the object), information may be communicated to the object and used by the object to enable the user's use of the object. Communication with an object to enable its use may involve communication with some other element or technology associated with the object (or alternatively, the object and any associated actuator or modifier may, for example, be considered one and the same in these embodiments of the present invention). As an example of this, a piece of construction equipment may be permitted to be operated only by person X. If an embodiment of a system of the present invention senses a user's physiologic parameters while the user is in proximity to the heavy equipment, and the system determines that the user's physiologic parameters are consistent with those of person X, then the system may permit person X to use the equipment, e.g., by enabling an ignition switch. Many other such use cases, involving physiologic fingerprints, and similar physiology-based qualifications that (via a system of the present invention) enable some action at an object, for example, fall within the scope of the present invention.

Embodiments of the present invention may involve or use embodiments of a physiologic fingerprint (or "identity"), meaning a set of physiologic data about a user that uniquely correlates with, corresponds to and/or relates to a particular user's unique identity, similar to a fingerprint or what is commonly referred to as a "genetic" fingerprint. In this case, embodiments of the present invention may sense and communicate physiologic data about a particular user to a remote server for analysis. The physiologic data may relate to one or more physiologic parameters of a user at one or more instances in (or periods of) time. Embodiments of the present invention may then analyze the physiologic data to determine whether (or not) it uniquely correlates with, corresponds to and/or relates to that user's identity (or alternatively, any user's unique identity, in the case that the user identity is not previously known, or if the purpose is to determine an identity associated with the physiologic data set). One embodiment of an analysis involves comparing the physiologic data being provided about a particular user with past physiologic data (at least about that particular user, and possibly about other users) in order to determine a degree of similarity (of the raw data, or manipulated data, or various ratios between elements of data, etc.) and if there is a match, meaning that the physiologic data provided (e.g., by a device about a user associated with the device) correlates with, corresponds to and/or relates to the past physiologic data, thus possibly confirming (with some determinable level of sensitivity and/or selectivity) or otherwise providing information about a user's unique identity. A confirmation of a unique physiologic fingerprint may, for example, cause a remote server to provide output or instructions to an object or object controller, in order to enable the user to use or control or access the object (e.g., secure door, lock mechanism, equipment), for example. A physiologic fingerprint may also be useful to enable a payment transaction, by providing (a primary or complementary) means for verifying a person's identity, for example. Embodiments of a physiologic fingerprint may, as mentioned, involve one or more physiologic parameters (that are sensed, with associated data being communicated to a remote server of the present invention) at one or more times, etc. Many variations of the concept and use of a physiologic fingerprint fall within the scope of the present invention.

Physiologic data about a particular user may also indicate that user's physiologic state, meaning a state or condition of the user that is associated with particular body physiology. A physiologic state may be helpful to understand a user, and to enable embodiments of the present invention to provide benefits to the user. Physiologic data may further enable embodiments of the present invention to identify a user's actions or behaviors, such as a physical action (e.g., a user is running) or a behavior (the word "behavior" meaning an action or set of actions, or mannerism or set of mannerisms, generally in response to a stimuli or external input, e.g., an object or its use). Embodiments of the present invention may interpret, analyze, extrapolate, and/or otherwise use or process a user's physiologic and possibly other data (or the aggregated data from multiple users) in order to (possibly associated with a confidence level, as described below) make hypotheses, reach conclusions, and/or take actions. An example of a hypothesis may be hypothesizing that a group of users who have interacted with an object desire to have a better experience while interacting with the object, which may lead the owner or controller of the object to take certain actions, for example. An example of a conclusion may be that a user is in (physiologic) distress and requires some assistance or beneficial action to be facilitated or taken. An example of an action may be communicating information to a user by means of the user's device, such as a smart phone, or causing an object controller to control an object in some way.

Physiologic data may be processed by a device of the present invention to generate new data in embodiments of the present invention, e.g., summary data or derivative data (these three terms are used interchangeably). For example, multiple physiologic parameters (e.g., heart rate, respiration rate, blood pressure) of a user may be sensed by sensors associated with the user and a device, and the device may receive physiologic data about each of these physiologic parameters. Then, using the values of each of these flows of physiologic data, the device may process the data to generate a new type or element of data, for example. In one embodiment of the present invention, for example, the heart rate, respiration rate and blood pressure of a user may be sensed, and this data may be communicated from each sensor to a device, and the device may process such data to create a single value (or single value per unit of time, e.g., per minute) that represents a new type of data, such as a user "stress level" or "satisfaction measure" or "happiness metric," or some other summary or derived measure of a condition or state of a user at a point in time (such as a point in time or a period of time during which the user is in proximity with an object). Summary data or derivative data may be generated by subjecting the raw data (e.g., physiologic data being sent from the sensors to the device) to an algorithm or a formula or an analysis, for example. One possible example of such a formula is to multiply heart rate times two, add the respiration rate times three and then multiply this quantity times the ratio of the systolic and diastolic blood pressures. Such generation of a summary data element (or elements) or derivative data element (or elements) may be useful to limit the amount of information that needs to be wirelessly communicated to a remote server, for example. Additionally, such generation of a summary data element (or elements) or a derivative data element (or elements) may help to protect user information or privacy by limiting the quantity and/or type of information that is communicated to a remote server, for example. Embodiments of the present invention may use other means and methods to create new data elements based on combinations of physiologic (and possibly other) data to provide these and other benefits.

Physiologic data (and any other data that may be generated or used by embodiments of the present invention) may have an associated confidence level, meaning a probability or other statistical measure that indicates (or relates to) reliability of the information. Confidence levels may be associated with particular data, and communicated and/or used to determine actions, such as a remote server providing a suggestion to a user by means of the user's device. Confidence levels associated with data, and other statistical means that indicate the reliability, accuracy or other attributes of data created or used by embodiments of the present invention, fall within the scope of the present invention. In certain embodiments, a confidence level is specified based on the known accuracy or reliability of a particular sensor. Physiologic data may include data representing a confidence level associated with the physiologic data.

In various embodiments of the present invention, a device may wirelessly communicate information in addition to (or other than) physiologic data and object identifiers. For example, and without limitation, a device may also communicate data relating to the identity of a device (e.g., a device identifier), the identity of a user of (or associated with) a device (e.g., user identifier), a device location (at a particular time), a device movement, any of a variety of parameters that may be measured by a device beyond the physiologic parameters discussed above, such as ambient temperature, noise levels, acceleration, etc. While such information may be sensed at or generated by the device, other means and methods for sensing or generation are possible. Such data may be communicated, concurrently or separately, from a device to a remote server, for example. Data, including but not limited to physiologic data, object and device identifier data, and non-physiologic data, may be used by a remote server, for example, for purposes of processing, analysis and/or output.

In general, embodiments of the present invention sense a user's physiologic parameters in order to relate such physiologic information with a particular object. This may further enable an understanding of a user's physiology during interaction with an object (or the physiology of many users during many separate interactions with a particular type of object, for example). Embodiments of the present invention may sense, store and communicate physiologic data relating to a user at any time or times. In one embodiment, such data is sensed and then communicated at significantly the same time (e.g., within 1, 2, 5, or 10 milliseconds of data creation). In another embodiment, data may be sensed and stored in electronic memory, and then communicated to a remote server or otherwise at a later time. Storing of physiologic data may be preferable when wireless transmission is not possible (e.g., no signal), or to conserve bandwidth or battery life of a device, or to enable processing at the device prior to transmission, or for any of a variety of reasons. In one embodiment, physiologic parameters may be sensed during an instance (or multiple instances) of proximity between a device and an object. In another embodiment, physiologic parameters may be sensed during a time (or times) preceding the determination of proximity between a device and an object. In yet another embodiment, physiologic parameters may be sensed following a time (or times) of proximity between a device and an object. Likewise, communication of such data or information (e.g., physiologic parameter data, identifier data) may be communicated during, preceding and/or following a determination of proximity between a device and an object. The sensing, storing, processing, communicating, etc. of data preceding and/or following times of proximity between a device and an object may be used to determine a baseline of physiologic data, which may be helpful to determine a change or pattern or other information of interest. The foregoing examples are not intended to be limiting in any way, and other examples of physiologic parameters, sensor means, sensed data, and sensed data handling concepts fall within the scope of the present invention.

Physiologic data relates to the data sensed by a sensor (e.g., relating to a physiologic parameter). A sensor may sense a physiologic phenomenon and generate, based on that sensing, data representing the physiologic phenomenon. Such data is an example of what is referred to herein as "physiologic data." The sensor may output such physiologic data. The sensor and/or other components of embodiments of the present invention may receive, process, and output physiologic data in raw form (e.g., data points) and/or process raw physiologic data (e.g., multiple units of physiologic data sensed from the same person and/or multiple people) to produce processed physiologic data (e.g., a statistical mean of a set of multiple data points). Furthermore, the sensor and/or other components of embodiments of the present invention may receive, process, and output physiologic data directly (e.g., the bit data output from a sensor) or indirectly (e.g., by encrypting, encoding, analyzing, consolidating or otherwise processing physiologic data, or receiving physiologic data after it has been so processed, such as for security or for more efficient communication of large amounts of data). At any time a physiologic parameter is being sensed, detected, or measured, this may be done at a single instance (moment) in time, at multiple instances over time (e.g., during the entire time during which an object and a user are in proximity), and/or at intervals (e.g., one instance per minute). Embodiments of the present invention may predetermine sensing intervals and base them on an amount or lapse of time, or may trigger sensing intervals in response to an event or based on an algorithm. Embodiments of the present invention may regard multiple instances of sensing at close intervals as being continuous (or, in fact, the sensing may actually be continuous, irrespective of the frequency of output data). Examples of triggering events may be, without limitation, proximity with an object, a movement of a user or change in a physiologic parameter that is being sensed (e.g., a user's heart rate goes up which triggers for other physiologic parameters to then be sensed or monitored), location of the device, user action or behavior, or in some embodiments input from a user (e.g., indication or signal), and more. The foregoing examples are not intended to be limiting in any way, and other examples of sensing concepts fall within the scope of the present invention.

Embodiments of the present invention may communicate data and information sensed, created, or used by elements of such embodiments to other elements of such embodiments, including possibly to a remote server. In one embodiment, a remote server is a computer or other electronic information processing device that runs one or more applications (e.g., software) capable of receiving requests from a client (e.g., a device) and responding accordingly, such as by doing some type of processing of the request and subsequently sending a response back to the client, or to yet another element of a system of an embodiment of the present invention, for example. Embodiments of servers may have different configurations and architectures, and may make use of different software, languages, code, communication protocols, and more. A remote server may be a single physical unit (or application run on a unit), or it may be spread out or distributed such that various of its actions are parsed or handled by different processors possibly running different software applications, for example. In one embodiment, a remote server is physically separate and distinct from a device, and such a remote server may communicate with a device, at least in part via wireless communication means. A remote server may communicate with a network (possibly to enable wireless communication with a device of the present invention, for example), with electronic memory or data storage devices, and with other computers, devices and hardware. Embodiments of remote servers may use a wide range of technologies, services, protocols, designs, architectures, and strategies. Examples of the wide variety of remote server embodiments include, but are not limited to, cloud-based servers (e.g., Amazon Web Services), a desktop or laptop or portable computer acting as a server, a co-located server, and more. Servers are in a constant state of development and improvement and all of these servers fall within the scope of the present invention. According to Wikipedia (www.wikipedia.org), "a server [as software] is a running instance of an application (software) capable of accepting a request from the client and giving a response accordingly. Servers can run on any computer or dedicated computer, which is also often referred to as the "server" [as hardware]. In many cases, a computer can provide several services and have several servers running. The advantage of running servers on a dedicated computer is security. Servers operated within a client-server architecture. Servers [as software] are computer programs running to serve the requests of other programs, the clients. Thus, the server performs some tasks on behalf of clients. The clients typically connect to the server through the network but may run on the same computer. In the context of Internet Protocol (IP) networking, a server is a program that operates as a socket listener. Servers often provide essential services across a network, either to private users inside a large organization or to public users via the Internet. Typical computing servers are database server, file server, mail server, print server, web server, gaming server, application server." Wikipedia goes on to say that, "The term server is used quite broadly in information technology. Despite the many server-branded products available (such as server versions of hardware, software or operating systems), in theory any computerized process that shares a resource to one or more client processes is a server."

Embodiments of the present invention may time stamp any one or more of physiologic data (e.g., by associating time data with specific instances of physiologic data), device location data, object location data, and device-object proximity data. For example, physiologic data may include timestamp data representing the time(s) at which the physiologic data was generated, transmitted, and/or received. As another example, device location data may include timestamp data representing the time(s) at which the device location data was generated, transmitted, and/or received. For example, device location data may include data representing a location of a device and timestamp data representing a time at which the device was at the location or was determined to be at the location. Similarly, object location data may include timestamp data representing the time(s) at which the object location data was generated, transmitted, and/or received. For example, object location data may include data representing a location of an object and timestamp data representing a time at which the object was at the location or was determined to be at the location.

Such time stamping may be useful to enable a remote server (to which such data is wirelessly communicated) or other component of the present invention to process the data or perform an analysis, possibly to correlate the relevant physiologic data with the time period during which an object and a device (and/or a user of the device) are in proximity (and/or in non-proximity). Additionally or alternatively, embodiments of systems and methods of the present invention may determine a start time at which proximity between an object and a device (and/or a user of the device) starts, and an end time at which proximity between an object and a device ends, so that a remote server (to which such data is wirelessly communicated) or other component of the present invention may correlate (or otherwise connect) the relevant physiologic data with the time period during which an object and a device (and/or a user of the device) are in proximity. Such data may also be useful in order to correlate physiologic data from before a start time, or after an end time, with a time period during which an object and a device (and/or a user of the device) are in non-proximity. In yet another embodiment, a component may infer that an object and a device (and/or a user of the device) are in proximity to each other only when, and in response to determining that, physiologic data is being wirelessly communicated to a remote server or other component. Such an embodiment may also infer that an object and a device (and/or a user of the device) are in non-proximity to each other only when, and in response to determining that, physiologic data is not being wirelessly communicated to the remote server or other component. In yet another embodiment, once proximity is established, relevant physiologic data may be correlated with an object only for a predetermined period of time (e.g., a period of time during which a typical user of the object would be in contact or use such an object). Other means and methods associated with embodiments of the present invention may be used to determine the time during which an object and a device (and/or user of the device) are in proximity so that relevant physiologic data may be correlated with the use of, or (at very least) proximity to, the particular object. Likewise, the same or different or additional data may be used to determine the time during which an object and a device (and/or a user of the device) are in non-proximity so that relevant physiologic data may be correlated with the non-use of, or (at very least) non-proximity to, the particular object. It is possible that a user may be in proximity with multiple objects at the same time, in which case the physiologic data at such time may be associated with all of the objects, or the physiologic and other data may be analyzed and associated with only one of the objects. In yet other embodiments of the present invention, proximity may be inferred from physiologic data (or its analysis at a sensor or at the device, or at a remote server to which the data is communicated), possibly in combination with other data, such as GPS or similarly derived location data, or past physiologic data for the user or other users, for example. In embodiments of the present invention, physiologic data about a user may be communicated constantly, or regularly, over time (e.g., without regard for proximity or non-proximity between an object and the device sending the data) that may then be correlated with an object during a proximity period (e.g., by a process or analysis at a remote server, for example). In certain other embodiments of the present invention, the sensing and/or communication of physiologic data may be triggered by a determination of proximity between an object and a device that senses and/or communicates the data, for example. Notably, the former embodiment, wherein data is sensed and communicated over time (and without specific regard for the device being in proximity with any particular object) may provide significant benefits by enabling a remote server or other computer to process or analyze data in order to determine a comparison of physiologic data of a user (or of multiple users) while in proximity with an object versus while not in proximity (in non-proximity) with the object, providing useful information about the object, user(s) of the object, and more.

In an embodiment, physiologic data secured by a physiologic sensor may be communicated to a device that is associated with the sensor, and then the data may be (in the same or another form) wirelessly communicated to a remote server. Such physiologic data may be generated continuously, periodically, or based on a trigger, such as proximity between a device and an object, for example. Furthermore, physiologic data that is generated may be communicated to a device or to a remote server in a continuous or other manner. For example, physiologic data that is continuously generated may then be continuously communicated to a device and immediately wirelessly communicated to a remote server, for example. In another embodiment of the present invention, physiologic data may be generated and then stored in electronic memory, at the sensor or at the device, and then communicated to a remote server only periodically. Physiologic and other data may be communicated to a remote server either concurrently or at separate times, as separate data streams or sets, for example. If sent separately, the data may include elements that enable its association or assembly, such as the correlation between a set of physiologic data and an object, at a later time, possibly by means of processes or analysis at a remote server or processor, for example. Other means, methods, configurations and timings of data and data communication are possible and fall within the scope of the present invention.

Embodiments of the present invention may use wireless communication means to communicate data between elements, such as between a sensor and a device, as well as between other elements, such as between a device and a remote server. A wide variety of wireless communications means may be used, operating at different power levels and frequencies, for example. For purposes of determining whether an object and a device are in proximity to each other, NFC, RFID or beacon-type means may be used, for example. For purposes of data transfer between a physiologic sensor and a device, Bluetooth or similar low-power or short-range or line-of-sight (e.g., light-based) communication means may be used, for example. For purposes of communication of longer-range communication between a device and a remote server, any of a variety of radio communication means may be used, such as means currently used to facilitate communication between a mobile phone and a cell tower, for example. These wireless communication means may operate at any of a wide range of possible frequencies, wavelengths, power levels, and more. Embodiments of the present invention may use wireless communication means that operate at frequencies that cannot possibly be transmitted or received solely by a human (person), without the use of technology, for example. Likewise, wireless communication means used by embodiments of the present invention may transmit or receive signals across distances and at speeds that cannot possibly be performed by a human (person) without the use of technology. Embodiments of the present invention may make use of any of a wide variety of wireless communication means.

For clarity, embodiments of the present invention may wirelessly communicate data. Such data may include, but is not limited to data arising from an object, device, sensor or remote server (e.g., processor). Such data may relate to, without limitation, identities (of a device or object or sensor, for example), location (of a device or object or sensor, for example), physiologic data, outputs of an analysis, and more. Embodiments of data of the present invention may be communicated in any of a variety of ways, such as via wires or wirelessly, and using any of a variety of standards and protocols. In addition, data may be communicated in real-time (directly after it is created, for example), or following some delay, or following being stored in electronic memory, for example. Embodiments of data may be communicated at significantly the same time, or at different times. For example, device identifier data may be sent at a different time (and possibly also in a different manner) from device location data. Embodiments of data may be sent in raw or compressed or encrypted formats, or any combination of these. Embodiments of data may be data sets, whereby the data in such a data set correlate or relate to each other in some way. Data may also be sent separately or in parallel, as separate data sets or streams, and correlated or related to each other following such communication, at a remote server or processor, for example. The above examples of data communication are meant to illustrate the possibilities and are not intended to be limiting in any way.

Embodiments of the present invention may communicate data to a remote server immediately or substantially immediately after receiving or processing such data (e.g., in real time) or following a lapse or delay of time. For example, embodiments of the present invention may wirelessly send identifier data or physiologic data from a device to a remote server in real time, or nearly real time, or may be transmitted at a later time. Terms such as "substantially immediately after," "without substantial delay after," and "substantially in real time," as used herein, include, for example, performing an action (e.g., transmitting or receiving signals) within 1 nanosecond, 10 nanoseconds, 100 nanoseconds, 1 microsecond, 10 microseconds, 100 microseconds, 1 millisecond, 10 milliseconds, 100 milliseconds, or 1 second after performing another action (e.g., sensing, generating data (such as physiologic data), transmitting signals, or receiving signals). In any case, embodiments of the present invention may store data in electronic memory. For example, embodiments of the present invention may detect a particular condition or event, such as availability of wireless network access to a device (e.g., where no network access was previously available, at least for some period of time), or acquisition of certain data, or accumulation of a certain amount of data (e.g., enabling bulk data transfer in order to improve efficiency of the transmission), or a certain physiologic parameter or an action or behavior or location of a user, and, in response to such detection, transmit data (e.g., identifier data and/or physiologic data). Embodiments of the present invention may store such data in memory, such as remote server memory or device memory, either temporarily or permanently. In addition to data being stored at a remote server or at a device, the remote server or device may use (e.g., process) the data, possibly to enable some output or presentation for the benefit of a user.

Embodiments of the present invention may process data communicated to a remote server, whether from a single device (and relating to a single user) or from multiple devices (and relating to multiple users). Such processing may include, for example, storage, aggregation, analysis, interpretation, combination (with other data, for example), correlation, and/or manipulation. In addition, there will be instances when a user is in proximity to multiple objects, and either the device or the remote server (or another processor or element of a system of an embodiment of the present invention) may ascertain which one or more of the objects may be most relevant, e.g., being used by a user, if this is deemed useful. One example of a methodology that may be applied in such a situation is a conjoint analysis, although several other types of analysis will be useful in this or other situations. Embodiments of the present invention may output any data processed by the remote server to one or more other elements, including but not limited to any device that is communicating (or capable of communicating) with the remote server. Examples of outputs from a remote server may include, without limitation, user physiologic data summaries (for presentation in either graphic or narrative form; either individual or aggregated or comparative data); object-related information including but not limited to ratings, object-related physiologic responses; warnings, indications, recommendations; and instructions, commands, derivative data, predictive data, and various other outputs.

Embodiments of a remote server associated with (e.g., communicating with or receiving data from) multiple devices may be valuable in order to process data (including but not limited to physiologic data, object identifier data, device or user identifier data, and more) and produce certain analyses or derivative data. A remote server may include a processor, and may also have (or be associated with) communication means that enable it to communicate with other elements of a system of the present invention, and possibly also storage means for storing data. A remote server may facilitate use of algorithms or other types of processes or techniques to receive, process, analyze and output information. For example, if a remote server receives physiologic data (for one type of physiologic parameter, for example) from multiple users relating to a particular object, the remote processor may perform a simple statistical analysis to determine the mean and standard deviation of the data. This may, for example, be helpful to find outliers, which may further indicate a defective object or an unusual use case for the object. Many other processes (e.g., analyses) may be performed by a remote processor. Likewise, a remote server may output results of these processes in any of a variety of forms. Data may, for example, be output in a manner that enables a visual presentation of the results of an analysis. As another example, data may be output to enable an action at a device, object, sensor, or at another computer or processor or mechanism.

One embodiment of analyzing is comparing physiologic data from one user (or many users) during pre-proximity (one type of non-proximity), proximity with an object, and post-proximity (another type of non-proximity), in order to determine how a user responds (or many users, in aggregate, respond) to the object relative to their physiology before and after an interaction with the object, for example. Such information about a user's response (or an aggregated understanding of many users' responses) to an object may be quite valuable.

Following processing of data at a remote server, other information may be wirelessly communicated back to a device. As described above, the output from a remote server may enable any of a wide variety of presentations and formats. Such information may be useful for a user of a device to track physiologic parameters, track one's physiologic (or other) responses to objects, see how one compares to others who are in proximity and/or using various objects, and more, for example. Many other uses of outputs and presentation fall within the scope of the present invention.

Following processing of information at a remote server, output may also be used by those who own or have any of a variety of interests in user physiologic responses to objects. For example, a restaurant owner or manager may be able (and find it useful) to determine how the business is doing in terms of its food, service, seating options, and more, all based on raw or processed (and either individual or aggregated) information output by a remote server (or possibly even directly output by a device). As another example, aggregate user physiologic data may be used by a film production studio to determine the audience response to a film, or to understand where further edits may be desirable. As yet another possible example, an individual may use an embodiment of the present invention and information that has been output to determine how she is perceived by others, such as by friends, colleagues, bosses or subordinates.

Aggregated user ratings, feedback and reviews represent other possible outputs (and benefits) of embodiments of the present invention. For example, in addition to (or even in place of) reviews on websites (or elsewhere) relating to various products and services (e.g., books, consumer products, hotels, experiences), information that has been output by an embodiment of the present invention may provide accurate and unbiased ratings, feedback or reviews from many users, based on the physiologic responses to those objects (e.g., the products, places, experiences) by actual users of those objects during their use of the objects. Such information may provide a new and useful layer of additional (complementary) data to consciously user-generated ratings, feedback and reviews, for example. In other embodiments, such information may replace consciously user-generated ratings, feedback and reviews, or even create the possibility of new types of information products and services. Other forms of output, and benefits and uses of such output, fall within the scope of the present invention.

In addition to remote server output being data that may be presented to a user for the benefit of the user, for example, remote server output of embodiments of the present invention may cause a device or object to perform some action (where the object may be an object that is in proximity to a particular device, or a remote object). For example, if a user's physiologic data meets certain criteria (e.g., pulse goes above a threshold), then a remote server may communicate with the device to provide the user with a warning or alert or other information. Furthermore, remote server output may control or otherwise cause a component to perform an action or change at an object. This may be an object that is in proximity to a device (and a user of the device), for example. This may also be another object that is not in proximity to a device (and a user of the device), as another example. For example, based on user physiologic data that is sensed and communicated by a device (such as to a remote server) during proximity between the device (and user) and an object, the remote server may then communicate with the object or an associated object controller (e.g., using a communication network and protocols, wirelessly or otherwise) to cause the object to do something. In one example, if a user is in proximity with the driver's seat of a car and is experiencing stress-associated physiology (e.g., respiration rate goes up, possibly in response to challenging weather or traffic conditions), a component may communicate this data to a remote server and the remote server (as one possible output) may cause the user's mobile devices to be silenced (e.g., ringer disabled or incoming communications temporarily ceased) so the user will not be distracted (by the device) during the time of stress. In embodiments of the present invention, some of these functions may be facilitated or performed by the device, or in conjunction with the device. For example, a device may cause (or perform) an action or communicate an instruction to an object (instead of, or in cooperation with, a remote server). A communication of such an action, command or instruction (for an object to do something or perform some action) between a remote server and an object may be done wirelessly or using a wired connection. A communication of such an action, command or instruction (for an object to do something or perform some action) between a device and an object may also be achieved wirelessly or via wires. In addition to a communication of an action, command, or some other instruction being sent to an object or a device, a component may also send a communication to a user-associated sensor or an object-associated means that is being used to facilitate a determination of proximity (e.g., between a device and the object), e.g., a RFID tag that includes (as an element of its hardware) or has access to electronic memory. RFID tag code or instructions may be modified by instructions sent from a remote server or a device. The examples discussed above illustrate embodiments of the present invention and are not intended to be limiting in any way with regard to other embodiments. Other embodiments exist with regard to how elements of a system of the present invention communicate with one another.

Notably, embodiments of the present invention may include elements that communicate or enable communication of data, including instructions or commands, back to an object by means of a remote server (and, in such embodiments, without direct communication between a device and an object that is in proximity). Such embodiments may use a remote server to provide output to control objects that are hard-wired or not wirelessly accessible, possibly for security reasons. Other embodiments of the present invention may engage in or enable direct device-object communication, e.g., using Bluetooth or any of its variants. In any of these embodiments, an object may communicate with a remote server and/or a device to enable two-way communication, such as to provide data or feedback. An object may be controlled by an element that is a part of the object, or separate from (but associated with) the object, for example. In this latter example, a robotic system could act upon (e.g., move, change, revise, control) an object, with the robotic system being controlled via a remote server, for example. Other means and methods of channeling information either through a remote server, or directly via a wireless communication link between a device and an object, are within the scope of the present invention.

It is recognized that data provided by elements of embodiments the present invention (e.g., device associated with physiologic sensors that sense physiologic parameters of a user) may be of a private or confidential nature. As such, embodiments of the present invention may provide a user at least a certain level of control over the sensing (e.g., user physiologic data capture), dissemination, distribution, storage and/or use of data that is processed by embodiments of the present invention. Embodiments may give a user control (e.g., by means of soft keys or other input means at the device) to enable or disable the sensing or communication of certain of the user's physiologic parameters (or other data) from the device to a remote server or elsewhere. Another embodiment may offer a user control of how the user's data will be used, e.g., as personally-identifiable data (even if personally-identifiable relates to a device rather than the person using the device), or only in aggregation with data from other users. In yet another embodiment, a user may turn on or turn off any process relating to feedback from a remote server or device to an object or object-associated tag, or other element of the system. Such user controls may be universal or specific (e.g., limited) to certain times, locations, objects, object types, brands, data recipients, and more. In addition to user operated controls (by means of a device or otherwise), embodiments of the present invention may also cause notices to appear for the benefit of a user, e.g., a user notification that a particular object is in proximity, the notice possibly also including an inquiry to determine whether the user accepts further communication between the device and the object. Other embodiments of the present invention may be used to provide a user with other forms of control over that user's data.

FIG. 1 shows a representation of an embodiment of the present invention. In this figure, three different periods of time are represented: pre-proximity (a period of time before proximity, e.g., before a user and an object are in proximity), proximity (a period of time during which proximity between the user and the object exists), and post-proximity (a period of time following proximity, e.g., after the user and the object have been in proximity, and are no longer in proximity). FIG. 1 first shows user 100 associated with device 101 and sensor 102 during pre-proximity. The same user 100, device 101 and sensor 102 then enter into proximity with an object 10. During a time of proximity sensor 102 senses a physiologic parameter of user 100 and sends physiologic data about the physiologic parameter from the sensor 102 to the device 101. The device 101 then sends (e.g., wirelessly transmits) data 120, including, for example, an object identifier, device identifier and physiologic data, to a server 130. The server 130 may then receive and also process the data 120 to generate, create or cause an output 140. An example of an output 140 may be a report, either provided on an electronic display or otherwise. Another example of an output 140 may be a command that is communicated electronically using a network to another computer or device to cause some action, for example. FIG. 1 also shows the user 100, device 101 and sensor 102 during a time of post-proximity, when the user 100 is again in non-proximity with the object 10 (at least temporarily; the user 100 may again in the future enter into proximity with the same object 10, or another object, of the present invention). Many variations of the embodiment shown in FIG. 1 fall within the scope of the present invention. For example, the data 120 may include other data, including but not limited to object location, device location, user identifier, time stamps, and more. As another example, the user 100 may be associated with multiple sensors that sense multiple physiologic parameters. Notably, data (in general) may be communicated from the device 101 or other elements of the present invention to the remote server 130 or other elements of the present invention during pre-proximity and also during post-proximity, as well as during proximity, although the data relating to the object 10 and the user's 100 physiologic data during proximity (such as data 120) may only be transmitted from the device 101 to the server during proximity and/or during post-proximity (e.g., not before the object 10 has been identified, and the object 10 an the user 100 have been determined to be in proximity), for example.

Figure 2:
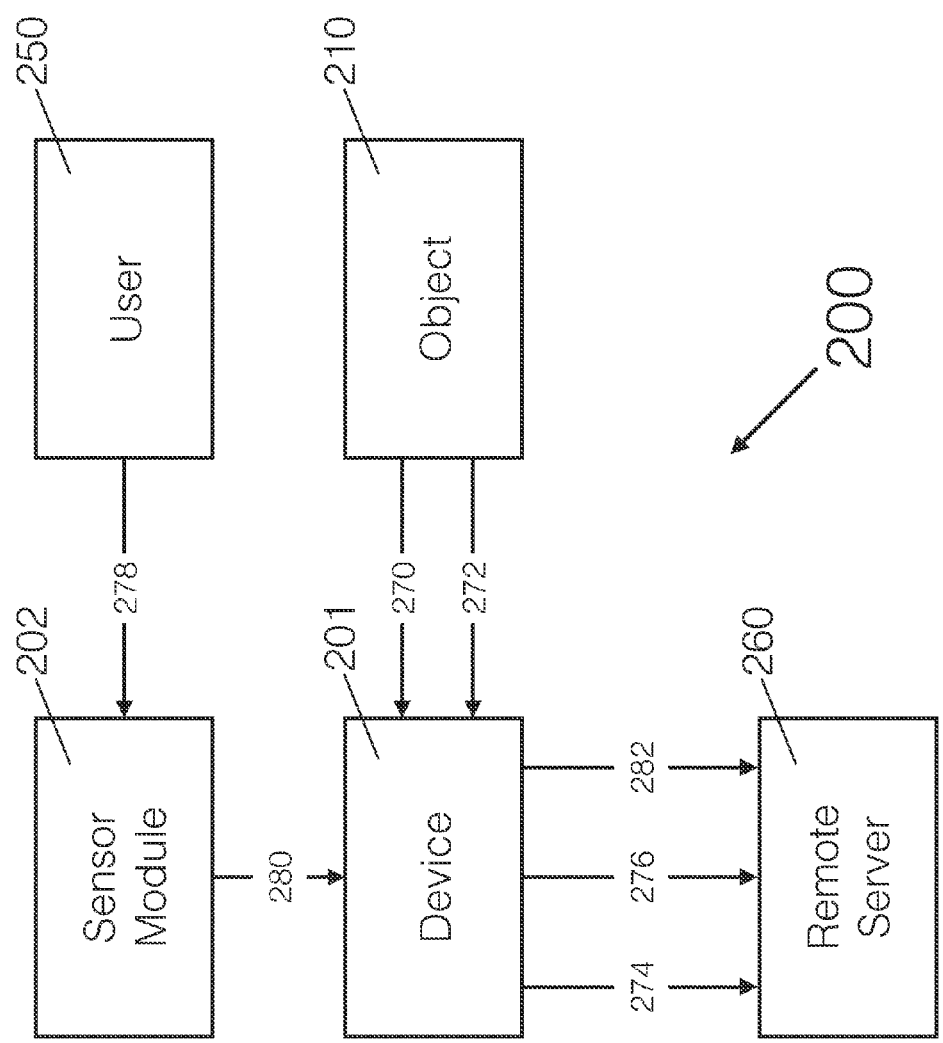
FIG. 2 is a dataflow diagram of a system implemented according to one embodiment of the present invention.
Figure 3:
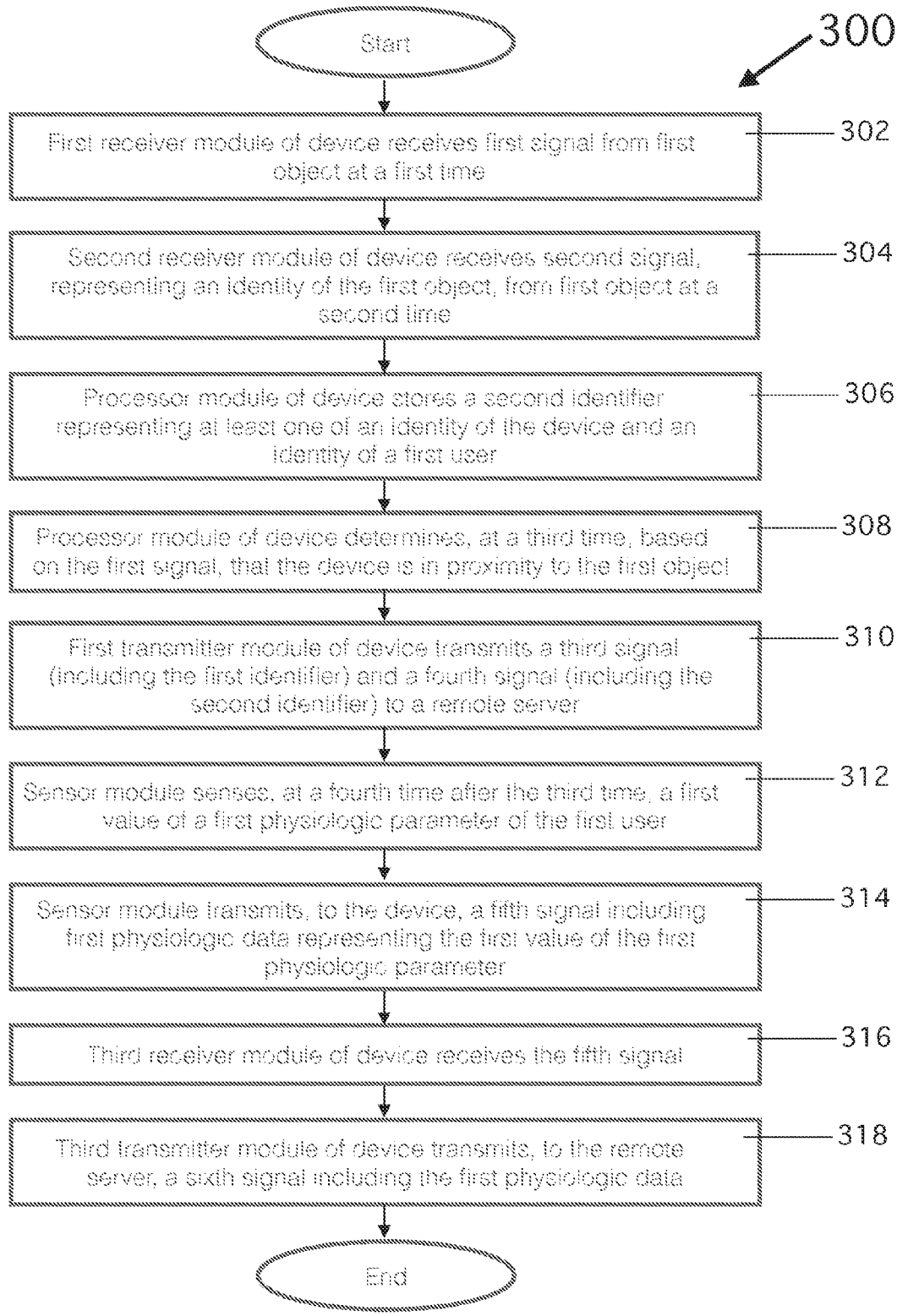
FIG. 3 is a flowchart of a method performed by the system of FIG. 2 according to one embodiment of the present invention.

FIG. 2 shows a dataflow diagram of a system 200 implemented according to one embodiment of the present invention. FIG. 3 shows a method 300 performed by the system 200 of FIG. 2 according to one embodiment of the present invention. The system 200 includes a device 201, which may, for example, be the device 101 of FIG. 1. The system 200 also includes a first object 210, which may, for example, be the object 10 of FIG. 1. The device 201 and the first object 210 are "distinct" from each other, as that term is used herein.

Figure 5:
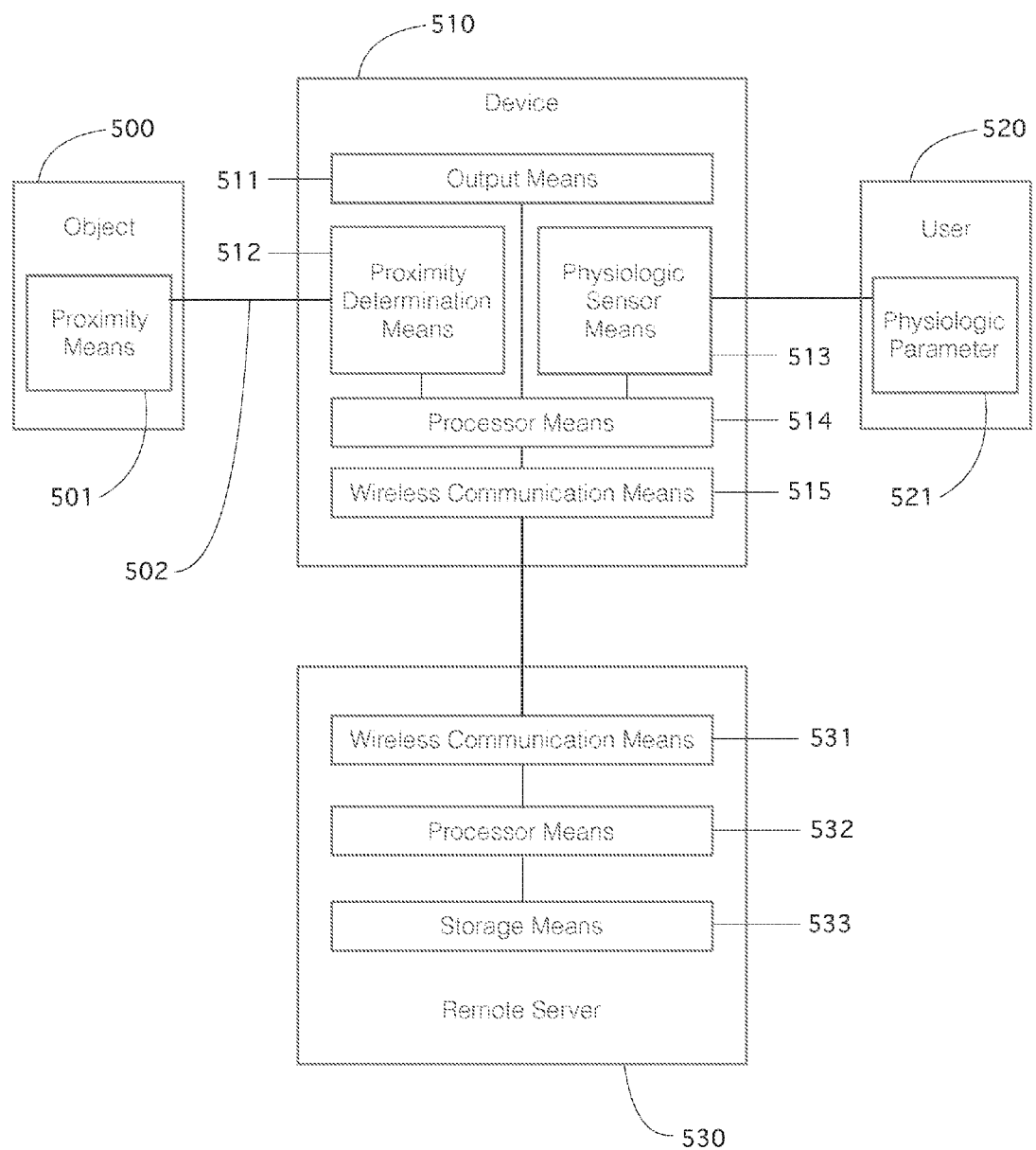
FIG. 5 is a diagram representing yet another embodiment of a system for sensing, communicating, and processing user physiologic information.

The device 201 may include a first receiver module, such as the wireless communication means 515 shown in FIG. 5. The device 201 may use the first receiver module to receive (e.g., wirelessly) a first signal 270 from the first object 210 at a first time (FIG. 3, operation 302).

The device 201 may include a second receiver module, which may be the same as or distinct from the first receiver module. For example, the second receiver module may be the wireless communication means 515 shown in FIG. 5. The device 201 may use the second receiver module to receive (e.g., wirelessly) a second signal 272 from the first object 210 at a second time, where the second signal 272 may include a first identifier representing an identity of the first object 210 (FIG. 3, operation 304).

The device 201 may include a processor module, such as the processor means 514 shown in FIG. 5. The device 201 may use the processor module to store a second identifier representing at least one of (i.e., one or both of): (1) an identity of the device 201; and (2) an identity of a first user 250 (FIG. 3, operation 306).

The device 201 may use the processor module to determine, at a third time, based on the first signal 270 received from the first object 210, that the device 201 is in proximity to the first object 210 (FIG. 3, operation 308).

The device 201 may include a first transmitter module, such as the wireless communication means 515 shown in FIG. 5. The system 200 may include a remote server 260. In response to determining that the device 201 is in proximity to the first object 210, the device 201 may use the first transmitter module to transmit (e.g., wirelessly) a third signal 274 and a fourth signal 276 to the remote server 260 (FIG. 3, operation 310). The third signal 274 may include the first identifier. The fourth signal 276 may include the second identifier.

The first transmitter module may transmit (e.g., wirelessly) the third signal 274 and/or the fourth signal 276 in real time or substantially in real time. For example, the first transmitter module may transmit (e.g., wirelessly) the third signal 274 and/or the fourth signal 276 without any substantial delay after determining that the device 201 is in proximity to the first object 210.

The system 200 may include a sensor module 202. The sensor module 202 may sense, at a fourth time after the third time, a first value of a first physiologic parameter of the first user 250 (FIG. 3, operation 312). The first value of the physiologic parameter of the first user is sensed by sensor module 202 as sensed input 278.

Any reference herein to one time that is "after" another time (such as the reference above to the fourth time being after the third time) refers to any non-negative amount of time after, no matter how small. For example, the fourth time may be 1 nanosecond later than the third time and still be "after" the third time as that term is used herein. In this way, the term "after" is used herein to mean "not before or simultaneously." Similarly, any reference herein to one time that is "before"

another time refers to any non-negative amount of time before, no matter how small. For example, the third time may be 1 nanosecond earlier than the fourth time and still be "before" the fourth time as that term is used herein. In this way, the term "before" is used herein to mean "not after or simultaneously."

The sensor module 202 may include or otherwise be coupled to a second transmitter module. The sensor module 202 may use the second transmitter module to transmit a fifth signal 280 to the device 201 (FIG. 3, operation 314). The fifth signal 280 may include first physiologic data representing the first value of the first physiologic parameter.

The device 201 may include a third receiver module, such as the wireless communication means 515 shown in FIG. 5. The device 201 may use the third receiver module to receive the fifth signal 280 representing the first physiologic data (FIG. 3, operation 316).

The device 201 may include a third transmitter module, such as the wireless communication means 515 shown in FIG. 5. The device 201 may use the third transmitter module to transmit (e.g., wirelessly), after determining that the device 201 is in proximity to the first object 210, a sixth signal 282 including the first physiologic data to the remote server 260 (FIG. 3, operation 318).

The system 200 and method 300 may determine that the device 201 and object 210 are in proximity and/or non-proximity to each other in any of a variety of ways. For example, the device 201 may use the processor module to determine that the device 201 is in proximity to the object 210 by determining that the device 201 received the first signal 270 from the object 210. In other words, the receipt of the first signal 270 by the device 201 may cause the device 201 to conclude that the object 210 is in proximity to the device 201. Conversely, the device 201 may use the processor module to determine that the device 201 is in non-proximity to the object 210 by determining that the device 201 did not receive the first signal 270 from the object 210, or by determining that the device 201 is not receiving any signal from the object 210. In other words, the non-receipt of the first signal 270 (or of any signal) by the device 201 from the object 210 may cause the device 201 to conclude that the object 210 is not in proximity to the device 201.

As another example, the system 200 and method 300 may determine that the device 201 and object 210 are in proximity or non-proximity to each other based on location data representing the location of the device 201 and/or the location of the object 210. For example, an element of the system 200 (such as the device 201, object 210, and/or remote server 260) may receive device location data representing a location of the device 201 and object location data representing a location of the object 210. For example, the system 200 (e.g., the device 201) may include a device location sensor module, which may sense a location of the device 201 using any of the techniques disclosed herein. The system 200 (e.g., the object) may include an object location sensor module, which may sense a location of the object 210 using any of the techniques disclosed herein.

Such an element of the system 200 may determine whether the device 201 and object 210 are in proximity to each other based on such device location data and object location data in any of a variety of ways, such as by determining whether the device location represented by the device location data and the object location represented by the object location data satisfy a proximity condition. An example of a proximity condition is a maximum predetermined distance. For example, an element of the system may determine whether the device location is within some predetermined maximum distance of the object location, and then either: (1) conclude that the device 201 is in proximity to the object 210 in response to determining that the device location is within the predetermined maximum distance of the object location, or (2) conclude that the device 201 is in non-proximity to the object 210 if the device location is not within the predetermined maximum distance of the object location.

The third transmitter module may transmit the sixth signal 282 in response to determining that the device 201 is in proximity to the first object 210. The third transmitter module may initiate transmission of the sixth signal 282. As used herein, terms such as "initiate," "begin," and "commence" with respect to actions such as sensing, generating, processing, transmitting, and receiving data and signals refers to performing such actions after not performing such actions. For example, an example of initiating transmission of the sixth signal 282 is transmitting the sixth signal 282 after not transmitting a signal representing the first physiologic data. As a particular example, if the third transmitter module is not transmitting any signal representing any physiologic data, and then subsequently (e.g., in response to determining that the device 201 is in proximity to the first object 210) transmits the sixth signal 282 representing the first physiologic data, this is an example of "initiating" transmission of physiologic data, because the third transmitter module was not transmitting any signal representing any physiologic data before transmitting the sixth signal 282 representing the first physiologic data. This is an example of initiating transmission of physiologic data, even if the third transmitter module transmitted a signal representing physiologic data before it stopped transmitting that signal. In other words, if the third transmitter module transmits a signal representing physiologic data during time period T1, then does not transmit that signal during time period T2, and then begins to transmit a signal representing physiologic data during time period T3, the beginning of the transmission of the signal during time period T3 represents "initiating" transmission of physiologic data because the third transmitter module was not transmitting physiologic data immediately before it began transmitting physiologic data.

Similarly, as used herein, terms such as "terminate," "stop," and "end" with respect to actions such as sensing, generating, processing, transmitting, and receiving data and signals refers to not performing such actions after performing such actions. For example, an example of terminating transmission of physiologic data is not transmitting any signal representing any physiologic data after transmitting the sixth signal 282 representing the first physiologic data. As a particular example, if the third transmitter module transmits the sixth signal 282 representing the first physiologic data, and then subsequently (e.g., in response to determining that the device 201 is not in proximity to the first object 210) does not transmit any signal representing any physiologic data, this is an example of "terminating" transmission of physiologic data, because the third transmitter module stops transmitting any signal representing any physiologic data after transmitting the sixth signal 282 representing the first physiologic data. This is an example of terminating transmission of physiologic data, even if the third transmitter module was not transmitting a signal based on physiologic data before it started transmitting that signal, for the same reasons as those given above with respecting to initiating transmission of physiologic data.

As a particular example, the device 201 may use the processor module to determine, at a fourth time after the first time, that the device 201 is not in proximity to the first object 210. In response to determining that the device 201 is not in proximity to the first object 210, the device 201 may terminate transmission of the first physiologic data to the remote server 260, for example.

The system 200 of FIG. 2 and the method 300 of FIG. 3 are merely examples and do not constitute limitations of the present invention. The system 200 and method 300 may, for example, include additional elements. For example, the device 201 may store second metadata. Second metadata may relate to an ambient temperature sensed by a device sensor, or a time stamp specifying the time of a certain event, as examples.

As another example, the sensor module 202 may sense, at a fourth time before the first time, a second value of the first physiologic parameter of the first user 250. For example, the sensor module 202 may repeatedly (e.g., continuously) sense values of the first physiologic parameter of the first user 250 over a range of times, which may start at a time before the first time, which may also include the first time, and which may further include times after the first time. The third transmitter module may, in addition to transmitting the sixth signal 282 representing the first physiologic data to the remote server 260, also transmit, to the remote server 260, a seventh signal representing the second value of the first physiologic parameter of the first user 250. As this example illustrates, the third transmitter module may transmit, at a time after the device 201 and the object 210 are determined to be in proximity to each other (e.g., in response to determining that the device 201 and the object 210 are in proximity to each other), physiologic data generated before the device 201 and the object 210 were determined to be in proximity to each other.

Various data and signals generated, processed, transmitted, and/or received by embodiments of the present invention may include timestamps. For example, the first physiologic data may include timestamp data representing the first time (i.e., the time at which the device 201 uses the first receiver module to receive the first signal 270 from the object 210). As a result, the sixth signal 282 may include timestamp data representing the first time.

The device 201 and/or other modules in the system 200 may transmit (e.g., wirelessly), to the remote server 260, one or more signals containing data indicating that the device 201 is in proximity to the first object 210 and/or that the device 201 was determined to be in proximity to the first object 210 as of a particular time and/or range of times. For example, the sixth signal 282 may include such data. As another example, such data may be transmitted to the remote server 260 in an additional signal not shown in FIG. 2. Any such signal may, for example, be transmitted to the remote server 260 in response to determining that the device 201 is or was in proximity to the object 210.

Conversely, the device 201 and/or other modules in the system 200 may transmit (e.g., wirelessly), to the remote server 260, one or more signals containing data indicating that the device 201 is not in proximity (i.e., is in non-proximity) to the first object 210 and/or that the device 201 was determined not to be in proximity to the first object 210 as of a particular time and/or range of times. For example, the sixth signal 282 may include such data. As another example, such data may be transmitted to the remote server 260 in an additional signal not shown in FIG. 2. Any such signal may, for example, be transmitted to the remote server 260 in response to determining that the device 201 is not or was not in proximity to the object 210.

As a particular example, the device 201, at a fourth time after the first time, may use the processor module to determine that the device 201 is not in proximity to the first object 210. After (e.g., in response to) determining that the device 201 is not in proximity to the first object 210, the device 201 may transmit (e.g., wirelessly), to the remote server 260, a seventh signal containing data indicating that the device 201 is not in proximity to the object 210. Then, the first sensor module 202, at a fifth time after the fourth time, may sense a second value of the first physiologic parameter of the first user 250. The first sensor module 202 may then transmit second physiologic data representing the second value of the first physiologic parameter to the device 201. After (e.g., in response to) determining that the device 201 is not in proximity to the first object 210, the second physiologic data may be transmitted (e.g., by the device 201), to the remote server 260.

Although FIGS. 2 and 3 only refer to a single physiologic parameter of the user 250, this is merely an example and does not constitute a limitation of the present invention. The system 200 and method 300 may sense any number of physiologic parameters and generate, process, transmit, and receive any resulting physiologic data representing such physiologic parameters. As a particular example, the system 200 may include a second sensor module (not shown), which may, at a fourth time after the third time, sense a second value of a second physiologic parameter of the first user 250. The system 200 may perform, on the second value of the second physiologic parameter of the first user 250, any of the actions disclosed herein in connection with the first value of the first physiologic parameter of the first user 250. For example, after determining that the device 201 is in proximity to the object 210, the system 200 (e.g., the device 201) may transmit (e.g., wirelessly), a signal representing the second physiologic data to the remote server 260.

Various elements disclosed herein, such as but not limited to various elements shown in FIG. 2, may be coupled to and/or integrated with each other in various ways. For example, certain elements disclosed herein as being distinct elements may instead be implemented as a single element. Similarly, various signals disclosed herein may be integrated with each other. For example, certain signals disclosed herein may be implemented as a single signal. Various times disclosed herein may be the same times as each other, unless such times are specifically described as occurring before or after each other. As particular examples:

- the device 201 may include the first sensor module 202 and additional sensor modules (such as the second sensor module described above);
- the device 201 may include the first transmitter module and/or the third transmitter module;
- any receiver modules disclosed herein (such as the first receiver module and the second receiver module) may be implemented as a single receiver module (i.e., may be the same module);
- any transmitter modules disclosed herein (such as the first transmitter module and the second transmitter module) may be implemented as a single receiver module (i.e., may be the same module);
- the first and second signals may be implemented as a single signal (i.e., may be the same signal);
- the first and second times may be the same as each other.

The method 300 of FIG. 3 may repeat any number of times, e.g., periodically (e.g., once every millisecond, 10 milliseconds, 100 milliseconds, 1 second, 2 seconds, 5 seconds, 10 seconds, or 1 minute). As this implies:

- in certain iterations of the method 300 (e.g., while the device 201 and object 210 are in proximity to each other), the method 300 may determine that the device 201 and object 210 are (or were) in proximity to each other and, in response, the sensor module 202 may sense a physiologic parameter of the user 250 and provide corresponding sensor output 280; and in other iterations of the method 300 (e.g., while the device 201 and object 210 are not in proximity to each other), the method 300 may determine that the device 201 and object 210 are (or were) not in proximity to each other and, in response, the sensor module 202 may not sense the physiologic parameter of the user 250 and may not provide corresponding sensor output 280.

As the above implies, one result of the operation of the system 200 of FIG. 2 and the method 300 of FIG. 3 is that the sensor module 202 may sense a physiologic parameter of the user 250 only while (i.e., during the times at which) the device 201 and the object 210 are in proximity to each other, and not while the device 201 and the object 210 are not in proximity to each other.

Figure 4:
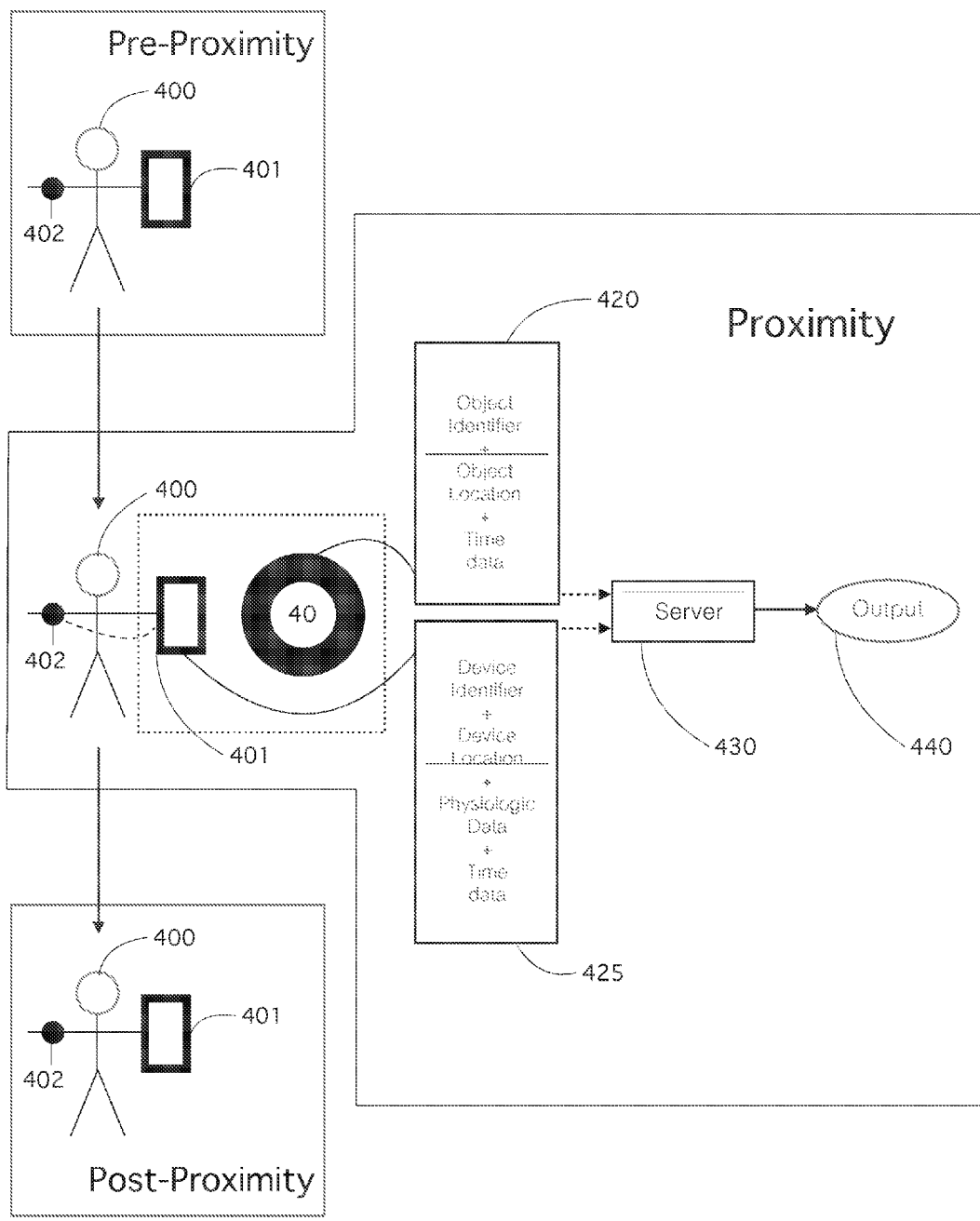
FIG. 4 is a diagram representing another embodiment of a system for sensing, communicating, and processing user physiologic information.

FIG. 4 shows a representation of another embodiment of the present invention. This embodiment is similar to the embodiment shown in FIG. 1, with the difference that it shows an embodiment wherein proximity between the device and the object are determined based on the device and the object being in the same (or significantly the same) place at the same (or significantly the same) time. As a result, the information flows in this embodiment shown in FIG. 4 are different from those that are shown in FIG. 1 (wherein the determination of proximity of the object and the device are made at the device, for example). As represented in FIG. 1, FIG. 4 also shows three different periods of time being represented: pre-proximity (a period of time before proximity, e.g., before a user and an object are in proximity), proximity (a period of time during which proximity between the user and the object exists), and post-proximity (a period of time following proximity, e.g., after the user and the object have been in proximity, and are no longer in proximity). FIG. 4 first shows user 400 associated with the device 401 and sensor 402 during pre-proximity. The same user 400, device 401 and sensor 402 then enter into proximity with an object 40. The embodiment of the object 40 shown in FIG. 8 communicates (e.g., wireless transmits), at least during a time of proximity, object data 420 to a server 430 (e.g., remote server). The object data 420 may include, but is not limited to, an object identifier, an object location and time data (the object identifier and object location being for object 40, and the time data relating to the time the object 40 was in the particular location, e.g., per the location data transmitted from the object 40 to the server 430). At the same or at a different time, device 401 communicates (e.g., wirelessly transmits) device data 425 to the server 430. Device data 425 may include, but is not limited to, a device identifier, a device location, physiologic data and time data (the device identifier and device location being for device 401, and the time data relating to the time the device 410 was in the particular location, e.g., per the location data that was transmitted from the device 401 to the server 430. Physiologic data relates to physiologic data sensed by the sensor 402, and this data may be time-stamped, as well, so that the server 430 knows how to correlate this physiologic data, e.g., if it was sensed during pre-proximity or during proximity, for example). Server 430 may receive object data 420 and device data 425, and may then analyze this data (and possibly other data from the device 401 or from other sources) to determine if/when proximity between the object 40 and the device 401 exists, and to be able to correlate (e.g., match) physiologic data about the user 400 with the object 40 during at least a time of proximity between the object 40 and the user 400, for example. Such an analysis may then enable the server 430 to provide or generate or cause an output 440. An embodiment of an output 440 may be a printed report of the analysis, for example. An output 440 may also be a communication of raw data to another computer, for example. Many variations of the embodiment shown in FIG. 4 fall within the scope of the present invention. For example, object data 420 may be made up of different data elements than those shown in FIG. 4. Also, device data 425 may be made up of different data elements than those shown in FIG. 4. Any of this data may be transmitted at the same time, as a single signal, for example, or may be transmitted at different times (e.g., device location data may be sent at a different time, and as a distinct signal, from physiologic data, for example). Also, multiple sensors may be used to sense multiple physiologic parameters and generate multiple streams of physiologic data, as another example. This embodiment of the present invention shown in FIG. 4 enables correlation of user physiologic data with the user's proximity (or even use of) a particular object without requiring a device and an object to communicate with one another directly (e.g., to determine proximity), since proximity between the device and the object may be established by them being in significantly the same place at significantly the same time. This is different from the system and method represented by FIG. 1 that shows a device and an object (or an object-associated element of the present invention) being in direct communication to establish proximity. Many variations of such the embodiments shown in FIG. 1 and FIG. 4 are possible, including their physical elements, the interactions between these elements, the timing and methods of such interactions, the types of data communicated, and more, all of which fall within the scope of the present invention. It is notable that embodiments of the present invention may combine aspects of the embodiments shown in FIG. 1 and FIG. 4, for example, including but not limited to variations of data flows between physical elements or modules of these representative embodiments of the present invention.

FIG. 5 shows a first embodiment of a system of the present invention. Object 500 includes or is associated with proximity means 501. In such an embodiment of the present invention, proximity means 501 may be, for example, a RFID tag or NFC technology that sends a wireless signal. Other proximity means 501 are possible. Device 510 may include, for example, proximity determination means 512, physiologic sensor means 513, processor means 514, output means 511 and wireless communication means 515. Object 500 proximity means 501 communicate with proximity determination means 512 by means of a signal 502, for example, to facilitate a determination of proximity (with a lack of such a signal, or weaker signal, possibly indicating non-proximity) between object 500 and device 510, for example. Device 510 physiologic sensor 513 means senses a physiologic parameter 521 that is associated with user 520. In the embodiment that is shown in FIG. 5, proximity determination means 512 and physiologic sensor means 513 each communicate with processor means 514. In one embodiment, processor means 514 processes this information (and possibly other information) at device 510, whether processing is simple (e.g., pass-through) or sophisticated (e.g., data analysis). Processor means 514 further communicates with device 510 output means (e.g., an interactive touchscreen display) and also wireless communication means 515. Device 510 wireless communication means 515 communicate with remote server 530 wireless communication means 531. Embodiments of a remote server 530 may also include, for example, processor means 532 and storage means 533 (e.g., electronic memory). Remote server 530 processor means 532 may, for example, analyze the physiologic and other data that it receives, in order to correlate such physiologic data (from one or many users) with a particular object (or class or category or group of objects), as one example. Embodiments of systems of the present invention may vary significantly. They may include different sets, types, arrangements or locations of elements of the present invention, for example. Embodiments may also vary in the way that elements communicate with one another (in terms of their connections, as well as the means that are used for communication). Although FIG. 3 shows one embodiment of a system of the present invention, many different embodiments fall within the scope of the present invention.

Figure 6:
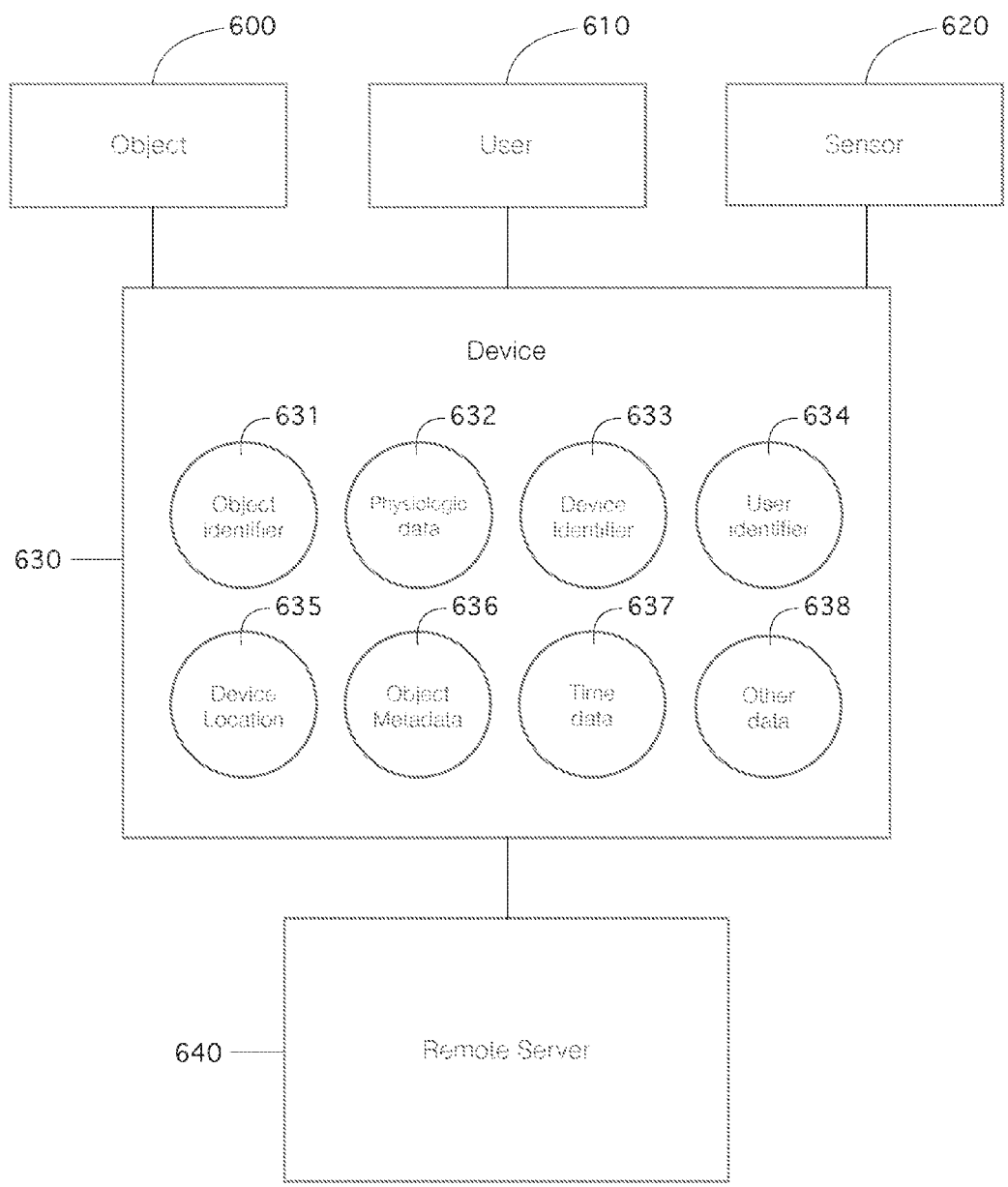
FIG. 6 is a diagram illustrating types of data that may be communicated to and from devices implemented according to embodiments of the present invention.

FIG. 6 shows a representation of an embodiment of a system of the present invention, and is intended to show the types of data that may be communicated to and from a device of the present invention. In this embodiment, the device 630 is associated (e.g., communicating) with an object 600, a user 610, and a sensor 620, for example. Each of these may either send or otherwise provide data or other information to the device 630. Such communication may be performed in different ways and at different times. For example, communication between the object 600 and the device 630 may occur wirelessly via proximity means and proximity determination means, or using a transmitter module at one element and a receiver module at the other element of the present invention. As another example, interaction between the user 610 and the device 630 may be achieved by means of an interactive touch-screen display that enables both input (e.g., touching of the screen by the user) and output (e.g., showing information visually on a screen to the user). As yet another example, the sensor 620 may communicate physiologic data (which may be the same or different from the physiologic data that is processed or subsequently sent to the remote server 640) by wired or wireless communication means (e.g., a transmitter module and/or a receiver module of the present invention). For example, if the device 630 is a wrist-worn device associated with a wrist band with a sensor built into the wrist band, then the sensor 620 may communicate with the device 630 using a wired connection, for example (embodiments of the present invention may include wrist worn devices that have interchangeable or replaceable wrist bands, with the wrist bands including one or more sensors with direct wired connections being made between the wrist band and the device, such connections being made by means of connectors having contacts that may be broken and/or reestablished, e.g., the band with the sensor may be detached from a body of the device, or (re)attached to the body of the device). If the sensor 620 is located remotely from the device 630, such as embedded within the body of a user associated with device 630, then wireless communication means are desirable. FIG. 6 shows several embodiments of data that may be processed (e.g., received, analyzed, transformed, transmitted) by the device 630. These embodiments of data are representative types of data, and embodiments of the present invention may use some of these, all of these, and also other types of data (or more elements or variations of the same types of data), as well. A first element of data is an object identifier 631, which may have been transmitted by NFC or RFID means from the object 600 (or an object 600 associated tag or other element) to the device 630. A second possible element of data is physiologic data 632, which may have been secured from the physiologic sensor 620, for example. Physiologic data 632 may have been generated by and/or received from one or multiple sensors, relate to one or multiple physiologic parameters, and/or have been sensed at one or at multiple times. In addition, physiologic data 632 may be raw data (e.g., from the sensor), processed data, transformed data, analyzed data, or some combination of these. Physiologic data, in general, may be transferred in different forms at different times. A third element of data is a device identifier 633, which may be a unique identifier associated with the device 630, for example. A fourth element of data is a user identifier 634, which may be provided (e.g., input via some means) by a user, or which may be determined by the device 630 or another element of an embodiment of the present invention, such as based on a user log-in or biometric input. A fifth element of data is a device location 635, which may be a geographic coordinate (e.g., latitude and longitude) or other location-disclosing data that represents a current location of the device 630. A sixth element of data is object metadata 636, which may have been communicated by the object 600 (or object 600 associated means) to the device 630, or which may be determined in any of a variety of other ways (e.g., visual analysis of the object 600 by camera means), for example. One example of object metadata 636 is information that relates to a condition of the object 600, such as a temperature of the object 600 or a temperature of the ambient environment. A seventh element of data is time data 637, which may be a current time, or a time associated with another element of data, such as when a physiologic parameter was sensed and generated an element of physiologic data, for example. As represented by other data 638, many other kinds of data elements fall within the scope of the present invention. One example of other data 638 may be data input by a user using a touch-screen device 630 display.

Figure 7:
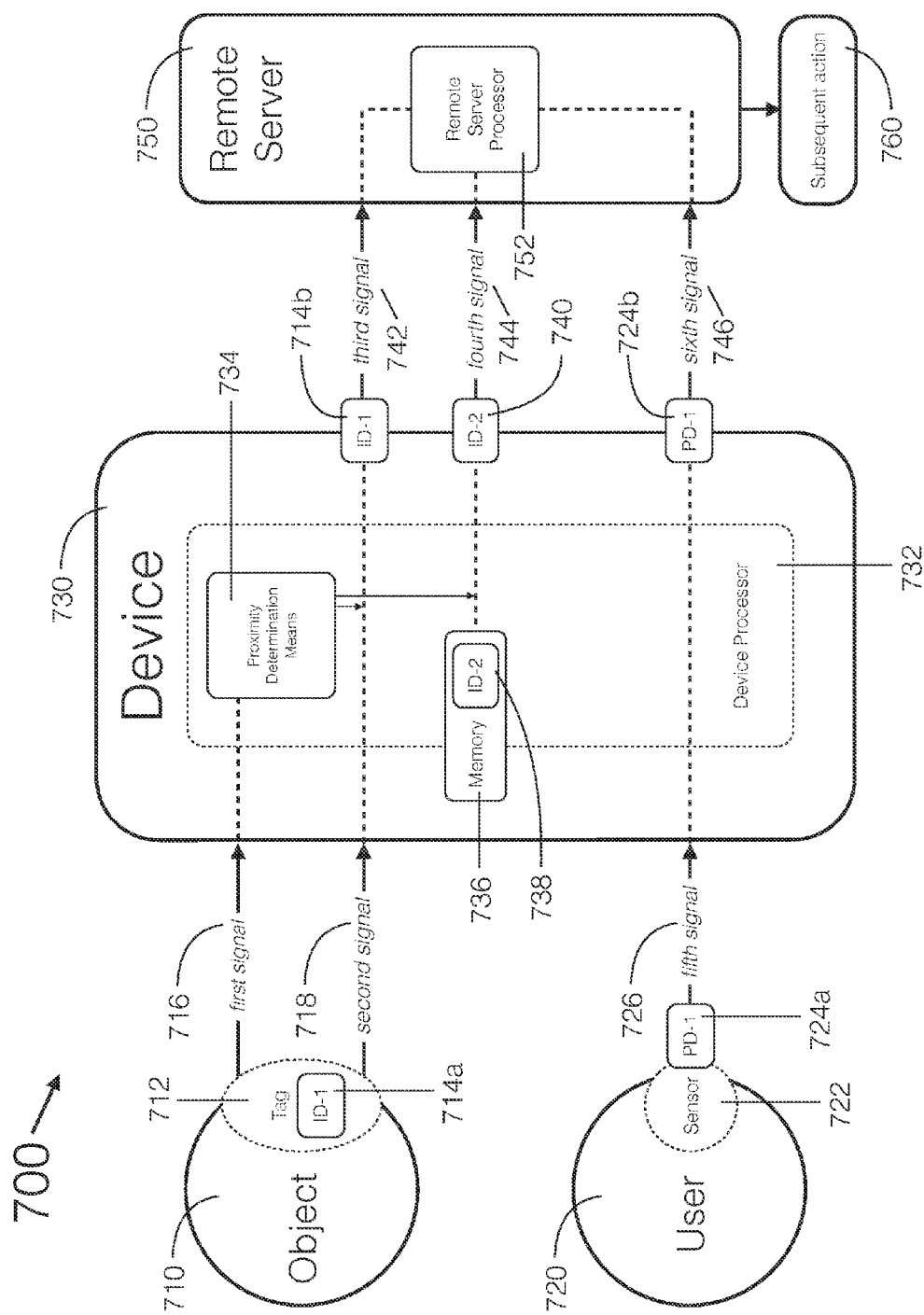
FIG. 7 is a diagram illustrating a system and data flows of an embodiment of the present invention.

FIG. 7 shows a representation of a system and data flows of an embodiment 700 of the present invention. In this embodiment, an object 710 includes (is associated with) a tag 712, and the tag has the ability to communicate an identity of the object (or an identity of the tag itself), which may be matched with an identity of the object using a database of tag identities and associated object identities, for example. The tag 712 transmits a first signal 716, which may be received by a device 730 of the present invention, and which may enable a determination of proximity between the object and the device, where such determination may be performed by the proximity determination means 734 of the device 730. In this embodiment, a second signal 718 sent by the object 710 (or a tag 712 that is associated with the object 710) transmits an identifier ("ID-1") 714a to the device as the second signal 718. This may provide the device 730 with the ability to determine that proximity between the object 710 and the device 730 exists, and also provides the device with information relating to the identity of the object 710 (or the identity of the tag 712, which may be used by elements of the present invention to secure information about the identity of the object 710). Following a determination of proximity by the proximity determination means 734 (which may be part of the device processor 732), the device 730 transmits data to a remote server 750, including the object 710 or tag 712 identifier (ID-1) 714b (which may be the same identifier 714a as communicated in the first signal 716 from the object 710 or object-associated tag 712 to the device 730) and an identity of the device 730 or user of the device ("ID-2") 738, which may be stored in memory 736. The device 730 transmits, and the remote server 750 receives, a third signal 742 that includes the object 710 (or object-associated tag 712) identifier ("ID-1") 714b, and a fourth signal 744 that includes the device 730 or device-associated user identifier ("ID-2") 740. The remote server 750 may use this information, based on receipt of the third signal 742 and fourth signal 744, to determine that the device 730 (and a user 720 of the device 730, by association) and the object 710 are in proximity. As shown in FIG. 7, a sensor 722 in this embodiment is sensing a physiologic parameter of a user 720. Based on the sensing of the physiologic parameter, the sensor 722 generates physiologic data ("PD-1") 724a. This physiologic data 724a, which may include one or more values, is transmitted to the device 730, as represented by the fifth signal 726, either by wired or wireless means, and is received by the device 730. The device 730 may process this data or simply prepare it for subsequent communication to the remote server 750. A sixth signal 746 represents the transmission of the physiologic data ("PD-1") 724b from the device 730 to the remote server 750. The remote server 750 may then process (or further process) the physiologic data, and possibly other data (received from the device or from another source or element of the present invention), by means of the remote server processor 752, in order to derive other information. For example, the remote server 750 may use the first identifier ("ID-1") 714b, the second identifier ("ID-2") 740 and the physiologic data ("PD-1") 724b to determine that the user 720 is happily using the object 710, and the remote server 750 may further take or cause a subsequent action 760 based on this determination. For example, the remote server 750 may take the subsequent action of communicating a report to the user 720 (or to another computer) that reports that the user 720 is happily using the object 710. As another example, the remote server 750 may cause a subsequent action 760 that unlocks features of the object 710, providing the user 720 with new benefits. As shown in FIG. 7, proximity may be determined by means of the first signal 716 communicated by the object 710 to the device 730, and the identity of the object (or the tag that is associated with the object) may be determined by means of the second signal 718 sent by the object 710 to the device 730. The first signal 716 and second signal 718 may be different (e.g., distinct) signals, or they may be the same signal, e.g., the communication of proximity and the identity of the object or associated tag may be performed by a single signal (e.g., a single transmission). Additionally, user physiology is sensed to generate physiologic data 724a that is communicated from a sensor 722 to the device 730 as the fifth signal 726. All of this information may be processed (at least partially) at the device 730, or some or all of the data may simply be passed along (e.g., wirelessly communicated) to the remote server 750. The remote server 750 may then perform an analysis of the data in order to generate new information, and this new information may be used to cause a subsequent action 760. FIG. 7 represents one embodiment of the present invention, and many variations of such an embodiment fall within the scope of the present invention. For example, proximity between the object 710 and the device 730 may be determined by other signals and/or means (e.g., optical or other sensor means associated with the object 710 or the device 730, for example). Embodiments of the present invention may include more than one sensor 722, and each sensor 722 may sense a different physiologic parameter, for example. Additionally, each sensor may provide a stream of physiologic data 724a, such as a series of values, based on the sensed physiologic parameter, at one time or at different points in time. Embodiments of the present invention may communicate data between elements of the present invention using any of a variety of communication (e.g., transmission, reception) means. Signals of embodiments of the present invention may be combined, or divided, to facilitate efficient or effective communication of data from one element of the present invention to another. Signals of the present invention may use any of a variety of present or future standards or protocols, all of which fall within the scope of the present invention. A range of subsequent actions 760 also fall within the scope of the present invention, including but not limited to communicating information from the remote server 750 to another computer, creating a report for use by a user (or another), causing an object 710 to perform some action or function (e.g., unlock a capability, move to a new location, turn its power on/off), and more. As may be seen by these examples, while FIG. 7 shows a representative embodiment of the present invention, many variations of such an embodiment fall within the scope of the present invention.

Figure 8:
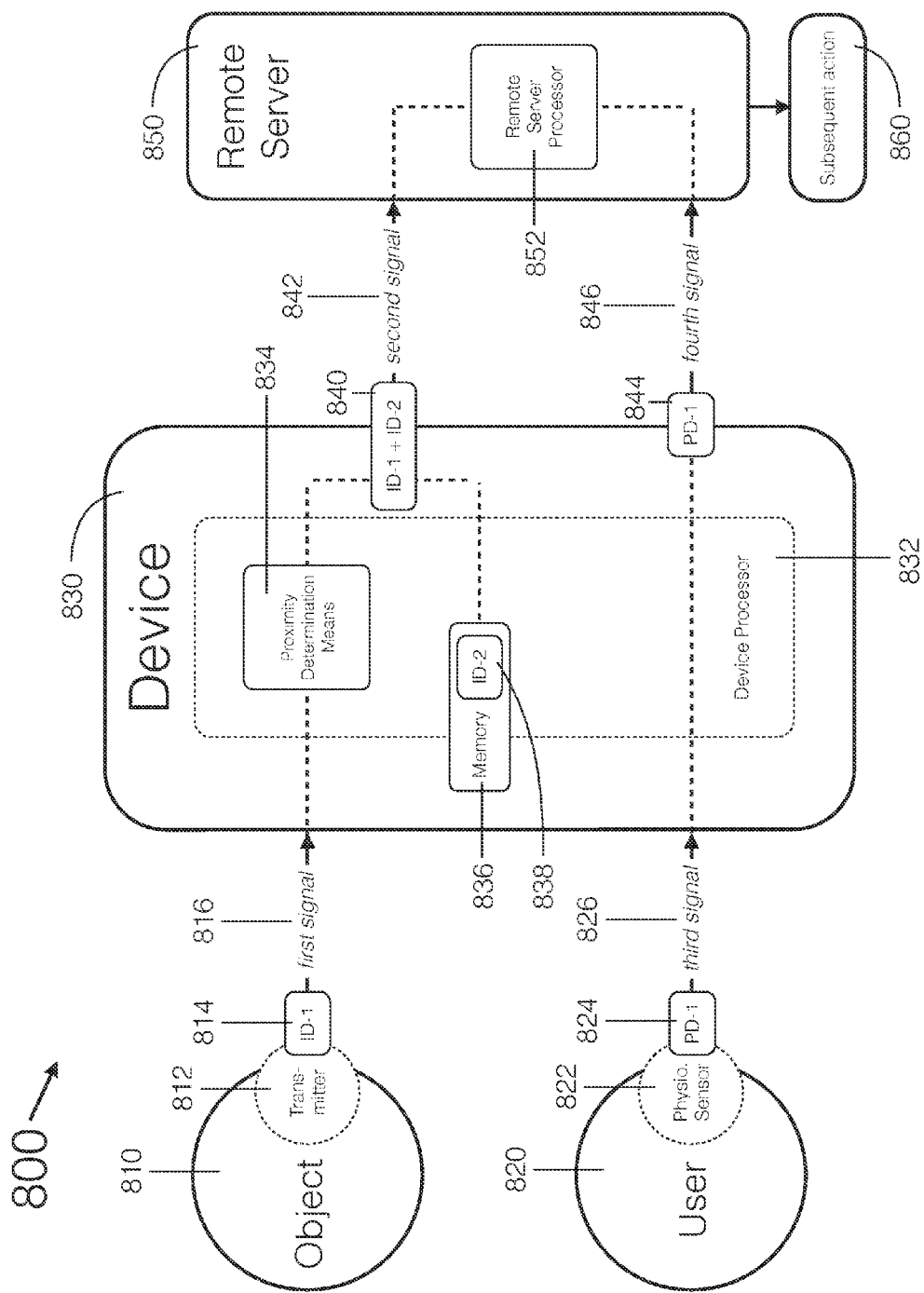
FIG. 8 is a diagram illustrating a variation of the system of FIG. 7.

FIG. 8 shows a variation of the embodiment of the present invention shown in FIG. 7. In the embodiment 800 shown in FIG. 8, the first signal 716 and the second signal 718 shown in FIG. 7 are consolidated (e.g., combined) to create only the first signal 816 shown in FIG. 8 that is transmitted from the object 810 (or from a tag or transmitter 812 associated with the object 810) to the device 830, as represented in FIG. 8. In this embodiment shown in FIG. 8, the first signal 816 transmits the identifier ("ID-1") 814 from the object 810 (or the tag or other transmitter 812 associated with the object 810) to the device 830 and, by virtue of this first signal 816 shown in FIG. 8, proximity between the object 810 and the device 830 may be determined, as well as (along with) the identity of the object 810 (or the tag or transmitter 812 that is associated with the object 810, which may subsequently be used by elements of the present invention to determine the identity of the object 810). In a similar manner, the third signal 742 and fourth signal 744 that are shown in FIG. 7 have been consolidated (e.g., combined) in the embodiment shown in FIG. 8 to create the second signal 842 shown in FIG. 8 that is transmitted from the device 830 to the remote server 850. In this embodiment 800, the second signal 842 shown in FIG. 8 transmits both the first identifier ("ID-1") 814 and a second identifier ("ID-2") 838 associated with the device 830 or the user of the device 830, from the device 830 to the remote server 850 as a single signal, shown as the fourth signal 846 in FIG. 8. FIG. 8 shows an embodiment of the present invention having an object 810 that includes (or is otherwise associated with) a transmitter (also referred to as a tag, e.g., a RFID tag) 812. The tag may, in one embodiment, include (e.g., electronically store) an object identifier ("ID-1") 814 that is capable of being communicated by means of a first signal 816 (e.g., a wireless signal transmitted from the transmitter 812 to the device 830). The first signal 816 is received by a receiver module of the device 830, for example, to enable a determination of proximity by means of the proximity determination means 834. The device 830 further includes memory (e.g., electronic storage capability) 836 that stores at least a device identifier ("ID-2") 838. Following a determination of proximity, for example, the device 830 transmits the object identifier and the device identifier ("ID-1+ID-2") 840 as a second signal 842 (e.g., wireless signal) to the remote server 850. Additionally, the drawing of the present invention shown in FIG. 8 shows a user 820 having an associated physiologic sensor 822 that generates physiologic data ("PD-1") 824 based on a physiologic parameter of the user 820. The physiologic data 824 is transmitted from the sensor 822 to the device 830 by means of the third signal 826, for example. The device, using the device processor 832, may then transmit the physiologic data (in its original form or a modified form) 844 from the device 830 to the remote server 850 as the fourth signal 846. The remote server 850, following receipt of the object identifier, device identifier and physiologic data, may then process the data using the remote server processor 852. The remote server may then output a signal or otherwise cause a subsequent action 860. One example of a subsequent action 860 is to turn a device on. Another example of a subsequent action is to send a report to a user of a device 830 of the present invention. Variations of the embodiment of the present invention shown in FIG. 8 are possible and fall within the scope of the present invention. The embodiments shown in FIG. 7 and FIG. 8 generally correspond to the embodiment that is shown in FIG.

1, wherein proximity between the object and the device may be determined by means associated with the device.

Figure 9:
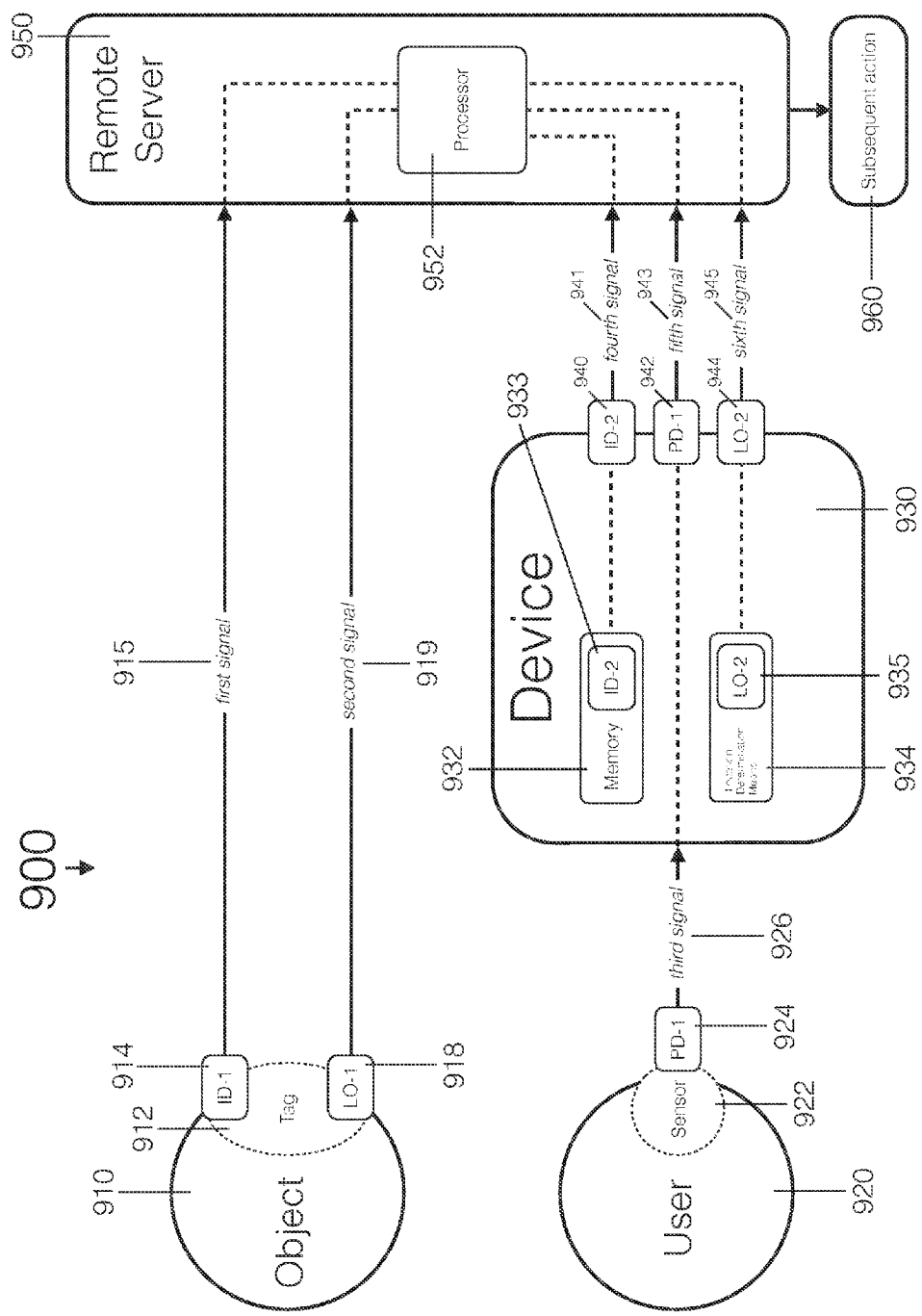
FIG. 9 is a diagram illustrating another variation of the system of FIG. 7.

FIG. 9 shows a representation of an embodiment 900 of the present invention. In this embodiment, which differs from the embodiments shown in FIG. 7 and FIG. 8, proximity between the object 910 and the device 930 is determined at the remote server 950 by means of data that is transmitted from both the object 910, and from the device 930, directly to the remote server 950 (FIG. 7 and FIG. 8 show embodiments in which data relating to the object is communicated first to the device and then passed along to the remote server). In the embodiment shown in FIG. 9, an object 910 (or a tag 912 or other communications means associated with the object 910) transmits the object identifier ("ID-1") 914 directly to the remote server 950 by means of a first signal 915, and also transmits object location data ("LO-1") 918 directly to the remote server 950 by means of the second signal 919. Physiologic data ("PD-1") 924 is sent from a sensor 922 associated with a user 920 (and sensing a physiologic parameter of the user 920) to the device 930, and then the device 930 transmits the physiologic data ("PD-1") 924 and other data, to the remote server 950. In addition to the physiologic data ("PD-1") 924, as shown in FIG. 9, the device transmits a device identifier ("ID-2") 933 that has been stored in memory 932 as a fourth signal 941 to the remote server 950, the physiologic data ("PD-1") 942 as a fifth signal 943 to the remote server 950, and device location data ("LO-2") 944 as a sixth signal 945, to the remote server 950. Although the fourth signal 941, fifth signal 943 and sixth signal 945 are shown as distinct signals in FIG. 9, these signals may be combined or otherwise consolidated. In the embodiment shown in FIG. 9, since there may not be direct communication from the object 910 to the device 930 (e.g., transmission of a wireless signal from the object 910 to the device 930), proximity is determined at the remote server 950, by determining that the object 910 and the device 930 are (or have been) significantly in the same location (which may mean that they are within a predetermined distance of one another) at significantly the same time, for example. The remote server 950 may process (using processor 952) the first signal 915 including object location ("ID-1") 914, the second signal 919 including the object identifier ("LO-1") 918, the fourth signal 941 including the device identifier ("ID-2") 940, the fifth signal 943 including physiologic data 942, which is based on the third signal 926 that includes the physiologic data 924, and the sixth signal 945 including device location ("LO-2") 944 that is stored as device location 935 in the location determination means 934 (based on device 930 location determined by device location determination means 934). All of this data may be received and processed at the remote server 950, possibly in combination with other data (from a database that is associated with the remote server, for example) to analyze the data. Such an analysis may lead to new information. Such new information may lead to a subsequent output or action 960 by the remote server 950, such as a communication of a signal including data to another computer or to the device 930 for the benefit of the user 920. As shown in FIG. 9, the means and methods for determination of proximity may include having the object 910 and the device 930 communicate with a remote server 950 separately, and without the need for an object 910 and a device 930 of the present invention to communicate directly with each other. Variations of the embodiment shown in FIG. 9 fall within the scope of the present invention, including but not limited to variations in the data communicated between elements of the invention, the timing of such communications, and means for determining proximity.

Figure 10:
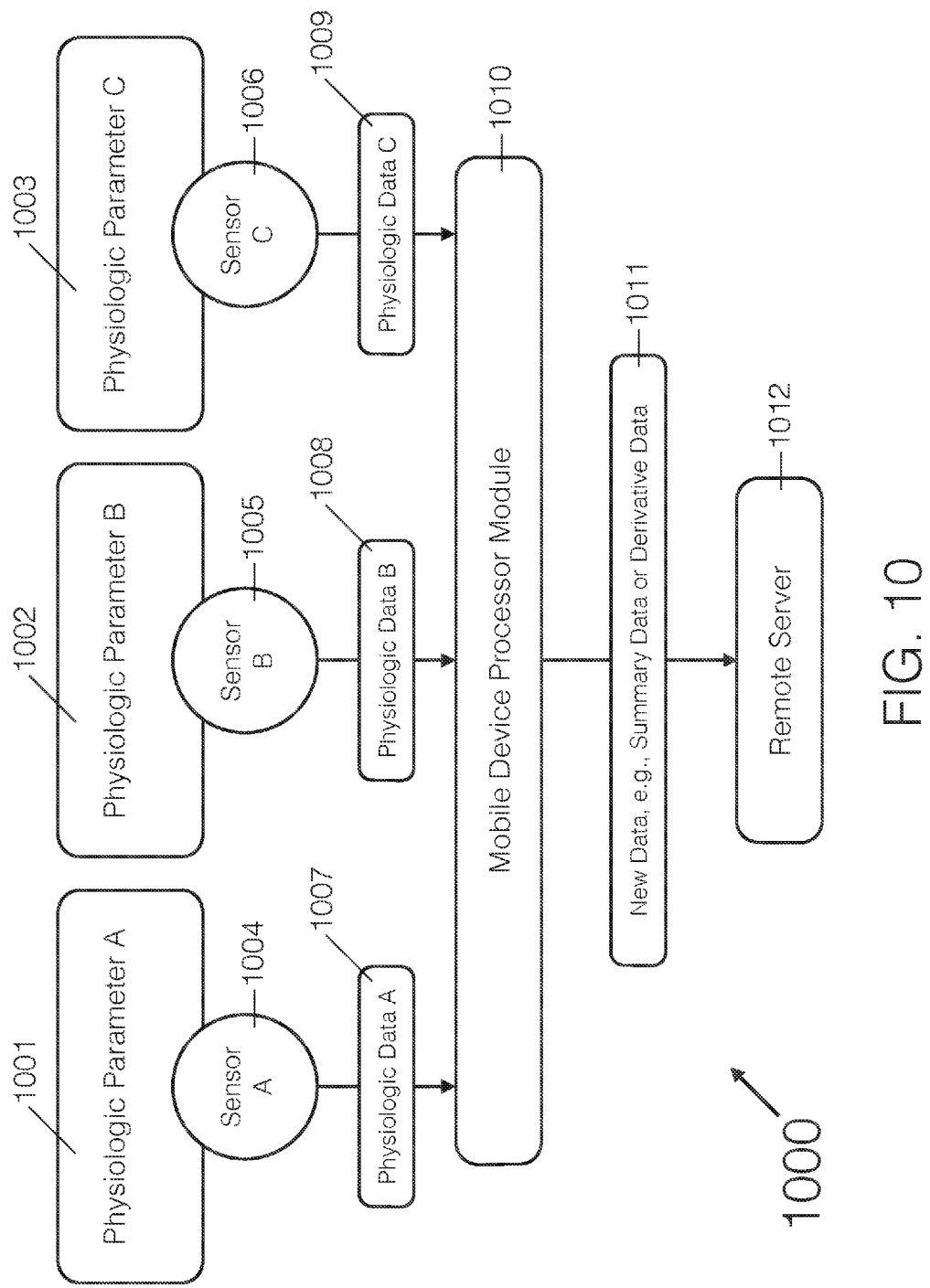
FIG. 10 is a diagram illustrating a system of an embodiment of the present invention.

FIG. 10 shows a representation of an embodiment 1000 of a system of the present invention (with representations of data flows). Multiple physiologic parameters are represented, with each physiologic parameter being sensed by a sensor, with each sensor communicating physiologic data to a mobile device processor module, and the mobile device processor module then transforming (e.g., by means of an algorithm) the physiologic data streams into new data, e.g., summary data or derivative data, that is then capable of being communicated to a remote server. As noted previously, such a process and the associated physical means (e.g., modules) may be used to enable efficient communication of data from a device to a remote server, as one example. As another example, processing of physiologic data streams into a single (or fewer) elements of data that may then be communicated (e.g., wirelessly) to a remote server may enable better, faster or less expensive processing of the new data versus having many different streams of data being communicated at different times, etc. FIG. 10 shows a representation of an embodiment 1000 of a system of the present invention. A (first) physiologic parameter A 1001, a (second) physiologic parameter B 1002, and a (third) physiologic parameter C 1003 are represented in the drawing. Physiologic parameter A 1001 is sensed by sensor A 1004, physiologic parameter B 1002 is sensed by sensor B 1005, and physiologic parameter C 1003 is sensed by sensor C 1006. Sensor A 1004 communicates physiologic data A 1007 to mobile device processor module 1010, sensor B 1005 communicates physiologic data B 1008 to mobile device processor module 1010, and sensor C 1006 communicates physiologic data C 1009 to mobile device processor module 1010. Physiologic data communicated by each of the sensors may be different, in terms of the type of data being communicated (e.g., what it represents), the range or format of values of the data, the frequency of communication of the data, and more. Embodiments of the present invention may have a greater number (or a lesser number) of such data inputs being communicated by sensors to the mobile device processor module 1010 depending on the number of physiologic parameters being sensed and the number of sensors, etc. Physiologic data from the sensors may be sent to the mobile device processor module 1010 at the same time, or at different times. Physiologic data from the sensors may be sent to the mobile device processor module 1010 using the same types of transmitter modules or other communication modules, or different types of transmitter modules or communication modules. Physiologic data from the sensors may be sent to the mobile device processor module 1010 at the same frequency (e.g., once per second) or at different frequencies (e.g., physiologic data A 1007 is sent once per second, while physiologic data B 1008 is sent once per minute). Mobile device processor module 1010 may receive the physiologic data and then process the physiologic data. Such processing of physiologic data may be performed at regular intervals, upon receipt of new physiologic or other data, at irregular intervals, and/or upon some notice of a trigger event, such as proximity or non-proximity with an object, as examples. Such processing may be performed by the mobile device processor module 1010 (or other module or processing or computational means of the present invention) by means of an algorithm performed by software running on the physical module, for example. As one example, multiple elements of physiologic data values are multiplied and the resulting single value (the product of the multiplication in this example) represents the new data 1011, e.g., summary data or derivative data. New data 1011 may then be transmitted (e.g., wirelessly) to a remote server 1012 (e.g., by means of a transmitter module associated with the mobile device, and a receiver module that is associated with the remote server 1012). Other algorithms may be much more sophisticated than the example of a simple product of data values, and may make use of (take into consideration) a range of other types of data, including but not limited to non-physiologic data input or streams, for example. Algorithms may be stored in memory at a mobile device, and may be performed using the mobile device processor module 1010, for example. Resulting new data 1011 may then be communicated to a remote server 1012. Such communication may be performed using a variety of physical means or modules, may be done at regular intervals, upon receipt of new data 1011, at irregular intervals, and/or upon notice of some trigger event, such as proximity or non-proximity with an object, for example. New data may be further processed at the remote server 1012, for example to derive conclusions or inform further actions, such as aggregation of data from many different users, or to create an analysis based on data for a single user, or to output a signal that causes some subsequent action. New data 1011 may make it easier and/or more efficient for the mobile device to communicate data to a remote server 1012, or may enable the remote server 1012 to receive or process the new data 1011 more efficiently (e.g., faster or in a less costly manner) versus having to process greater quantities of data if all raw physiologic data was sent to the remote server 1012, for example, thereby creating substantial benefits.

Figure 11:
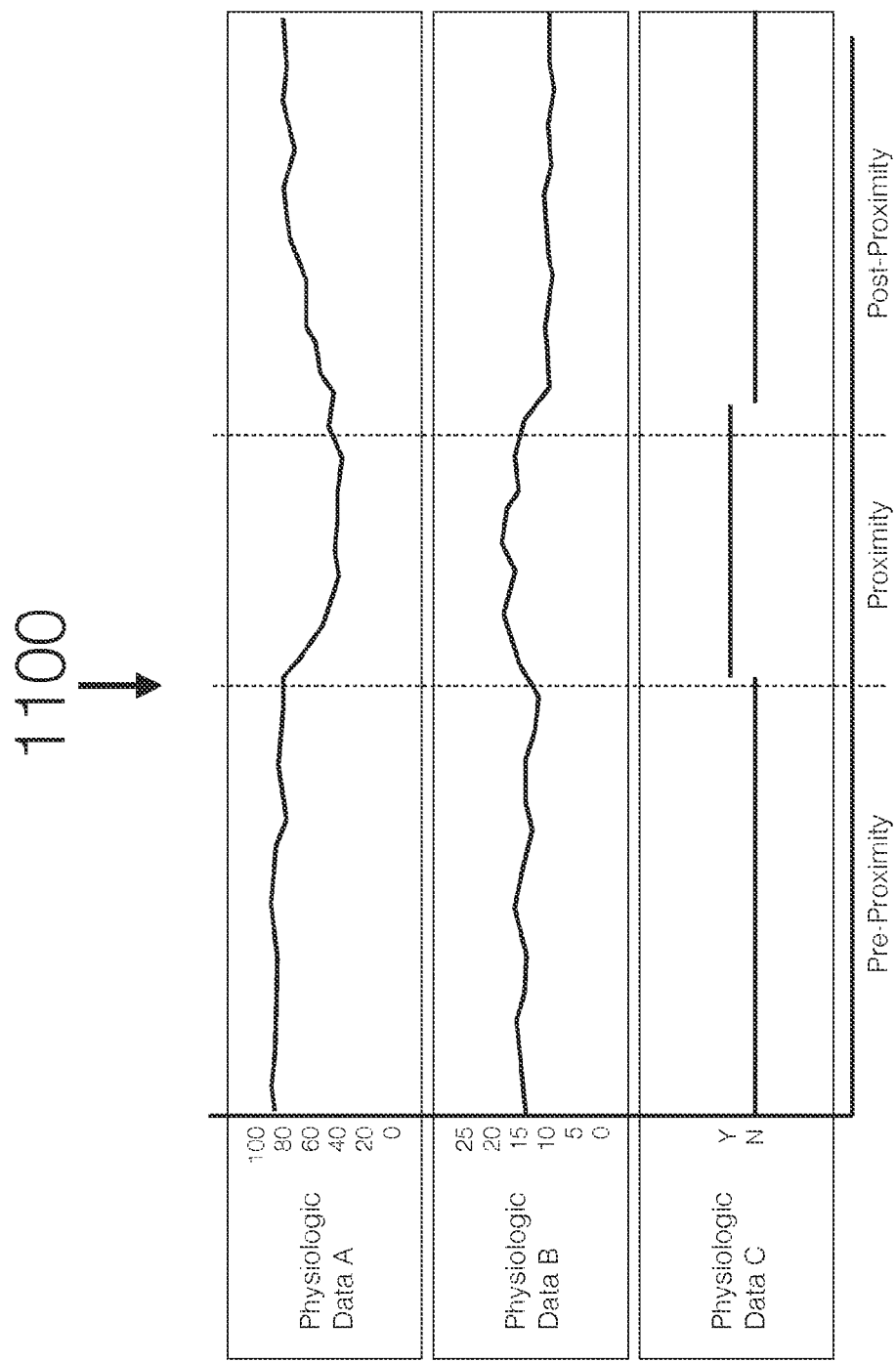
FIG. 11 is a graph representing three elements of physiologic data over time according to one embodiment of the present invention.

FIG. 11 shows a graph 1100 that represents the generation (and/or communication) of three different elements of physiologic data over time, meaning during pre-proximity (a first time period before which—and leading up to when—an object and a device are in proximity), proximity (a second time period during which the object and the device are in proximity), and post-proximity (a third time period following when the object and the device have been in proximity). As may be seen in graph 1100, the values of physiologic data A, physiologic data B and physiologic data C (such values making up the physiologic data for each of the respective physiologic parameters) vary over time and, in particular, show meaningful variations during proximity. Although this data is representative only, it shows that user physiology may vary during periods of proximity and non-proximity, that these variations may be significant, and that the data (and any subsequent analysis) may be useful by providing meaningful insights to various elements and users of embodiments of the present invention.

Figure 12:
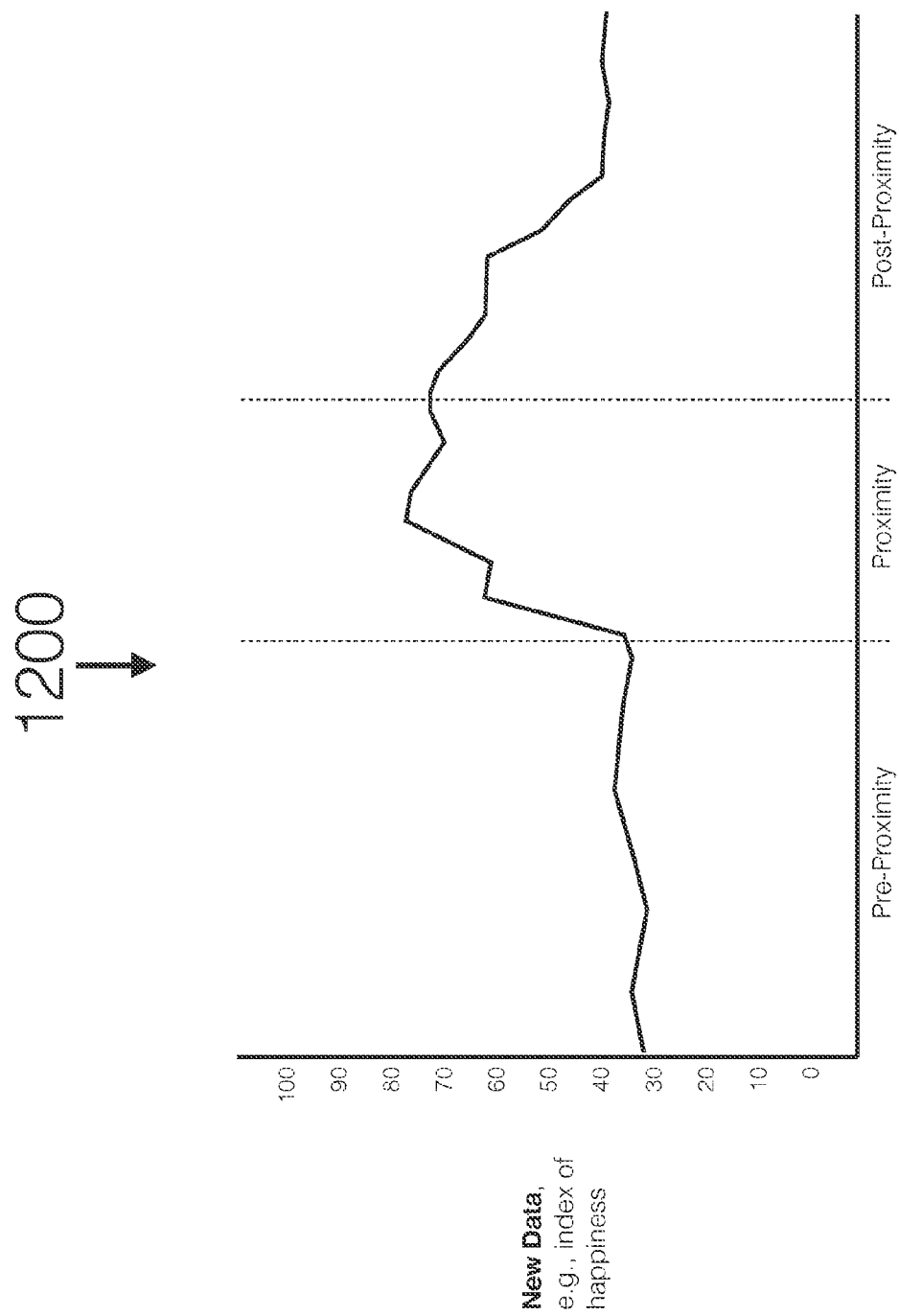
FIG. 12 is a graph representing new data values over time, including during pre-proximity, proximity, and post-proximity according to one embodiment of the present invention.

FIG. 12 shows a graph 1200 that represents new data (e.g., summary data or derivative data) values over time, including during pre-proximity, proximity, and post-proximity. An example of new data that is shown in this graph 1200 is an index of happiness, which may be derived by analyzing a range of physiologic data inputs (in order to computer or derive the new data). Similar to the representation shown in FIG. 11, the new data may be significant (on its own or by virtue of any further analysis) and may communicate meaningful insights to various elements or users of embodiments of the present invention.

One example of a representative use case for an embodiment of the present invention involves a user wearing a device. The device is brought into proximity to (approximated with) a consumer product (an object). The proximity is, in this example, determined by a RFID tag associated with the consumer product, and a RFID tag reader means associated with the device. Following a determination that the device and the product are in proximity, a sensor associated with (e.g., built into or communicating with) the device initiates sensing one of the user's physiologic parameters (e.g., heart rate) and captures physiologic data (about a physiologic parameter of the user of the device) during proximity between the device and the product. This physiologic data is then communicated by the device to a remote server in near real-time. In this use case, an object identity (identifier associated with the consumer product) is also communicated to the remote server. Other information may be communicated to the remote server, as well, such as a device identifier (and/or a user identifier), a location of the device, a time stamp, and more. At the remote server, data is processed and may, in this example, be used (possibly in combination with other data, e.g., aggregated data from or other users) by the manufacturer or seller of the consumer product to determine how users of the product react physiologically while in proximity to the product (as compared with other times). Such information may be further analyzed to determine other useful information.

A next example of a representative use case involves a user in possession of a wireless communication device. The user puts on a pair of Nike sneakers that include a built-in RFID tag. Proximity is determined (between the object-associated RFID tag and the device, by means of the RFID tag and RFID technology at the device). This then triggers the device to communicate with a device-associated sensor (or to continue such communication), which may be wirelessly connected to the device. The sensor detects muscle contractions of the user. During the time of proximity between the object and the device (e.g., the time during which the user is wearing the sneakers), physiologic data (e.g., muscle contractions in the user's legs) is sensed and sent to the device, which wirelessly communicates the data (in an encrypted form, in this example) to a remote server. In this example, Nike can use the aggregated data to determine how their sneaker is being used, e.g., types and levels of activity. In this example, the remote server may also send information back to the device to enable the user to see how his or her performance (in terms of the physiologic parameter being measured) compares with others wearing the same sneaker type, the same brand, or possibly even anyone wearing sneakers. Other information and feedback may also be provided. For example, as muscle contractions meet certain criteria, a notice or warning may be provided to the user by means of the device. If the shoes are capable of responding in some way, the remote server (possibly through the device) may even communicate with the sneakers to cause a response or action. For example, based on certain user physiologic data while wearing the sneakers, and based on device-sensed data such as ambient temperature, and possibly based on other non-physiologic data, the sneakers may be caused to stiffen their soles. One can envision many possible feedback mechanisms providing unique, real-time benefits to users based on current physiologic and non-physiologic data.

A next example of a representative use case of an embodiment of the present invention involves a user wearing a wireless device and stepping into a retail environment. In this instance, while the user is inside the retail environment (such proximity which may be determined using Apple's iBeacon technology, for example), the user's blood pressure is sensed by means of a sensor linked with the device. This information is then communicated with a remote server once every ten seconds. Other information may also be communicated to the remote server, such as a second object identifier (e.g., and object that is a product in the store) or the device location (which may be helpful to determine which products a user is engaged with at a moment in time). In the case that the user's blood pressure goes up, as may be the case when a user gets excited about a particular product in the store, the remote server may communicate information to a retail sales associate in the store to notify the sales associate of the user's (e.g., customer's) possible interest in a particular product.

Yet another example of a representative use case of an embodiment of the present invention involves a user carrying a mobile phone that includes location-finding technology (e.g., a built-in GPS or Wifi Positioning System technology). The user enters a movie theater to watch a movie. When the user is in the theater (or even determined to be in a particular seat in the theater), data that identifies the object (the theater or seat, in this example) is communicated to the remote server, along with (either concurrently or separately, e.g., at another time) user physiologic data. The object identifier data, along with data about movie locations and times, may be used to determine precisely which movie a user is watching. With time-stamped physiologic data, the precise dialog or scene that a user is watching at a particular time may be determined. This can be crossed (e.g., correlated, associated) with user physiologic data. Aggregated data from many users relating to their physiologic responses (e.g., measure of one or more physiologic parameters) may be quite informative to theater owners, studio executives, movie producers, writers, and others. Such data may also be of interest to moviegoers as an alternative or as a supplemental kind of review (one can imagine this kind of data being provided in lieu or, or as an extension to, today's user-written reviews). One feature of this particular example is that the experience (object) of interest may be considered transient (in fact many different movies are likely shown in any given theater space), yet the system can use multiple data points to determine that both a device (and a user associated with the device) and an experience (such as a movie) are present in the same place at the same time, implying in this case that a particular device and its user are experiencing a particular movie, scene, etc. In summary, the proximity in this example is being determined indirectly and via processing that may occur at either the remote server or at the device. In one possible variation of this sample use case, iBeacon or other technology may also be used, in which case the communication from such a device might indicate the specific movie, etc.

Yet another example of a representative use case for an embodiment of the present invention involves an interaction between two people. We will refer to these people as a first user and a second user. A first user associated with a first device of the present invention comes into proximity with a second user associated with a second device of the present invention. Focusing on the first user first, proximity between the first user and the second user corresponds to the sensing and collection of physiologic data of the first user, and subsequent (following collection) communication of this (and possibly other) data by the device to a first remote server, for example. Following a determination that the second user and the first user are in proximity, the second user's device-associated sensors may be collecting physiologic data from the second user, such data concurrently or subsequently communicated with a second remote server. The first remote server may then provide the first user with information about the interaction, by means of the first device (e.g., a display or audio speaker), for example. The second remote server may provide the second user with useful information relating to the interaction by means of the second device, as well, for example. Additionally, the first remote server may communicate information to the second device, and the second remote sever may communicate information to the first device. Furthermore, the first remote server and the second remote server may communicate with one another (or indeed be the same remote server). Such data flows and related analysis and output may be beneficial to help the first user or the second user to understand, improve, analyze or validate the personal interaction. Such a use case may be valuable in professional, personal (e.g., dating) situations, and to monitor or assess interactions between any of a wide range of individuals.

Notably, in this use case (and in many other use cases of the present invention), a user and an object may be moving in space, e.g., physically moving from a first location to a second location. Such movement may be over smaller distances such as within an interior (e.g., retail store) environment, or over vast distances. So long as proximity is maintained (or whenever proximity is established, which may be sporadic or periodic), for example, physiologic data is collected for a user by means of device-associated sensors, at least in some embodiments of the present invention. This data may then be wirelessly sent from the device to a remote server. A remote server may process the data (and store it in memory) and output the same or other data, either back to the device or to the object or to a sensor or to another server, as examples. The output from a remote server may be sent to a moving device, e.g., a device that is in a first location and then at another time in a second location that is not the same as the first location. The ability to collect physiologic data from a user during movement (e.g., changes in location) of the user, while the user-associated device and the user remain in proximity over time and through space, is a useful aspect of embodiments of the present invention. An instance (moment or period of time) during which there is proximity between a particular object and a particular device (or between a particular object and a particular user) is referred to as a proximity instance or a proximity event. As discussed, information other than physiologic data associated with a user may be associated with a proximity instance. For example, a proximity instance may be associated with any or all of the following information: object identifier, device identifier, user identifier, object metadata (e.g., information relating to something other than the identity of the object), device metadata (e.g., information relating to something other than the identity of the device), device location, a time of the proximity instance (or possibly a starting time and an ending time of the proximity instance), sensor data other than physiologic data (e.g., sensor status), and third-party (e.g., demographic information about a user), and more. As one example, a first proximity instance may be associated with first physiologic data, first object identifier, first device identifier, first device location and a first time, whereas a second proximity instance may be associated with second physiologic data, second object identifier, second device identifier, second device location and a second time. Data associated with a particular proximity instance may facilitate communication and processing of information in order to correlate (or connect) user related data from a particular user (or device) with a particular object. These examples are intended to be representative, and other data may be associated or otherwise connected to, or correlated with, a proximity instance.

In yet another example of a use case, an embodiment of the present invention may be used to determine the physiology of operators of cars, trains, subways, aircraft and more. By correlating a device's location with the location of a particular vehicle, for example, it is possible to then correlate the device user's physiology with a location of the vehicle. This may be useful to understanding road hazards, impact of weather conditions, and more. For example, a particular road intersection may be noticed to create undue stress to drivers who are approaching or in the intersection, leading to improvements in the traffic flow design, or reconfiguring of traffic signals, as one possible example. Another example may be tracking the physiology of pilots on final approach to a runway in order to determine if weather or other conditions are creating a situation of excessive stress, which may lead to a change in the way air traffic controllers handle the aircraft or communicate with the pilots.

Correlating two units (or sets) of data with each other may be performed in any of a variety of ways. For example, any reference herein to the act of correlating may be implemented using any techniques for performing statistical correlation on two or more data sets. As another example, two units (or sets) of data may be correlated with each other by using any method to determine whether the two units (or sets) of data are sufficiently similar to each other, based on some similarity criterion. If the two units (or sets) of data are sufficiently similar to each other accordingly to the similarity criterion, then the two units (or sets) of data are said to be "correlated" with each other, as that term is used herein. For example, a location associated with a user's physiologic data and a location of a vehicle may be correlated with each other by determining whether the physiologic data location is no more than some maximum predetermined distance from the vehicle location. If this process of correlation determines that the physiologic data location is no more than the maximum predetermined distance from the vehicle location, then the physiologic data location and the vehicle location are said to be "correlated" with each other.

In yet another example of a use case, an embodiment of the present invention may sense a basic physiologic parameter, such as a device user's body temperature, while the user is in proximity with a temperature-reducing medication (e.g., acetaminophen). It has been demonstrated that medication buying patterns may be helpful to public health by providing an understanding of the spread of disease such as seasonal flu, for example. But if there is an epidemic and people stock up on medications (so that they don't need to buy more), it then becomes more helpful to learn their physiology within the home, e.g., when they are using (rather than purchasing) a medication. Embodiments of the present invention may be used for such public health purposes, to determine physiologic patterns in order to determine the prevalence and spread of various infectious and other diseases, for example. Since various embodiments of the present invention have the ability to determine the physiologic state of large populations of people in proximity with many types of objects, there are many public health use cases and applications for embodiments of the present invention.

In yet another example of a use case, an embodiment of the present invention may sense one or more of a user's physiologic parameters and communicate the user's data to a remote server, possibly including (but not limited to) the user's (devices) location. This information may then be used to generate, select, or otherwise identify a promotion, advertisement, or other marketing means to present or share or interact with the user. For example, if a user is in a store (which may be known by device location being consistent with a physical location of a particular store, for example), and the user's physiologic data indicates that the user may be stressed, then the remote server may facilitate various actions. An example of such an action is promoting a tea shop where the user could purchase a relaxing cup of tea. Another example of such an action is to serve (to the user's device, for example) a promotion, such as a savings coupon, to a nearby therapeutic massage service. Yet another example of such an action is to suggest to the user—by means of the remote server communicating some notice or promotion or coupon or advertisement presented by means of the user's device (e.g., its display)—relating to a product or service that is available in the store or at a nearby location. Any of these promotions, advertisements, etc. could be determined by an algorithm that accesses a database of such promotions—the database information possibly including (but not limited to) the promotion, action to be taken (e.g., the specific advertisement or notice to be served), the triggering physiologic data or state (e.g., what physiologic data or physiologic identity or state will lead to the promotion being communicated to a user), the date and time range when the promotion may be served, location(s) of the promotion (e.g., geographic boundaries where a user should be to be served the promotion), and more—along with physiologic data about a user. In this example use case, if the physiologic data from a particular user meets the criteria for triggering a particular promotion, then the promotion is served to the user by means of the user's device. The effectiveness of physiology-triggered promotions described herein may also be determined, by determining if the user acted upon the promotion, e.g., whether or not the user took an action that was being suggested or otherwise encouraged by the promotion. For example, an embodiment of the present invention may determine whether a user has physiology that indicates that the user is in a physiologic state that may benefit from some action, and then elements of the embodiment may further determine whether the user took such action (e.g., this may be done by sensors sensing one or more of a user's physiologic parameters, a device receiving information from the sensors that then wirelessly communicates the physiologic and other data to a remote server, the remote server that processes such physiologic and other data to determine and facilitate an action such as the serving of a notice or promotion back to the user's device, and further having the user's device monitor the user's physiology or location or proximity to an object in order to determine if the action was taken, or likely to have been taken, by the user). As may be understood from this use case example, physiologic data may be useful to determine an advertisement or promotion or coupon or inducement or some other form of encouragement to be communicated to a user based on such physiologic data (possibly in combination with other information, such as the user's or device's location, for example). The general concept is that by knowing a person's body's (physiologic) state, embodiments of the present invention may provide information and/or suggest actions that offer or provide benefits to the user—by means of using sensors to sense one or more physiologic parameters of a user, a device to collect physiologic data and wirelessly communicate such data to a remote server (with or without prior processing), a remote server to receive such data and to process it in order to determine an action (e.g., a message to communicate back to the device), and possibly means for determining if the user acted or behaved in some way, for example. A promotion or other such communication back to a user's device may be or include a map (e.g., a map shown on a device display that indicates at least one location of a particular object, or type of object, on the map, possibly including an indication of a travel route from the user's current location to the object location), an indication of a location of a particular object (e.g., other than by means of a map, such as by means of words or numbers or symbols), or an indication of a direction to a particular object (e.g., showing a pointer that indicates a direction of travel in order for the user to access the object), for example. Many other embodiments of such user physiology-based promotional systems and methods are possible and fall within the scope of the present invention.

Use cases for embodiments of the present invention may relate to a single user, or involve the sensing, collecting and analysis of physiologic and non-physiologic data from multiple users. Furthermore, use cases of embodiments of the present invention may relate to an object that is an instance, an object that is a class, one object (of either type), or multiple objects (of one or both types). In addition, use cases of embodiments of the present invention may relate to a single physiologic parameter associated with a single user, a single physiologic parameter associated with multiple users, multiple physiologic parameters associated with a single user, or multiple physiologic parameters associated with multiple users. Any of these may relate to a single point in time, multiple discrete points in time, or many different times. For example, embodiments of systems and methods of the present invention may sense, communicate, process and analyze millions of data points from millions of users about millions of objects. Based on this, users, people and companies may benefit from access to data and analysis (possibly including resulting suggestions, ratings, recommendations, etc.) relating to a wide range of objects with which we interact each and every day. Such information may be extremely valuable with regard to one's ability to understand how one or more individuals reacts to one or more objects, as well as how we can improve and expand user experiences, and more.

Because embodiments of the present invention sense, communicate, and process potentially millions of people's physiology while in proximity with a wide range of possible objects, embodiments of the present invention enable physiologic monitoring and analysis at an unprecedented scale. As a result, embodiments of the present invention may also be useful to discover new correlations between physiology of individuals (or populations of individuals) and various disease states, pre-disease states, or other possible states of individuals or populations. For example, embodiments of the present invention may sense physiologic parameters and communicate physiologic data relating to millions of people, possibly representing billions of data points. This data may then, for example, be processed (e.g., analyzed) to determine any correlations between particular physiologic parameters (or relationships between parameters, such as ratios, patterns, trends, etc.) and particular conditions, states or actions that may be otherwise determined (e.g., public health initiatives, disease spread, news, public opinion, purchasing or other commercial actions or behaviors). Such analysis may yield new information that may be extremely useful for public health.

Embodiments of the present invention may sense, communicate, and/or process multiple physiologic parameters of a single user; sense, communicate, and process any one physiologic parameter of a single user over time; sense, communicate, and process physiologic data from multiple users, and more. For example, physiologic data acquired from many users (e.g., a first user, a second user, a third user) during each of these users' proximity to a particular object may be helpful to understand that particular object, e.g., its physiologic effect on a population of users. Further analysis and correlation of physiologic data with various objects may provide additional useful information, possibly including (but not limited to) the quality of a user experience vis-à-vis a particular object, the performance of a particular object, user satisfaction relative to a particular object, failure rates of a particular object, and more. Population data (meaning the physiologic data from many users relating to a particular object, type of object, brand, etc.) may also enable other analysis, information, output, warnings, and more. For example if physiologic parameter measurements associated with an object suddenly appear unusual, this may indicate a malfunction with the object. Such information may, for example, be used to protect consumers, prevent or alter future use of an object, or inform product development or patches to a product.

Embodiments of the present invention may further generate a presentation or other output (e.g., on a device or computer display) that provides a summary, possibly being or including a graphical summary. In one such embodiment, such a graphical summary may resemble the presentation made by Google Analytics, for example. In such an embodiment, such a graphical summary may include a visual representation of data relating to the interactions of one or more users and an object, either an instance or a class, that is of interest to the viewer. In another such embodiment, a viewer may be able to see a visual representation of data relating to the interactions of one or more users and multiple objects, either instances or classes, that are of interest to the viewer. Such embodiments may include graphical representations, for example, that represent or show numbers of users interacting with an object, geographic (or other types of) locations of user interactions with each object, times and/or durations of user interactions with each object, aggregated physiologic data (of a single physiologic parameter, for example) associated with users during their interactions with an object, the physiologic state of users (e.g., an analyzed output that integrates multiple physiologic data points to provide a summary result, such as a "satisfaction rating" or index or other similar summarized output), and more. Embodiments of such presentations may include raw data, graphs, graphics, and other styles and forms of presentations. Additionally, in embodiments of such a presentation or output system or methods, viewers may set up their own presentations, views, priorities, and more. For example, a viewer may set up a presentation to show three graphics of particular interest to the viewer: 1) a graph that shows the quantity of user interactions with a particular object over time, 2) a map of the world that shows the locations of user interactions with the same object for the current month (or other period of time), and 3) a bar graph showing average user physiologic state while using the object and comparing this result to other data that represents the average user physiologic states while using similar objects. The embodiments of presentations described above are representative only, and many others are within the scope of the present invention. Furthermore, a method that includes a viewer paying for such embodiments of presentations of data may be useful, wherein viewers pay to access specific information, presentations, data, analyses, and more. Many other representations and presentations of data and information are valuable to viewers relating to user interactions (e.g., proximity) with objects, and these embodiments are within the scope of the present invention.

One embodiment of a presentation of information arising from an analysis of physiologic data is a heat map that shows a particular physiologic parameter (e.g., body temperatures) or physiologic states for many users on a map. This type of presentation may be helpful to an understanding of the underlying data. Many other types of presentations of data are possible, including 3-D representations of data, holographic presentations, and more. The purpose of such presentations, in general, is to make it easier for a person to interpret the data, and possibly to take action based on the data. Data presentations may include the ability to be manipulated, such as the ability to view heat maps for different points in time.

As may be seen from these few examples, many combinations of objects (e.g., things, places, experiences, people), devices (e.g., wearables, mobile phones), object-device proximity determinations (e.g., RFID tag-facilitated, beacon facilitated, GPS or WPS correlation), sensor types, physiologic parameters that are being sensed (e.g., heart rate, respiration rate, blood pressure, body temperature), communicated data (e.g., object identifier, device identifier, user identifier, location, physiologic data, time), communication timings and protocols, remote server data processing (e.g., combination, aggregation, storage, statistical processing, output), remote sever output types (e.g., report, narrative, raw data, recommendation, rating, warning, instruction, command), etc. that fall within the scope of the present invention. There are also a wide variety of use cases. In general and without limitation, embodiments of the present invention benefit users by automatically collecting physiologic information about a user while a user is determined to be in proximity to a particular object, to enable new useful information or output. The examples above are intended to be representative and not limiting in any way.

In addition to determining proximity between an object and a device, and enabling sensing and communication of physiologic data associated with the physiology of a user of the device, for example, embodiments of the present invention may further cause (or benefit from) a presentation of a remote control user interface on a device, possibly based on the proximity of the object and the device, enabling control of the same object (or possibly a different object) based on confirmation (e.g., authentication, validation, verification) of an identity of the user of the device based on physiologic data being sensed from the user by the device and communicated by the device (and possibly being communicated by the device to a remote server for processing and sending instructions to the object), e.g., the user identity authenticated by means of a physiologic fingerprint. Relating to such an embodiment, an example use case is a user entering into a room having a secure lighting system, meaning a lighting system that may only be controlled by certain users. Based on a determination of proximity between the user's device (e.g., a smart phone) and the object (e.g., the lighting system), along with authentication (verification, validation) of the user's identity based (in whole, or at least in part) on a physiologic fingerprint (or physiologic data more generally), for example, the user is thereby authorized to control the secure lighting system by means of a remote control user interface that is displayed (and may be interacted with) on the user's device, such as soft keys enabling control of the lighting system that appear on a touch-sensitive display of the device. In one such embodiment, the remote control user interface automatically appears on the device (or may be caused to appear on the device by the user, for example), but does not permit control of the lighting system (or does not permit full control of the system) until user identity confirmation is complete. In another such embodiment, the remote control user interface does not appear (or is not launch-able or visible to the user) until the user's identity is confirmed. Once a user's identity is authenticated (confirmed, verified, validated, etc.), then the user is allowed to control the object (e.g., the secure lighting system in this example) and the user may do so by means of the remote control user interface at the device, e.g., an interactive remote control consisting of soft keys displayed and available on a touch-screen display of a mobile smart phone device. The remote control user interface of such an embodiment of the present invention may receive an input from the user, and subsequently communicate data (such as an instruction or command) from the device, based on the input from the user, either directly to the object (or to an object controller that is capable of controlling the object), or indirectly to the object (or to an object controller that is capable of controlling the object) by means of a remote server. In the latter case, for example, the device may wirelessly communicate with a remote server, the remote server may perform some process on the data sent to it by the device (e.g., user physiologic data, user input provided to a remote control user interface, device identifier data, object identifier data, etc.), for example, to determine user authorization to control an object, user's desires relative to control of the object, and more. Additionally, in the same manner that data may be communicated from a user to a device (by means of a remote control user interface) to a remote server to an object (or object controller), data (e.g., feedback) may also be sent back from the object (or object controller) to the remote server to the device. Alternatively, if a device and object (or object controller) are in direct communication, the object (or object controller) may send feedback directly back to the device. Data sent back to a device may be for processing, or may be (in its raw or processed form) presented to a user, e.g., verification that some control input by the user resulted in the desired response at the object. Communication between an object (or object controller) and a device may occur directly, indirectly, or using direct means in one direction (e.g., from a device to an object) and indirect means in the other direction (e.g., from an object to a device). Various aspects relating to remote control user interfaces of embodiments of the present invention may be performed at a device, a remote server, and/or an object. Such embodiments of the present invention that combine the concepts of proximity enabled remote control, remote control user interfaces, and proximity-associated physiologic data sensing, may be implemented in a variety of ways and relate to many different use cases wherein both user physiologic data and user control of an object are of interest.

In an embodiment of the present invention, after a determination of proximity between a device and an object, such as medical equipment capable of influencing a particular physiologic parameter, a remote control user interface for the medical equipment is displayed on the user's device (e.g., smart phone interactive display) and relevant physiologic information about the user is sensed and relevant physiologic data is wirelessly communicated to a remote server. In this example, the remote server communicates with the medical equipment to provide physiologic data to the medical equipment (and possibly feedback information from the medical equipment back to the device and remote control user interface). In addition, in this example, the device enables a user to (directly or indirectly) communicate with the medical equipment by means of the remote control user interface in order to control at least some aspect of the medical equipment. This unique combination of user control of medical equipment by means of a remote control user interface (at a device), along with proximity-based physiologic monitoring with resultant data communicated to the medical equipment, has significant potential to benefit certain users. As noted relating to other embodiments of the present invention, such an embodiment may include any of a variety of technologies and be implemented in any of a variety of ways.

Embodiments of the present invention cannot be performed solely by a person since, for example, a person cannot be wireless communication means of a device, or perform wireless communication from a device to a remote server. Other elements and aspects of embodiments of the present invention cannot be or be performed solely by a person. Even those processes relating to embodiments of the present invention that may possibly be performed (not for purposes of the present invention, but in general) by a person, such as determination of a heart rate, cannot be performed accurately and continuously, without (in the case of someone other than the user whose heart rate is being determined) limiting and obstructing the actions of the user which would be detrimental to the user's use of objects of the present invention (and would constantly alert the user to the fact that his or her heart rate was actually being monitored all of the time), or (in the case that someone other than the user is determining the heart rate) without the user having to restrict his or her movements and actions, which would again be detrimental and contrary to the use and purpose of the present invention, which involves the ability to monitor, sense or determine physiologic parameters of a user in the background, using wearable sensors, for example. None of the embodiments of the present invention can be performed solely by, or embodied solely in, a person, even one of exceptional intelligence. First of all, aspects of embodiments of the present invention involve methods or processes, or elements that perform such methods or processes, that cannot be embodied or performed solely by a person. As noted above, one other example of an aspect of embodiments of the present invention that cannot be performed by a person is wireless communication, such as wireless radio communication between a mobile device wireless radio communication means and a remote server wireless radio communication means, for example, such wireless communication being a transfer of information at a speed (distance per time) which is humanly impossible to reproduce, whether such wireless communication is done once or multiple times. None of i) the speed at which information is transferred, ii) the form or format of the information being transferred (e.g., as binary bits, possibly encrypted), and iii) the distance over which the information is transferred, can be replicated continuously and reliably by a person. For example, no person can run that fast for that long, or process the data or communication of the data nearly so quickly. Another such example of an aspect of the present invention that cannot be performed by a person is the sensing of certain physiologic parameters and securing of related data. For example, no person is capable of accurately quantifying their own temperature or blood pressure (that's not to say that a person could not make an informed guess, and possibly even be correct some of the time, however they could not do this over time, consistently and accurately) without using technology such as a thermometer or sphygmomanometer, respectively. The same goes for most other physiology, which may only be accurately and reliably sensed and quantified (and subsequently wirelessly communicated) by particular elements of embodiments of the present invention. Importantly, embodiments of the present invention rely on continuity, accuracy and reliability of the sensing, processing and sharing of information, including physiologic data, wirelessly communicated information, and analyses performed at a remote server and elsewhere, none of which is possibly done by a person (continuously, accurately and reliably over time). Another aspect of embodiments of the present invention that is not possible for a person to perform is a determination of proximity. For example, proximity may be determined by parameters that are invisible to the human eye (e.g., an electronically established geofence that is only capable of being determined by wireless means, since it is not visible to the human eye, and which may even be changed or dynamically set, etc.). As another example, proximity may exist prior to a person being able to notice or see a particular object. As yet another example, it may be desirable for a person not to even notice that they are in proximity to an object and having their physiology sensed, etc. since this may cause false or consciously influenced data (e.g., a change in one or more physiologic parameters based on a person's knowing that their physiology relative to a particular object is being observed). In many cases relating to embodiments of the present invention, it is undesirable for a user to be aware of their proximity to an object, or to know when their physiology is being sensed or communicated, as another example (e.g., embodiments of the present invention may include sensors or other technologies that operate without the knowledge of a user, thereby enabling passive or background sensing of physiologic parameters, for example). As such, an aspect of embodiments of the present invention that is not possible for a person to perform is a determination of proximity. By extension, yet another aspect of certain (the same or other) embodiments of the present invention that is not possible for a person to perform is a determination of non-proximity. Yet two other aspects of embodiments of the present invention that are not possible for a person to perform is a determination of pre-proximity (the time when a user is approaching but not yet in proximity with an object, such time being a valuable time to collect physiologic data for comparative purposes, for example) and post-proximity (the time following when a user has been in proximity with an object, such time being a valuable time to collect physiologic data for comparative purposes, for example). Many aspects of the present invention, including but not limited to the continuity of data processing, accuracy and reliability of data being used by systems and methods of the present invention, correlations and other analyses performed and communicated at high speeds over vast distances, and more, cannot possibly be performed by a person, even one of extraordinary intelligence and capability, and require the use of elements of things like electronic processing means (e.g., chip, processor, server, computer), wireless communication means, proximity (and also possibly non-proximity) determination means, physiologic sensors, and more.

Many variations of embodiments of the present invention are possible, including but not limited to variations in specific elements of the present invention, the ways that various elements relate or communicate with one another, the uses of the present invention, and more. The examples (including embodiments) described above are intended to be representative of the possibilities, and do not limit the present invention in any way. For example, embodiments of the present invention may involve the use of multiple signals, or other forms or types of communication between elements of the embodiment. In this case, signals may be described as first signal, second signal, etc. The use of descriptors like "first" and "second" does not imply that a first signal precedes a second signal, although this may be the case. Additionally, embodiments of the present invention may have signals that are separated or combined, in practice. For example, in one embodiment, a "first signal" may be divided into multiple separate wireless communications that, together, constitute the first signal. As another example, in another embodiment, signals may be combined and communicated together, even when they contain different elements of data, for example, such as when a first signal and a second signal are wirelessly communicated in a single transmission. As one further example, in certain embodiments of the present invention, a first signal and a second signal (or any other two signals) may be the same signal and may contain the same or essentially the same data.

Any two or more elements disclosed herein (such as any combination of devices, objects, sensors, and remote servers) as communicating with each other (e.g., partially or entirely wirelessly), may include or otherwise be coupled to appropriate transmitters and receivers for transmitting and receiving signals to and from each other. For example, a first element (which may, for example, be a device, object, sensor, or remote server) may include or otherwise be coupled to a transmitter, which may transmit a signal (e.g., partially or entirely wirelessly). A second element (which may, for example, be a device, object, sensor, or remote server) may include or otherwise be coupled to a receiver, which may receive the signal (e.g., partially or entirely wirelessly).

It is to be understood that although the present invention has been described above in terms of particular embodiments, the foregoing embodiments are provided as illustrative only, and do not limit or define the scope of the present invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the present invention may be performed by one or more computer processors executing a program tangibly embodied on a computer-readable medium to perform functions of the present invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the present invention may store such data in such data structure(s) and read such data from such data structure(s).

What is claimed is:

1. A method comprising:
   (A) at a device, using a first receiver module to wirelessly receive a first signal from a first object, at a first time, wherein the device and the first object are distinct from each other;
   (B) at the device, using a second receiver module to wirelessly receive a second signal from the first object, at a second time, the second signal comprising a first identifier representing an identity of the first object;
   (C) at the device, using a processor module to store a second identifier representing at least one of an identity of the device and an identity of a first user;
   (D) at the device, at a third time, using the processor module to determine, based on the first signal received from the first object, that the device is in proximity to the first object;
   (E) in response to determining that the device is in proximity to the first object, using a first transmitter module to wirelessly transmit a third signal comprising the first identifier, and a fourth signal comprising the second identifier, to a remote server;
   (F) at a first sensor module, at a fourth time after the third time, sensing a first value of a first physiologic parameter of the first user;
   (G) at the first sensor module, using a second transmitter module to transmit a fifth signal comprising first physiologic data representing the first value of the first physiologic parameter to the device;
   (H) at the device, using a third receiver module to receive the fifth signal representing the first physiologic data; and
   (I) at the device, after determining that the device is in proximity to the first object, using a third transmitter module to wirelessly transmit a sixth signal comprising the first physiologic data to the remote server.

2. The method of claim 1, further comprising:
   (J) at the device, at a fourth time after the first time, determining that the device is not in proximity to the first object; and
   (K) after determining that the device is not in proximity to the first object, wirelessly transmitting, to the remote server, data indicating that the device is not in proximity to the first object.

3. The method of claim 2, further comprising:
   (L) at the first sensor module, at a fifth time after the fourth time, sensing a second value of the first physiologic parameter of the first user;
   (M) at the first sensor module, transmitting second physiologic data representing the second value of the first physiologic parameter to the device; and
   (N) after determining that the device is not in proximity to the first object, wirelessly transmitting the second physiologic data to the remote server.

4. The method of claim 1, further comprising:
   (J) at a second sensor module, at a fourth time after the third time, sensing a second value of a second physiologic parameter of the first user; and (K) after determining that the device is in proximity to the first object, wirelessly transmitting the second physiologic data to the remote server.

5. The method of claim 4, wherein the device includes the first sensor module and the second sensor module.

6. The method of claim 1, further comprising:
(J) at the device, at a fourth time after the first time, determining that the device is not in proximity to the first object; and
(K) in response to determining that the device is not in proximity to the first object, terminating transmission of the first physiologic data to the remote server.

7. The method of claim 6, wherein determining that the device is not in proximity to the first object comprises determining that the device is not receiving a signal from the first object, and determining that non-receipt of the signal from the object indicates that the device is not in proximity to the object.

8. The method of claim 1, further comprising:
(J) at the device, after the first time, identifying location data representing a current location of the device; and
(K) at the device, wirelessly transmitting the location data to the remote server.

9. The method of claim 8, wherein (J) comprises identifying the location data in response to determining that the device is in proximity to the first object.

10. The method of claim 8, wherein (K) comprises wirelessly transmitting the location data to the remote server in response to determining that the device is in proximity to the first object.

11. The method of claim 1, further comprising:
(J) at the device, after the first time, identifying location data representing a current location of the first object; and
(K) at the device, wirelessly transmitting the location data to the remote server.

12. The method of claim 1, further comprising:
(J) at the first sensor, at a fourth time before the first time, sensing a second value of the first physiologic parameter of the first user; and
wherein (I) further comprises initiating wireless transmission of a seventh signal comprising second physiologic data in response to determining that the device is in proximity to the first object, wherein the second physiologic data represents the second value of the first physiologic parameter, to the remote server.

13. The method of claim 1, further comprising:
(J) after determining that the device is in proximity to the first object, wirelessly transmitting, to the remote server, data indicating that the device is in proximity to the first object.

14. The method of claim 1, wherein the device includes the first sensor module.

15. The method of claim 1, wherein (D) comprises, at the device:
(D) (1) identifying a current location of the device;
(D) (2) identifying a current location of the first object; and
(D) (3) determining that the device is in proximity to the first object in response to determining that the current location of the device and the current location of the first object satisfy a proximity condition.

16. The method of claim 1, wherein determining that the device is in proximity to the first object comprises determining that the device received the first signal from the first object.

17. The method of claim 16, further comprising:
(J) at the device, using a fourth receiver module to receive a seventh signal from the first object, wherein the second signal represents a location of the first object;
wherein determining that the device is in proximity to the first object comprises determining that the device is in proximity to the first object based on the location of the first object.

18. The method of claim 1, wherein the first receiver module and the second receiver module are the same module.

19. The method of claim 18, wherein the first receiver module, the second receiver module, and the third receiver module are the same module.

20. The method of claim 1, wherein the device includes the first transmitter module.

21. The method of claim 20, wherein the device includes the third transmitter module.

22. The method of claim 21, wherein the first transmitter module and the third transmitter module are the same module.

23. The method of claim 1, wherein the device includes the third transmitter module.

24. The method of claim 1, wherein the first time is the same time as the second time.

25. The method of claim 1, wherein the first signal and the second signal are the same signal.

26. The method of claim 1, wherein the third signal and the fourth signal are the same signal.

27. The method of claim 1, wherein (D) comprises using radio frequency identification (RFID) technology to determine that the device is in proximity to the first object.

28. The method of claim 1, wherein (D) comprises using near field communication (NFC) technology to determine that the device is in proximity to the first object.

29. The method of claim 1, wherein (D) comprises using optical identification technology to determine that the device is in proximity to the first object.

30. The method of claim 1, wherein (E) comprises:
wirelessly transmitting the third signal to the remote server without any substantial delay after determining that the device is in proximity to the first object.

31. The method of claim 1, wherein (I) comprises wirelessly transmitting the first physiologic data to the remote server in response to determining that the device is in proximity to the first object.

32. The method of claim 1, further comprising:
(J) at the device, storing second metadata.

33. The method of claim 1, wherein wirelessly transmitting the first physiologic data to the remote server comprises initiating transmission of the first physiologic data to the remote server.

34. The method of claim 1, wherein the first physiologic data comprises timestamp data representing the first time.

35. The method of claim 1, further comprising:
(J) at the first sensor module, at a fourth time before the first time, sensing a second value of the first physiologic parameter of the first user; and
wherein (I) further comprises wirelessly transmitting a seventh signal comprising second physiologic data, wherein the second physiologic data represents the second value of the first physiologic parameter, to the remote server.

36. The method of claim 1, wherein the second identifier represents at least the identity of the first user.

37. The method of claim 1, further comprising:
(J) at the device, using a fourth transmitter module to wirelessly transmit a seventh signal representing a time to the remote server.

38. A system comprising:
a device comprising:
- a first receiver module to wirelessly receive a first signal from a first object, at a first time, wherein the device and the first object are distinct from each other;
- a second receiver module to wirelessly receive a second signal from the first object, at a second time, the second signal comprising a first identifier representing an identity of the first object;
- a processor module to:
  - store a second identifier representing at least one of an identity of the device and an identity of a first user;
  - determine, at a third time, based on the first signal received from the first object, that the device is in proximity to the first object;
- a first transmitter module to wirelessly transmit, in response to determining that the device is in proximity to the first object, a third signal comprising the first identifier, and a fourth signal comprising the second identifier, to a remote server;
- a first sensor module to sense, at a fourth time after the third time, a first value of a first physiologic parameter of the first user;
- wherein the first sensor module comprises a second transmitter module to transmit a fifth signal comprising first physiologic data representing the first value of the first physiologic parameter to the device;
- wherein the device further comprises a third receiver module to receive the fifth signal representing the first physiologic data; and
- wherein the device further comprises a third transmitter module to wirelessly transmit, after determining that the device is in proximity to the first object, a sixth signal comprising the first physiologic data to the remote server.

39. The system of claim 38:
wherein the processor module further comprises means for determining, at a fourth time after the first time, that the device is not in proximity to the first object; and
wherein the system further comprises means for wirelessly transmitting, to the remote server, after determining that the device is not in proximity to the first object, data indicating that the device is not in proximity to the first object.

40. The system of claim 39:
wherein the first sensor module further comprises means for sensing, at a fifth time after the fourth time, a second value of the first physiologic parameter of the first user;
wherein the first sensor module further comprises means for transmitting second physiologic data representing the second value of the first physiologic parameter to the device; and
wherein the system further comprises means for wirelessly transmitting, after determining that the device is not in proximity to the first object, the second physiologic data to the remote server.

41. The system of claim 38:
further comprising a second sensor module to sense, at a fourth time after the third time, a second value of a second physiologic parameter of the first user; and
wherein the system further comprises means for wirelessly transmitting, after determining that the device is in proximity to the first object, the second physiologic data to the remote server.

42. The system of claim 41, wherein the device includes the first sensor module and the second sensor module.

43. The system of claim 38:
wherein the processor module further comprises means for determining, at a fourth time after the first time, that the device is not in proximity to the first object; and
wherein the system further comprises means for terminating, in response to determining that the device is not in proximity to the first object, transmission of the first physiologic data to the remote server.

44. The system of claim 43, wherein determining that the device is not in proximity to the first object comprises determining that the device is not receiving a signal from the first object, and determining that non-receipt of the signal from the object indicates that the device is not in proximity to the object.

45. The system of claim 38:
wherein the processor module further comprises means for identifying, after the first time, location data representing a current location of the device; and
wherein the device further comprises a fourth transmitter module to wirelessly transmit the location data to the remote server.

46. The system of claim 45, wherein the means for identifying the location data representing the current location of the device comprises means for identifying the location data in response to determining that the device is in proximity to the first object.

47. The system of claim 45, wherein the fourth transmitter module comprises means for wirelessly transmitting the location data to the remote server in response to determining that the device is in proximity to the first object.

48. The system of claim 38:
wherein the processor module further comprises means for identifying, after the first time, location data representing a current location of the first object; and
wherein the device further comprises a fourth transmitter module to wirelessly transmit the location data to the remote server.

49. The system of claim 38:
wherein the first sensor further comprises means for sensing, at a fourth time before the first time, a second value of the first physiologic parameter of the first user; and
wherein the third transmitter comprises means for initiating wireless transmission of a seventh signal comprising second physiologic data in response to determining that the device is in proximity to the first object, wherein the second physiologic data represents the second value of the first physiologic parameter, to the remote server.

50. The system of claim 38, further comprising:
a fourth transmitter module to wirelessly transmit, after determining that the device is in proximity to the first object, to the remote server, data indicating that the device is in proximity to the first object.

51. The system of claim 38, wherein the device includes the first sensor.

52. The system of claim 38, wherein the processor module is adapted to determine that the device is in proximity to the first object by:
identifying a current location of the device;
identifying a current location of the first object; and
determining that the device is in proximity to the first object in response to determining that the current location of the device and the current location of the first object satisfy a proximity condition.

53. The system of claim 38, wherein determining that the device is in proximity to the first object comprises determining that the device received the first signal from the first object.

54. The system of claim 53:
wherein the device further comprises a fourth receiver module to receive a seventh signal from the first object, wherein the second signal represents a location of the first object; and
wherein determining that the device is in proximity to the first object comprises determining that the device is in proximity to the first object based on the location of the first object.

55. The system of claim 38, wherein the first receiver module and the second receiver module are the same module.

56. The system of claim 55, wherein the first receiver module, the second receiver module, and the third receiver module are the same module.

57. The system of claim 38, wherein the device includes the first transmitter module.

58. The system of claim 57, wherein the device includes the third transmitter module.

59. The system of claim 58, wherein the first transmitter module and the third transmitter module are the same module.

60. The system of claim 38, wherein the device includes the third transmitter module.

61. The system of claim 38, wherein the first time is the same time as the second time.

62. The system of claim 38, wherein the first signal and the second signal are the same signal.

63. The system of claim 38, wherein the third signal and the fourth signal are the same signal.

64. The system of claim 38, wherein the processor module is adapted to determine that the device is in proximity to the first object using radio frequency identification (RFID) technology.

65. The system of claim 38, wherein the processor module is adapted to determine that the device is in proximity to the first object using near field communication (NFC) technology.

66. The system of claim 38, wherein the processor module is adapted to determine that the device is in proximity to the first object using optical identification technology.

67. The system of claim 38, wherein the first transmitter module comprises:
means for wirelessly transmitting the third signal to the remote server without any substantial delay after determining that the device is in proximity to the first object.

68. The system of claim 38, wherein the third transmitter module comprises means for wirelessly transmitting the first physiologic data to the remote server in response to determining that the device is in proximity to the first object.

69. The system of claim 38, wherein the device further comprises means for storing second metadata.

70. The system of claim 38, wherein the third transmitter module comprises means for initiating transmission of the first physiologic data to the remote server.

71. The system of claim 38, wherein the first physiologic data comprises timestamp data representing the first time.

72. The system of claim 38:
wherein the first sensor comprises means for sensing, at a fourth time before the first time, a second value of the first physiologic parameter of the first user; and
wherein the third transmitter module further comprises means for wirelessly transmitting a seventh signal comprising second physiologic data, wherein the second physiologic data represents the second value of the first physiologic parameter, to the remote server.

73. The system of claim 38, wherein the second identifier represents at least the identity of the first user.

74. The system of claim 38:
wherein the device further comprises a fourth transmitter module to wirelessly transmit a seventh signal representing a time to the remote server.

* * * * *